(12) United States Patent
Sorensen et al.

(10) Patent No.: US 12,294,663 B2
(45) Date of Patent: May 6, 2025

(54) SYSTEMS AND METHODS FOR ONBOARD VEHICLE CERTIFICATE DISTRIBUTION

(71) Applicant: Aurora Operations, Inc., Pittsburgh, PA (US)

(72) Inventors: Michael David Sorensen, Pittsburgh, PA (US); Matthew Charles Ellis Wood, Pittsburgh, PA (US); Matthew James Harris, Pittsburgh, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 101 days.

(21) Appl. No.: 18/172,735

(22) Filed: Feb. 22, 2023

(65) Prior Publication Data
US 2023/0198783 A1    Jun. 22, 2023

Related U.S. Application Data

(63) Continuation of application No. 16/866,965, filed on May 5, 2020, now Pat. No. 11,606,215.
(Continued)

(51) Int. Cl.
*H04L 9/08*      (2006.01)
*B60R 25/24*     (2013.01)
(Continued)

(52) U.S. Cl.
CPC .......... *H04L 9/3268* (2013.01); *B60R 25/24* (2013.01); *G06F 3/0604* (2013.01);
(Continued)

(58) Field of Classification Search
CPC ... H04L 2209/84; H04L 9/0877; H04L 9/321; H04L 9/3247; H04L 9/3265;
(Continued)

(56) References Cited

U.S. PATENT DOCUMENTS 11,223,951 B1    1/2022    Farmer et al.
2017/0366359 A1  12/2017   Scarlata et al.
(Continued)

OTHER PUBLICATIONS

GRPC, "Core concepts, architecture and lifecycle", 2021, https://grpc.io/docs/what-is-grpc/core-concepts/, retrieved on Oct. 8, 2021, 4 pages.
(Continued)

*Primary Examiner* — Dionne Pendleton
(74) *Attorney, Agent, or Firm* — Dority & Manning, P.A.

(57) ABSTRACT

Systems and methods for onboard vehicle certificate distribution are provided. A system can include a plurality of devices including a master device for authenticating processes and one or more requesting devices. The master device can include a master host security service configured to authenticate the one or more processes of the system. The master host security service can run a certificate authority to generate a root certificate and a private root key corresponding to the root certificate. A respective host security service can receive a request for a process manifest for a requesting process of a respective device from a respective orchestration service. The respective host security service can generate the process manifest for the requesting process and provide the process manifest to the requesting process. The requesting process can use the process manifest to communicate with the certificate authority to obtain an operational certificate based on the root certificate.

20 Claims, 22 Drawing Sheets

Related U.S. Application Data

(60) Provisional application No. 62/990,055, filed on Mar. 16, 2020.

(51) Int. Cl.
*G06F 3/06* (2006.01)
*H04L 9/32* (2006.01)

(52) U.S. Cl.
CPC .......... *G06F 3/0659* (2013.01); *G06F 3/0679* (2013.01); *H04L 9/0877* (2013.01); *H04L 2209/84* (2013.01)

(58) Field of Classification Search
CPC ... H04L 9/3268; G06F 3/0604; G06F 3/0659; G06F 3/0679; B60R 25/24
See application file for complete search history.

(56) References Cited

U.S. PATENT DOCUMENTS

2021/0243038 A1* 8/2021 Wilson .................... G01S 19/14
2021/0284196 A1 9/2021 Sorensen et al.

OTHER PUBLICATIONS

GRPC, "Documentation", 2021, https://grpc.io/docs/, retrieved on Oct. 8, 2021, 2 pages.
GRPC, "GRPC Experimental", Oct. 5, 2021, https://grpc.github.io/grpc/cpp/classgrpc_1_1experimental_1_1_client_rpc_info.html, retrieved on Oct. 8, 2021, 1 page.

* cited by examiner

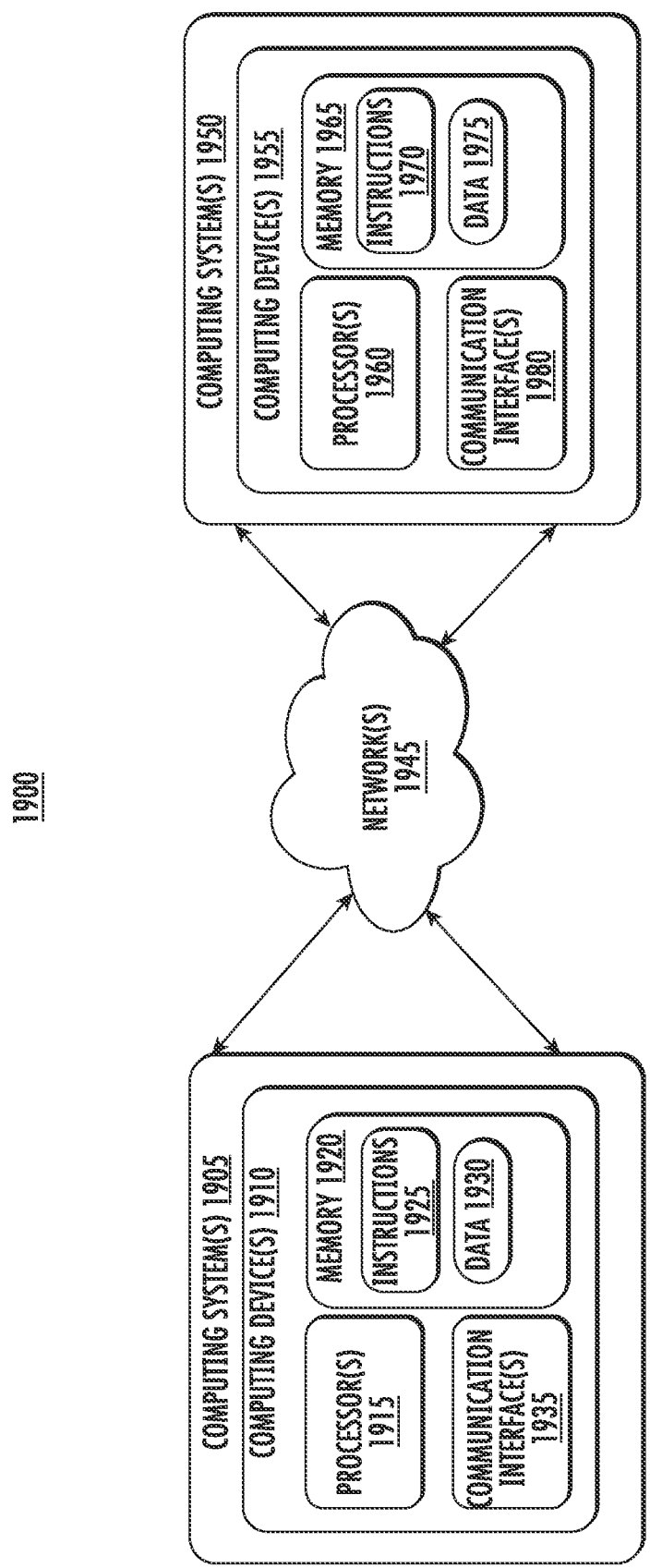

SYSTEMS AND METHODS FOR ONBOARD VEHICLE CERTIFICATE DISTRIBUTION

PRIORITY CLAIM

The present application is a continuation of U.S. application Ser. No. 16/866,965 having a filing date of May 5, 2020, which is based on and claims benefit of U.S. Provisional Patent Application No. 62/990,055 having a filing date of Mar. 16, 2020. Applicant claims priority to and the benefit of each of such applications and incorporates all such applications herein by reference in its entirety.

FIELD

The present disclosure relates generally to vehicle security infrastructure. In particular, cryptographic signing techniques can be utilized to authorize different processes interacting with a vehicle.

BACKGROUND

An autonomous vehicle can be capable of sensing its environment and navigating with little to no human input. To do so, an autonomous vehicle can interact with devices that run a plurality of processes. The processes can communicate with each other through a series of messages. The messages can be communicated over encrypted or unencrypted channels.

SUMMARY

Aspects and advantages of embodiments of the present disclosure will be set forth in part in the following description, or may be learned from the description, or may be learned through practice of the embodiments.

An example aspect of the present disclosure is directed to a vehicle computing system including a master device. The master device include an orchestration service configured to start one or more processes of the computing system and a master host security service configured to authenticate the one or more process of the vehicle computing system. The master device includes one or more processors and one or more tangible, non-transitory, computer readable media that collectively store instructions that when executed by the one or more processors cause the computing system to perform operations. The operations include generating, by the master host security service, a root certificate associated with the master device. The operations include receiving, from the orchestration service, a request for a process manifest for a process of the master device. The process manifest includes a process name, a manifest key, and the root certificate. The operations include generating, by the master host security service, the process manifest for the process. And, the operations include writing, by the orchestration service, the process manifest to a memory location associated with the process.

Another example aspect of the present disclosure is directed to another vehicle computing system including a plurality of devices. The plurality of devices include a master device for authenticating processes and one or more requesting devices. A respective requesting device includes a secondary orchestration service configured to start one or more processes of the respective requesting device and a requesting host security service configured to authenticate the one or more processes of the respective requesting device. The master device includes a master host security service configured to authenticate the one or more processes of the vehicle computing system. The plurality of devices include one or more processors and one or more tangible, non-transitory, computer readable media that collectively store instructions that when executed by the one or more processors cause the computing system to perform operations. The operations include generating, by the master host security service, a root certificate and a private root key corresponding to the root certificate. The operations include receiving, at the requesting host security service, a request for a process manifest for a requesting process of the requesting device from the secondary orchestration service. The process manifest includes a process name, a manifest key, and the root certificate. The operations include generating, by the requesting host security service, the process manifest for the requesting process. And, the operations include writing, by the secondary orchestration service, the process manifest to a memory location associated with the requesting process.

Yet another example aspect of the present disclosure is directed to a computing system including a plurality of devices. The plurality of device include one or more requesting devices and a master device. Each respective requesting device includes a trusted platform module associated with an identity certificate and an identity private key. The identity certificate identifies the respective requesting device. The master device includes one or more processors and one or more tangible, non-transitory, computer readable media that collectively store instructions that when executed by the one or more processors cause the master device to perform operations. The operations include generating a root certificate and a private root key corresponding to the root certificate. The operations include receiving, via a communication channel, a certificate signing request from the respective requesting device. The certificate signing request includes the identity certificate and a requesting signature encrypted by the identity private key. The operations include validating the requesting signature by comparing the identity certificate to the certificate signing request. The operations include, in response to validating the requesting signature, generating a signed certificate for the respective requesting device. The signed certificate includes a master signature encrypted by the private root key. The operations include providing, via the communication channel, the signed certificate to the respective requesting device. The respective requesting device is configured to decrypt the master signature of the signed certificate with the root certificate.

Other example aspects of the present disclosure are directed to other systems, methods, vehicles, apparatuses, tangible non-transitory computer-readable media, and devices for authenticating messages. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 19 depicts example system components according to example embodiments of the present disclosure.

DETAILED DESCRIPTION

Figure 1:
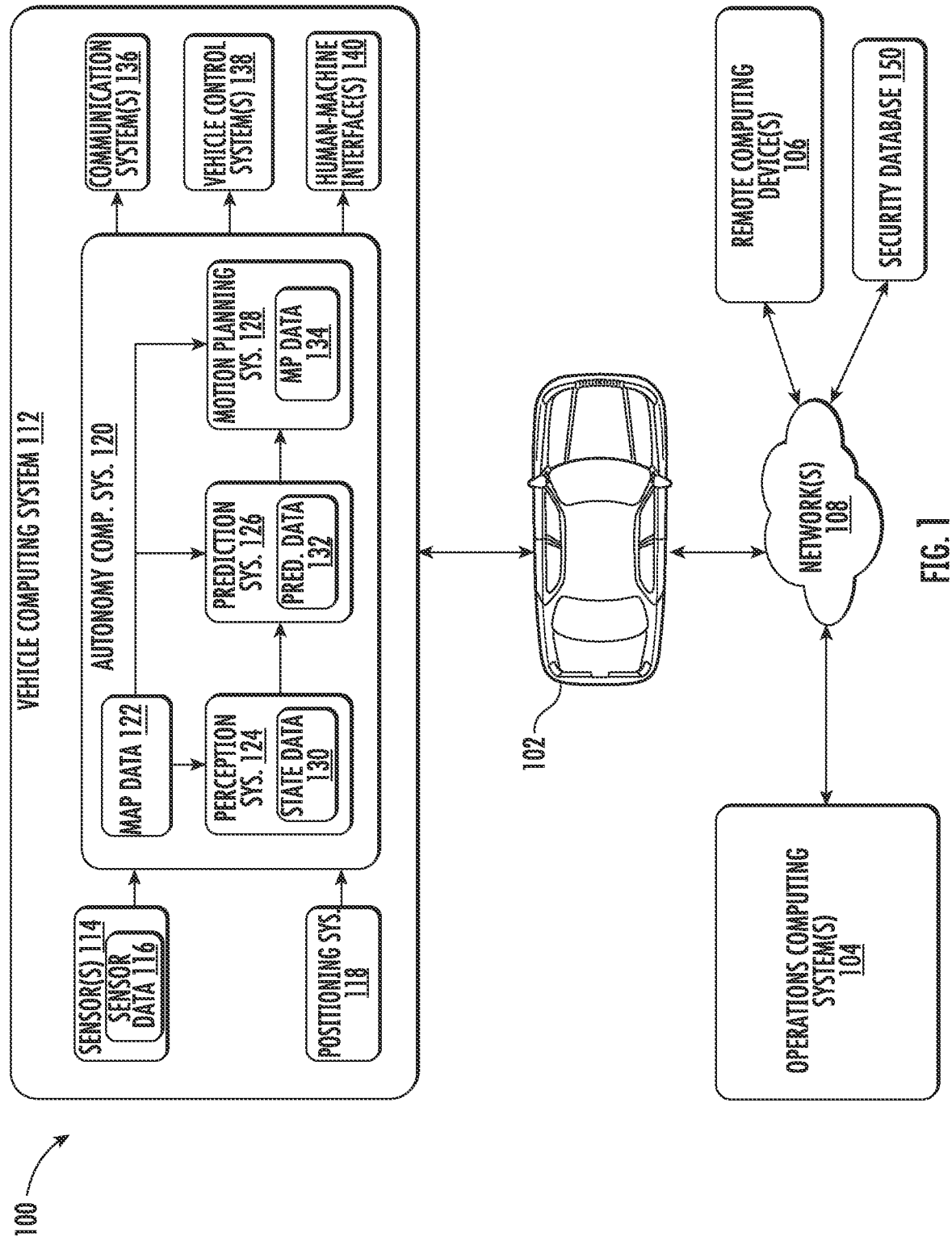
FIG. 1 depicts a diagram of an example system according to example embodiments of the present disclosure.

Aspects of the present disclosure are directed to improved systems and methods for authenticating messages such as, for example, authenticating messages between processes associated with an autonomous vehicle. This can allow for improved and distributed trust among processes of a computing system. For instance, a computing system of an autonomous vehicle can include a plurality of devices (e.g., physically-connected devices, wirelessly-connected devices, virtual devices running on a physical machine, etc.). The computing devices can be associated with, for example, the vehicle's onboard computing system, a laptop/computer utilized by a vehicle operator, an onboard tablet accessible by a rider, etc. Each device can include a compute node configured to run one or more processes. In some implementations, a process can include a plurality of function nodes (e.g., pure functions) connected by one or more directed edges that dictate the flow of data between the plurality of function nodes. A device can execute (e.g., via one or more processors, etc.) a respective plurality of function nodes to run a respective process. The plurality of processes can be collectively configured to perform one or more tasks or services of the computing system. To do so, the plurality of processes can be configured to communicate (e.g., send/receive messages) with each other over one or more communication channels (e.g., wired and/or wireless networks). By way of example, with respect to the vehicle's onboard computing system, its processes (and their respective function nodes) can be organized into a software graph architecture (e.g., including sub-graphs) that can be executed to communicate and perform the operations of the autonomous vehicle (e.g., for autonomously sensing the vehicle's environment, planning the vehicle's motion, etc.).

The computing system can utilize various cryptographic signing techniques to provide security for communications between the plurality of processes. For instance, the computing system can include a master device (e.g., an internal physical and/or virtual device, a master compute node, etc.) configured to authenticate one or more requesting devices (e.g., one or more internal and/or external physical and/or virtual device(s)) and/or one or more processes of the one or more requesting device(s). To do so, the master device can run a master host security service configured to run a certificate authority. The certificate authority can generate a root certificate (e.g., including a public root key) and a private root key (e.g., a secure key corresponding to the public root key) while the autonomous vehicle is starting-up. The root certificate can be associated with the master device in that it can be generated at the master device and/or identify the master device (and/or at least a process running on the master device). The master device can utilize the newly generated root certificate to grant authority, via a signed operational certificate, to a process of the computing system. For example, each device (e.g., the master device, a requesting device, etc.) can include an orchestration service configured to communicate start-up and authorize one or more processes at the respective device. The orchestration service can communicate with a respective process and a respective host security service (e.g., the master host security service, a requesting host security service running on a requesting device, etc.) to obtain an operational certificate for a respective process from the certificate authority running on the master device. For instance, the orchestration service can request a process manifest including a process name, a per-process unique symmetric key, and the root certificate from the respective host security service. The respective process can utilize information from the process manifest to request an operational certificate from the respective host security service. The respective host security service can communicate with the certificate authority to facilitate the request. The certificate authority can grant the operational certificate to the respective process and sign the certificate with the newly generated private root key. After a period of time or an occurrence of an event, the master device can discard the root certificate and private key; respectively, thereby preventing the unlimited authorization of devices and/or processes during the operation of the autonomous vehicle. In this manner, the operational certificates granted to each process can be destroyed after each software run (e.g., by discarding the root certificate and private root key). This, in turn, removes the need for certificate validity windows. In this manner, the integrity of each orchestration service (and processes started by each orchestration service) can be trusted. Moreover, processes can be run in docker containers, such that each process can be run and authorized in isolation.

Moreover, the master device can limit the grant of authority to devices (e.g., physical devices, virtual devices, compute nodes, etc.) known to the computing system. For instance, during the provisioning of the autonomous vehicle, each respective device of the computing system can be assigned a birth certificate. The birth certificate can include a publicly accessible identity certificate unique to the device and an identity private key corresponding to the identity certificate. At start-up, the device (e.g., a process, service, etc. of the device) can request authority from the master device. The request can include a requesting signature encrypted by the identity private key. The master device can utilize the publicly accessible identity certificate to decrypt the signature and identify the device based on the decrypted signature. The master device can authorize the device based on the validity of the signature. In this manner, the computing system can identify and authorize known devices of the computing system to communicate for a limited duration (e.g., during the operation of the autonomous vehicle). Once the specific devices are authorized, the authorization can be passed to the process(es) of that device for message authentication across process(es) (e.g., within that device and/or with the processes of another device). For example, processes running on an onboard tablet can securely communicate with the processes of the autonomous vehicle's computing system to enhance the rider experience (e.g., obtain information from the vehicle for a more detail visualization for the rider).

The following describes the technology of this disclosure within the context of an autonomous vehicle for example purposes only. As described herein, the technology described is not limited to an autonomous vehicle and can be implemented within other robotic and computing systems, such as those managing messages from a plurality of disparate processes.

An autonomous vehicle (e.g., ground-based vehicle, bikes, scooters, and other light electric vehicles, etc.) can include various systems and devices configured to control the operation of the vehicle. For example, an autonomous vehicle can include an onboard vehicle computing system (e.g., located on or within the autonomous vehicle) that is configured to operate the autonomous vehicle. Generally, the vehicle computing system can obtain sensor data from a sensor system onboard the vehicle, attempt to comprehend the vehicle's surrounding environment by performing various processing techniques on the sensor data, and generate an appropriate motion plan through the vehicle's surrounding environment.

More particularly, the autonomous vehicle can include a vehicle computing system with a variety of components for operating with minimal and/or no interaction from a human operator. The vehicle computing system can be located onboard the autonomous vehicle and include one or more sensors (e.g., cameras, Light Detection and Ranging (LIDAR), Radio Detection and Ranging (RADAR), etc.), a positioning system (e.g., for determining a current position of the autonomous vehicle within a surrounding environment of the autonomous vehicle), an autonomy computing system (e.g., for determining autonomous navigation), a communication system (e.g., for communicating with the one or more remote computing systems), one or more vehicle control systems (e.g., for controlling braking, steering, powertrain), a human-machine interface, etc.

The autonomy computing system can include a number of sub-systems that cooperate to perceive the surrounding environment of the autonomous vehicle and determine a motion plan for controlling the motion of the autonomous vehicle. For example, the autonomy computing system can include a perception system configured to perceive one or more objects within the surrounding environment of the autonomous vehicle, a prediction system configured to predict a motion of the object(s) within the surrounding environment of the autonomous vehicle, and a motion planning system configured to plan the motion of the autonomous vehicle with respect to the object(s) within the surrounding environment of the autonomous vehicle.

The vehicle computing system can communicate with a remote computing system such as, for example, an operations computing system and/or one or more remote devices via the communication system onboard the vehicle. The operations computing system can be associated with a service entity that provides one or more vehicle services. The operations computing system can include various sub-systems/back-ends that are configured to perform various functions. For example, the operations computing system can be configured to receive (e.g., via a matching/deployment system back-end) a service request for a vehicle service, determine (e.g., via a routing system back-end) a vehicle route based on the service request, identify (e.g., via a matching/deployment system back-end) the autonomous vehicle to perform at least a portion of the vehicle route, etc.

In addition, or alternatively, the vehicle computing system can communicate with one or more other remote device(s) such as, for example, one or more operator/developer devices associated with one or more vehicle operators (e.g., a laptop located onboard for the vehicle operator), user devices associated with one or more vehicle passengers (e.g., an onboard rider tablet), etc. As used herein, device can refer to any physical device and/or a virtual device such as, for example, compute nodes, a computing blades, hosts, virtual machines, etc.

The computing system of the present disclosure can include any combination of the vehicle computing system, one or more subsystems and/or components of the vehicle computing system, one or more remote computing systems such as the operations computing system, one or more components of the operations computing system, and/or other remote computing devices. For example, each vehicle sub-system can include one or more vehicle device(s) and each remote computing system/device can include one or more remote devices. The plurality of devices of the computing system of the present disclosure can include one or more of the one or more vehicle device(s) (e.g., internal devices) and/or one or more of the remote device(s). This can help formulate the network of devices that are available to the autonomous vehicle.

For instance, the plurality of devices of the present disclosure can include one or more devices configured to communicate over one or more wired and/or wireless communication channels (e.g., wired and/or wireless networks). Each device can be associated with a type, an operating system, and/or one or more designated tasks. A type, for example, can include an indication of the one or more designated tasks of a respective device. The one or more designated tasks, for example, can include performing one or more processes and/or services of the computing system.

Each device of the plurality devices can include and/or have access to one or more processors and/or one or more memories (e.g., RAM memory, ROM memory, cache memory, flash memory, etc.). The one or more memories can include one or more tangible non-transitory computer readable instructions that, when executed by the one or more processors, cause the device to perform one or more operations. The operations can include, for example, executing one or more of a plurality of processes of the computing system. For instance, each device can include a compute node configured to run one or more processes of the plurality of processes. In some implementations, a process can include a plurality of function nodes (e.g., pure functions) connected by one or more directed edges that dictate the flow of data between the plurality of function nodes. A device can execute (e.g., via one or more processors, etc.) a respective plurality of function nodes to run a respective process.

For example, the plurality of function nodes can be arranged in one or more function graphs. A function graph can include a series of function nodes arranged (e.g., by one or more directed edges) in a pipeline, function graph, etc. The function nodes can include a computing function with one or more inputs (e.g., of one or more data types) and one or more outputs (e.g., of one or more data types). For example, the function nodes can be implemented such that they define one or more accepted inputs and one or more outputs. In some implementations, each function node can be configured to obtain one or more inputs of a single data type, perform a single function, and output one or more outputs of a single data type.

The function nodes can be connected by one or more directed edges of a function graph, a subgraph of the function graph, etc. The one or more directed edges can dictate how data flows through the function graph, subgraph, etc. For example, the one or more directed edges can be formed based on the defined inputs and outputs of each of the function nodes of the function graph. Each function graph can include an injector node and an ejector node configured to communicate with one or more remote devices and/or processes outside the function graph. The injector node, for example, can be configured to communicate with one or more devices (e.g., sensor devices, etc.) and/or processes outside the function graph to obtain input data for the function graph. The ejector node can be configured to communicate with one or more devices and/or processes outside the function graph to provide output data of the function graph to the one or more devices and/or processes.

A device can be configured to execute one or more function graphs to run one or more processes of the plurality of processes. For instance, a process can include an executed instance of a function graph and/or a subgraph of a function graph. For example, in some implementations, a function graph can be separated across multiple processes, each process including a subgraph of the function graph. In such a case, each process of the function graph can be communicatively connected by one or more function nodes of the function graph. In this manner, one or more of the plurality of devices can be configured to run a respective process by executing a respective function graph and/or a subgraph of the respective function graph. Thus, each function graph can be implemented as a single process or multiple processes. In some implementations, one or more of the plurality of processes can include containerized services (application containers, etc.). For instance, each process can be implemented as a container (e.g., docker containers, etc.). For example, the plurality of processes can include one or more containerized processes abstracted away from an operating system associated with a respective device.

The plurality of processes (e.g., of each respective device) can be communicatively connected over one or more wireless and/or wired networks. For instance, the plurality of processes can communicate over one or more communication channels. The process(es) can exchange messages over the one or more communicative channels using a message interchange format (e.g., JSON, IDL, etc.). By way of example, each respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system).

To facilitate the transfer of data between each of the plurality of processes, the computing system can include a security infrastructure. The security infrastructure can include, for example, one or more cryptographic signing procedures. For example, the plurality of devices of the computing system can include a master device (e.g., a master compute node) and/or one or more requesting devices (e.g., requesting compute nodes). The master device and/or the one or more requesting devices can include and/or have access to one or more processors and one or more tangible, non-transitory, computer readable media that collectively store instructions that when executed by the one or more processors cause the respective device(s) to perform one or more security operations.

The plurality of devices can be configured to run one or more security services such as a host security service, an orchestration service, etc. The one or more security services (e.g., the orchestration service) can be configured to kick off one or more processes (e.g., by executing one or more function nodes of a respective process) configured to run on a respective device. For instance, the master device can be configured to run an onboard certificate granting service (e.g., a certificate authority, a master host security service, etc.). The onboard certificate granting service can include a plurality of functions configured to carry out one or more authentication tasks. The one or more requesting devices can run another security service (e.g., a requesting host security service) configured to request authorization for one or more processes to communicate with one or more other processes of the computing system. The master device can grant such authorization (e.g., via the certificate authority) and the one or more requesting devices can run and authenticate the one or more processes based on the authorization (e.g., via an orchestration service).

In this manner, the one or more requesting devices can communicate with the master device (via one or more host security services) to authenticate one or more processes of the requesting device. The authenticated processes can communicate with one or more other authenticated processes (e.g., from the requesting device and/or one or more other devices of the computing system) to securely exchange information, commands, etc.

The one or more devices, processes, and/or services can communicate over one or more communication channels (e.g., via local area networks, wide area networks, the Internet, cellular networks, mesh networks, etc.). The one or more channels can include one or more encrypted and/or unencrypted channels. For example, encrypted channels can include one or more secure channels that are resistant to overhearing and/or tampering by outside sources. Unencrypted channels can include one or more insecure channels that can be susceptible to overhearing and/or tampering by outside sources. By way of example, unencrypted channels can enable an outside source to undertake an impermissible use (e.g., device impersonation, network traffic eavesdropping, modify network traffic behavior modification, etc.).

In some implementations, the one or more vehicle devices (e.g., processes, services, etc. thereof) can communicate over an unencrypted channel. The unencrypted channel, for instance, can include gRPC messaging. For instance, the gRPC messaging can be established using gRPC's Insecure Communications Credentials and can be unauthenticated and unencrypted. The master device of the present disclosure can establish secure communications less susceptible to overhearing and/or tampering by granting operational certificates to encrypt and authenticate traffic traversing such channels.

To do so, the master device can identify each of the plurality of device(s) of the computing system based on a device unique public-private key pair. For instance, in some implementations, one or more devices (e.g., vehicle device(s), etc.) of the computing system can include and/or have access to a trusted platform module (e.g., a security computing chip, crypto processor, dedicated microprocessor, etc.) associated with an identity certificate (e.g., a node identity certificate) that identifies the respective device and an identity private key (e.g., a node identity private key) corresponding to the identity certificate. The trusted platform module can include one or more processors and/or memories configured to facilitate secure communications between the one or more devices. By way of example, the trusted platform module can include a random number generator configured to generate one or more unique numbers, strings of letters, strings of numbers and letters, etc., and/or any other type of encryption software/hardware.

The identity certificate and the identity key associated with the trusted platform module can be stored in one or more accessible memories of the respective device (e.g., in one or more memories of the respective device, etc.). The identity certificate can include a public key. The public key can be publicly available to (e.g., accessible by) each device of the computing system and can include a unique number, string of letters, string of numbers and letters, etc. In addition, or alternatively, the identity certificate can include a device unique identifier. The device unique identifier can include the same or different unique number, string of letters, string of numbers and letters, etc. as the public key. The device unique identifier can be utilized by the plurality of devices (and/or processes or services thereof) of the computing system to identify communications from the respective device.

The public key can correspond to the identity private key. For example, the public key can enable a device to decrypt a value encrypted by the identity private key, and/or vice versa (e.g., such as in asymmetric encryption algorithms). The identity private key can include another unique number, string of letters, string of numbers and letters, etc. different from the public key. The identity private key can be kept secret and known only to the respective device (e.g., inaccessible to other devices of the computing system). In this manner, a respective device can securely identify itself to a target device by signing a communication to the target device with the device unique identifier and encrypting the signature with the identity private key. The target device can receive the message and identify the device by decrypting the signature with the public key corresponding to the identity private key.

In some implementations, the identity certificate and corresponding identity private key can be issued to each vehicle device during a provisioning operation (e.g., during the configuration of the respective device). For example, during the provisioning operation a device can receive a device unique birth certificate including the identity certificate and the corresponding identity private key from a security database communicatively connected to the device. The security database can include, for example, one or more servers communicatively connected to one or more devices of the computing system. For example, the security database can include one or more processors configured to perform one or more operations. In addition, the security database can include one or more memories (e.g., one or more tangible, non-transitory computer readable media, etc.) configured to store security information such as for example, device credentials, user credentials, etc.

The provisioning operation can include a period during which one or more devices are programmed and/or added to the vehicle computing system. By way of example, the provisioning operation for an autonomous vehicle can include the development and/or the supplementation of one or more devices (physical devices, virtual devices, etc.) to the autonomous vehicle, vehicle computing system, one or more subsystems of the vehicle computing system, etc.

For instance, during the provisioning operation, an authorized user (e.g., vehicle operator, developer, provisioner, etc.) can authenticate (e.g., via an LDAP, user credentials, etc.) a request to the security database communicatively connected to the device. By way of example, a requesting task at the device can generate a private key (e.g., the identity private key) and an identity certificate including a corresponding public key. The task can issue an authenticated (e.g., by the user credentials) certificate signing request including the identity certificate to the security database. In response, the security database (e.g., a provisioning service of the security database) can authenticate the request, sign the identity certificate, and return the signed identity certificate to the device. The signed identity certificate and the identity private key (e.g., the birth certificate) can be securely stored (e.g., with a trusted platform module, etc.) on one or more memories accessible to the device until the device is reprovisioned (e.g., replaced, updated, etc.). In this manner, each device can include an identity certificate and corresponding identity private key that have a long validity duration (e.g., for the life of the device, until the device requires maintenance, etc.).

Due to the long validity duration, the identity certificate and corresponding identity private key can be limited to establishing the identity of the respective device. To secure communications between the one or more device(s) (e.g., processes and/or services thereof) the computing system can issue operational certificates that are limited in duration. For example, the computing system can be configured to generate new operational certificates for each of the one or more devices at start-up and/or during runtime of the computing system. The operational certificates can authenticate the devices (e.g., processes and/or services thereof) during the operation of the computing system and lose authority after the computing system is deactivated, reset, shut off, etc.

The operational certificates can be issued using an onboard certificate granting authority. For example, the master device of the computing system can include a master host security service configured to run a certificate authority. The master host security service, for instance, can be configured to authenticate one or more processes of the computing system. In some implementations, the certificate authority can run as an operating system service. The certificate authority can be run at one or more times depending on one or more factors. For example, the master device can be configured to run the certificate authority during a start-up operation of the computing system (e.g., an autonomy computing system, a perception computing system, etc.).

In addition, in some implementations, each requesting device of the one or more requesting devices can include a requesting host security service for establishing trust cross-devices. The requesting host security service, for example, can be configured to authenticate one or more requesting processes of a respective requesting device. For instance, each host security service (e.g., master host security service, requesting host security service, etc.) can include the trusted platform module for a respective device. The host security service (e.g., master host security service, requesting host security service, etc.) for each respective vehicle device (master device, requesting device, etc.) can receive process data indicative of one or more processes running on the respective device. For example, as discussed above, a respective orchestration service at a respective device (e.g., master device, requesting device, etc.) can be configured to start one or more processes at the respective device. In some implementations, the respective orchestration service can communicate process data to a respective host security service (e.g., master host security service, requesting host security service, etc.) indicative of one or more respective started processes. In addition, or alternatively, the one or more respective started process can communicate the process data to the respective host security service.

The certificate authority can generate a root certificate and a private root key corresponding to the root certificate. The root certificate, for example, can include a public key corresponding the private root key. The public key can include a publicly accessible string of letters, numbers, and/or letters and numbers. For example, the public key can include a randomly generated (e.g., via a random number generator of a respective trusted platform module) string of letters and/or numbers. The private root key corresponding to the root certificate can include a private string of letters and/or numbers known only to the master device. For example, the private root key can include a randomly generated (e.g., via a random number generator of a respective trusted platform module) string of letters and/or numbers securely stored on one or more memories of the master device. The public key can correspond to the private root key. For example, the public key can enable a device to decrypt a value encrypted by the private root key, and/or vice versa (e.g., such as in asymmetric encryption algorithms).

The master device can sign the root certificate with the corresponding private root key. By way of example, the master device can generate a signature for the root certificate. The signature, for example, can be indicative of the identity of the master device (e.g., a node-identity certificate for the master device, etc.). In this manner, the master device can run a certificate authority that generates a self-signed root certificate and a private root key corresponding to the root certificate.

The master device can utilize the certificate authority to generate and distribute temporary certificates (e.g., operational certificates) to one or more requesting devices of the computing system. For example, the master device can receive a request to initiate an authorization process from at least one requesting device (and/or process) of the computing system. For example, each of the one or more requesting devices (and/or process thereof) can be configured to generate an authorization request and provide the authorization request to the master device during the start-up operation of the computing system.

In some implementations, the master device can be configured to generate a random master key in response to the authorization request. For example, in the event that the master device communicates with the requesting devices via an unencrypted channel, an additional layer of security for the communication can be established using one or more random keys. The random keys, for example, can include randomly generated nonces. Nonces, for instance, can include an arbitrary number included in a communication to identify old communications and prevent replay attacks.

The master device can reply to the authorization request by providing the random master key to the requesting device. The requesting device can receive the random master key and, in response, generate a random requesting key. The random requesting key, for example, can include another arbitrary number randomly generated by the requesting device.

The requesting device can generate a certificate signing request and a private key. The certificate signing request can include an unsigned certificate (e.g., an unauthorized operational certificate) with a public key corresponding to the private key. In addition, the certificate signing request can include a request for a signature from the master device (e.g., the certificate authority of the master device, etc.).

In addition, or alternatively, the certificate signing request can include the identity certificate (e.g., of the birth certificate assigned to the requesting device during provisioning). For example, the certificate signing request can include the public key of the identity certificate corresponding to the identity private key assigned to the device during provisioning. The requesting device can sign the certificate signing request by generating a requesting signature indicative of the requesting device (e.g., a respective device unique identifier) and encrypt the signature with the identity private key (e.g., via one or more encryption algorithms).

The requesting device can provide the certificate signing request, the random master key, and/or the random requesting key to the master device. For example, in some implementations, the requesting device can concatenate the random master key and/or the random requesting key to the certificate signing request. In such a case, the concatenation of the random master key, the random requesting key, and the certificate signing request can be provided to the master device.

The master device can receive, via a communication channel (e.g., an unencrypted communication channel, etc.), the certificate signing request from the requesting device. The certificate signing request, for example, can include the identity certificate and the requesting signature encrypted by the identity private key of the requesting device. In addition, or alternatively, the master device can receive the concatenation of the random master key, the certificate signing request, and/or the random requesting key from the requesting device. In such a case, the master device can determine the validity of the certificate signing request by comparing the random master key and the random requesting key with previous random master and/or requesting keys of past messages. For instance, the master device can determine that the integrity of the message is compromised (e.g., because the message is a duplicate of a past message) in the event that the random master key and the random requesting key of the request matches a previous random master and/or requesting key of a past message. In addition, or alternatively, the master device can verify the integrity of the message in the event that the random master key and the random requesting key do not match any previous random master and/or requesting key of a past message.

The master device can compare the identity certificate to the certificate signing request to validate the requesting signature of the certificate signing request. For example, the master device can decrypt the requesting signature with the public key of the identity certificate. The master device can validate the requesting signature in the event that the master device is able to decrypt the requesting signature with the public key of the identity certificate. For example, a valid decrypted signature can identify the requesting device as one of the plurality of computing devices of the computing system. In this manner, the master device can validate the requesting signature in the event that the signature, after decryption, identifies a computing device of the computing system.

In addition, or alternatively, the master device can compare the identity certificate to the certificate signing request to invalidate the requesting signature of the certificate signing request. For example, the master device can be unable to decrypt the requesting signature with the public key of the identity certificate. For instance, the decrypted signature can identify the requesting device as distinct from the plurality of devices of the computing system. The master device can invalidate the requesting signature in the event that the signature, after decryption, does not identify a device/process of the computing system. The master device can perform one or more security operations in response to invalidating the requesting signature. For example, the master device can ignore the certificate signing request, log an error with one or more memory devices of the computing system, reply to the certificate signing request with the error, etc.

In response to validating the requesting signature, the master device can generate a signed certificate (e.g., an authorized operational certificate) for the requesting device. For example, the signed certificate can include the unsigned certificate (e.g., unauthorized operational certificate) of the certificate signing request signed (e.g., authorized) by the master device. The signed certificate can be generated based on one or more factors such as, for example, the verification, the identity of the requesting device (e.g., the requesting device is an authorized device, etc.), the timing of the request (e.g., before an authorization threshold, etc.), one or more needs of the computing system, etc.

The signed certificate can include identifiable information for the master device. For example, the master device can sign the certificate with a master signature (e.g., respective device unique identifier, etc.) indicative of the identity of the master device. Moreover, in some implementations, the master device can encrypt the master signature with the private root key. In this manner, the signed certificate can include a master signature encrypted by the private root key. In some implementations, the master device can concatenate the certificate with the root certificate and/or the random requesting key. The master device can sign and encrypt the signature of the concatenation in the manner described above.

The master device can provide, via the communication channel, the signed certificate to the requesting device. In addition, or alternatively, the master device can provide, via the communication channel, the concatenation of signed certificate, the root certificate, and the random requesting key to the requesting device. The requesting device can receive, via the communication channel, the signed certificate and/or the concatenation of the signed certificate, the root certificate, and the random requesting key from the master device. In the event of the latter, the requesting device can verify the integrity of the communication by comparing the random requesting key to past communications as described above.

The respective requesting device can authenticate one or more processes using the signed certificate and the corresponding private key. For example, each of the plurality of device(s) (e.g., master device, requesting device, etc.) can include an orchestration service configured to interact with the certificate authority (e.g., via a requesting security service) and create operational certificates for one or more processes (e.g., configured to run on a respective device) of the computing system. By way of example, the master device can include a master orchestration service that can run and authorize (e.g., via the master host security service) one or more processes at the master device (e.g., configured to run at the master device). The master orchestration service can receive the self-signed root certificate and corresponding private root key from the certificate authority of the master device. The service can start a process (e.g., by executing a function of a function graph) at the master device and use the certificate-key pair to issue a per-process certificate (e.g., process operational certificate) for the process. The per-process certificate can authorize the process to communicate with one or more other authorized processes of the computing system (e.g., running on the devices or one or more other devices of the computing system). The per-process certificate can derive authority from the root certificate. In this manner, the per-process certificate issued by the master orchestration service can form an operational certificate chain of authority between the root certificate and the per-process certificate.

In some implementations, the master device (e.g., certificate authority of the master device) can issue a per-process certificate to each vehicle process running on the one or more vehicle computing devices of the computing system. For example, the certificate authority can manage the root certificate and sign certificates for each vehicle process without using intermediate certificates (e.g., certificates issued to an orchestration service of a requesting device). For instance, the certificate authority can generate new keys and certificates following a system reboot (e.g., by turning a vehicle on/off). On startup, the one or more of the vehicle processes can obtain new operational certificates (e.g., per-process certificates) by making an API call to a respective orchestration service. In response, and as discussed in greater detail herein, the respective orchestration service can distribute per-process certificates and corresponding per-process private keys for the one or more vehicle processes.

As an example, each orchestration service (e.g., the master orchestration service, each orchestration service of the one or more requesting devices, etc.) can be communicatively connected to a running host security service. For instance, a requesting orchestration service running on a requesting device can be communicatively connected to a requesting host security service running on the requesting device. As another example, a master orchestration service running on the master device can be communicatively connected to a master host security service running on the master device. By way of example, at start up, each orchestration service (e.g., master orchestration service, requesting orchestration service, etc.) can establish a communicative connection between the master/requesting host security service and the respective orchestration service by opening a protect socket. The protected socket, for example, can be protected by one or more file-system permissions. In this manner, an orchestration service can open a socket to communicate with a local host security service and the socket can be protected from unauthorized access using file-system permissions such that, upon establishing the connection through the socket, the orchestration service can be able to communicate securely with the local host security service.

In some implementations, the master orchestration service can push a global configuration (e.g., for the vehicle computing system) to each requesting orchestration service at start-up.

As discussed above, a respective orchestration service at a respective device (e.g., master device, requesting device, etc.) can be configured to start one or more processes at the respective device. In some implementations, the respective orchestration service (e.g., master orchestration service, requesting orchestration service, etc.) can request a process manifest from a respective host security service (e.g., master host security service, requesting host security service, etc.) before, after, and/or during the start-up of a respective process. The respective host security service, can receive, from the respective orchestration service, the request for the process manifest for the respective process.

The process manifest can include a process name, a manifest key, and the root certificate generated by the certificate authority of the master host security service (e.g., at the master device). The process name, for example, can include a process-specific identifier corresponding the respective process. For instance, in some implementations, the vehicle computing system can be configured to run a finite number of processes. In such a case, the master host security service can include and/or have access to a process name for each vehicle process configured to run on the vehicle computing system. The manifest key can include a shared cryptographic key that can be used to encrypt and decrypt one or more messages (e.g., in accordance with one or more symmetric signing techniques). In addition, or alternatively, the manifest key can include an asymmetric cryptographic key that can be used to encrypt and decrypt one or more messages (e.g., in accordance with one or more asymmetric signing techniques).

The respective host security service can generate the process manifest for the respective process. For example, in the event that the respective host security service is a requesting host security service (e.g., the respective process is a requesting process running on a requesting device), the requesting host security service can receive the root certificate from the master host security service. In addition, the respective host security service can generate a manifest signature for the process manifest using an asymmetric manifest key generated by a trusted platform module of the respective device. The respective host security service can sign the process manifest with the manifest signature and send the process manifest to the respective orchestration service. The respective orchestration service can write the process manifest to a memory location associated with the process.

By way of example, the respective process can include a containerized process configured to run in a software container. The software container can be assigned one or more computing resources of the computing system (e.g., one or more processors (and/or portions thereof) and/or one or more memories (and/or portions thereof) of a respective device (e.g., master device, requesting device, etc.). In such a case, the memory location associated with the respective process can include a portion of the one or more tangible, non-transitory, computer readable media that is assigned to the software container. For example, the respective orchestration service can modify a container of the respective process (e.g., a container within which the process is run) by placing the process manifest (e.g., as signed by the respective host security service) in a known location on the file system. Upon receipt of the process manifest, the container can have the information necessary to authenticate the process to the respective host security service.

The respective process can open the process manifest and verify the manifest signature using a trusted platform certificate of the respective device. By way of example, the trusted platform certificate can be rooted in an offboard certificate authority associated with the trusted platform module of the respective device. In the event that the manifest signature is verified, the process can generate a process certificate signing request and a per-process private key corresponding to the process certificate signing request. The process can generate a process signature using the manifest key and sign the process certificate signing request with the process signature. The process can communicate the process certificate signing request to the respective host security service.

The respective host security service can receive the process certificate signing request and, in response, verify the process certificate signing request using the symmetric key corresponding to the manifest key (e.g., in accordance with one or more symmetric signing techniques, asymmetric signing techniques, etc.). In the event that the process certificate signing request is verified, the respective host security service obtain a signed process certificate.

For example, in the event that the respective host security service is the master host security service (e.g., the respective process is a process running on the master device) the master host security service can request the certificate authority (e.g., running on the master host security service) to issue a process certificate for the respective process. The signed process certificate can be generated by the certificate authority. For example, the certificate authority can generate a process certificate for the respective process. In addition, or alternatively, the certificate authority can generate a master signature for the process certificate using the private root key corresponding to the root certificate and sign the process certificate with the master signature.

In the event that the respective host security service is the requesting host security service (e.g., the respective process is a requesting process running on the requesting device) the requesting process can communicate the process certificate signing request to the requesting host security service. In some implementations, the requesting host security service can sign the process certificate signing request using a public key (e.g., of an asymmetric cert-key pair) from a respective trusted platform module of the respective requesting device (e.g., an identity certificate of the requesting device). The requesting host security service can communicate the process certificate signing request and, in some implementations, the signature to the master host security service. The master host security service can receive the process certificate signing request. The master host security service can verify the signature and forward the process certificate signing request to the certificate authority. In response to verifying the process certificate signing request, the certificate authority (e.g., running on the master host security service) can generate a signed process certificate for the requesting process. For example, the certificate authority can generate a process certificate for the requesting process. In addition, or alternatively, the certificate authority can generate a master signature for the process certificate using the private root key corresponding to the root certificate and sign the process certificate with the master signature. The master host security service can communicate the signed process certificate to the requesting host security service and the requesting host security service can forward the signed process certificate to the requesting process.

In some implementations, before communicating the signed process certificate, the master host security service can sign a message including the signed process certificate with a public key associated with a trusted platform module of the master device (e.g., an identity certificate of the master device). In such a case, the requesting host security service can verify the signature before forwarding the signed process certificate to the requesting process.

The respective process can receive the signed process certificate from the requesting host security service. The respective process can verify the process certificate by comparing the root certificate generated by the certificate authority and included in the process manifest to the master signature. In this manner, the respective process can verify that the process certificate was signed correctly using the certificate authority's root certificate provided in the process manifest. Once the respective process has obtained the process certificate, the certificate can be used to establish the identity of the respective process with other processes.

As another example, a requesting orchestration service of a requesting device can obtain a signed certificate (e.g., an intermediate certificate) from the certificate authority of the master device as described above. The requesting device (e.g., the orchestration service of the requesting device) can be configured to authenticate at least one process of the requesting device by generating a signed per-process certificate and a per-process private key corresponding to the signed per-process certificate. For example, the requesting orchestration service can start a process (e.g., by executing a function node of a function graph, function subgraph, etc.) and generate a per-process certificate and per-process private key for the process. The per-process certificate can include a unique process identifier and/or a public key corresponding to the per-process private key. For instance, the public key of the per-process certificate can be configured to decrypt a value encrypted by the per-process private key, and/or vice versa. The requesting orchestration service can sign the per-process certificate and encrypt the signature using the private key. In this manner, a signed per-process certificate can be generated that includes a process signature encrypted by the private key.

The requesting orchestration service can make the per-process certificate and per-process private key available to the process. For instance, the certificate-key pair can be provided to the process after the process is started. To do so, for example, the requesting orchestration service can write to a portion of memory associated with the process. For example, the portion of memory associated with the process can include a portion of memory of the device that is devoted to an application container associated with the process. By way of example, the portion of the memory can only be readable (e.g., ROM memory) by the process (e.g., through one or more permissions, etc.). The per-process certificate can authorize the process to communicate and/or authorize one or more other processes of the computing system. The per-process certificate of the requesting device can derive authority from the certificate; which, in turn, can derive its authority from the root certificate. In this manner, the per-process certificate issued by the requesting orchestration service can form an operational certificate chain of authority linked back to the root certificate of the master device by an intermediate certificate (e.g., the certificate) granted to the requesting device.

The master device can be configured to discard the certificate authority based on one or more temporal and/or event based factors. By way of example, the master device can discard the certificate authority after a time period. For example, the master device can be associated with a first authorization time threshold. The first authorization time threshold can include a period of time after the start-up of the computing system within which the master device can grant operational certificates (e.g., per-device, per-process, etc.). The first authorization time threshold can include a predetermined time (e.g., previously set for each start-up operation based on one or more factors) and/or a dynamic time (e.g., determined at start-up based on one or more factors).

At start-up, the master device can begin measuring (e.g., via one or more timing devices onboard the master device) an elapsed time after the generation of the certificate authority. The master device can compare the elapsed time to the first authorization time threshold to determine whether the elapsed time has reached and/or exceeds the first authorization time threshold. The master device can discard the certificate authority based on the comparison of the elapsed time to the first authorization time threshold. For example, the master device can determine that the elapsed time has reached and/or exceeds the first authorization time threshold and, as a result, discard the certificate authority.

In addition, or alternatively, the master device can discard the certificate authority based on the occurrence of one or more events. For example, the master device can be configured to detect an occurrence of a first event associated with the computing system. The first event, for example, can include a vehicle state change (e.g., parking mode, driving mode, autonomous mode, etc.), one or more computing device state changes (e.g., secured, unsecured, etc.), receiving a notification (e.g., from an operations computing system, an operator, etc.), etc. The first event can include one specific event and/or a plurality of events. The master device can detect the first event and discard the certificate authority based, at least in part, on the occurrence of the first event. In the event that the first event includes a plurality of events, the master device can be configured to discard the certificate authority based the occurrence of one or more of the plurality of events.

In addition, or alternatively, the requesting device can be configured to discard the private key based on one or more temporal or event based factors. By way of example, the requesting device can discard the private key after a time period indicated by a second authorization time threshold. The second authorization time threshold can be the same or different from the first authorization time threshold. For instance, the second authorization time threshold can include a period of time after the start-up of the computing system within which the requesting device can grant operational certificates (e.g., per-process, etc.). The second authorization time threshold can include a predetermined time (e.g., previously set for each start-up operation based on one or more factors) and/or a dynamic time (e.g., determined at start-up based on or more factors).

At start-up and/or after receiving the signed certificate, the requesting device can begin measuring (e.g., via one or more timing devices onboard the requesting device) an elapsed time. The requesting device can compare the elapsed time to the second authorization time threshold to determine whether the elapsed time has reached and/or exceeds the second authorization time threshold. The requesting device can discard the private key based on the comparison of the elapsed time to the second authorization time threshold. For example, the requesting device can determine that the elapsed time has reached and/or exceeds the second authorization time threshold and, as a result, discard the private key.

In addition, or alternatively, the requesting device can discard the private key based on the occurrence of one or more events. For example, the requesting device can be configured to detect an occurrence of a second event associated with the computing system. The second event, for example, can include one or more of the same and/or different events from the first event. The second event can include a vehicle state change (e.g., parking mode, driving mode, autonomous mode, etc.), one or more computing device state changes (e.g., secured, unsecured, etc.), receiving a notification (e.g., from the master device, an operations computing system, an operator, etc.), etc. The second event can include one specific event and/or a plurality of events. The requesting device can detect the second event and discard the private key based, at least in part, on the occurrence of the second event. In the event that the second event includes a plurality of events, the requesting device can be configured to discard the private key based the occurrence of one or more of the plurality of events.

In this manner, the computing system reduce the grant of authority issued by the master device and/or the requesting device to a limited duration. For example, the master device can be prevented from signing a certificate and/or per-process certificate without the certificate authority because the master device will no longer have access to the private root key needed to encrypt the signature of the certificate. In addition, or alternatively, the requesting device can be prevented from signing a per-process certificate without the private key as the requesting device will no longer have access to the private key needed to encrypt the signature of the per-process certificate. This can prevent the unlimited issuing of certificates.

As discussed above, the plurality of devices can include one or more vehicle devices and one or more remote devices. In some implementations, the master device can include at least one vehicle device and the requesting device can include at least one remote device. The one or more remote devices can be new to the computing system and, consequently, never undergo a provisioning operation. Thus, the remote device can fail to include a birth certificate (e.g., an identity certificate, identity private key, etc.), such as one issued to one or more vehicle devices during the provisioning operation. In such a case, the master device can utilize a modified process to issue an operational certificate to the remote device. The modified process can grant an operational certificate to the remote device based on one or more other primitives. The operational certificate can be utilized to authorize one or more processes of the remote device (e.g., configured to run on the remote device) to communicate with the one or more vehicle devices and/or other authorized remote devices.

By way of example, a remote device can receive a remote key-cert pair from the security database. The security database, for example, can include one or more remote server computing devices communicatively coupled to the remote device and the master device. The one or more remote server computing devices can include and/or have access to one or more processors and one or more tangible, non-transitory, computer readable media that collectively store instructions that when executed by the one or more processors cause the one or more remote server computing devices to perform operations. The security database can be associated with one or more users (e.g., users, operators/developers of a service provider, etc.). For example, the security database can include a user directory including information for the plurality of users (e.g., user identity, credentials, LDAP, etc.).

The remote device can include and/or be a component of a user device associated with one or more users (e.g., users, operators/developers of a service provider, etc.). The one or more users can include an authorized user associated with user credentials included in the user directory of the security database. The user device can receive the user credentials from the authorized user (e.g., via one or more user interfaces) and provide the user credentials to the security database. By way of example, the user device can establish a network connection (e.g., a wireless connection, an HTTP connection, etc.) with one or more offboard services running on the security database. The user device can provide the user credentials over the network connection.

The security database can receive the user credentials and compare the user credentials to the user directory to verify that the user device is associated with an authorized user. The security database can determine that the user device is authenticated based on the user credentials. In addition, or alternatively, the security database can initiate one or more additional verification procedures (e.g., a DUO 2FA request, etc.).

The security database can generate a user token indicative of the authorized user for the user device in response to determining that the user device is associated with the authorized user. The user token can be provided to the user device over the network connection and the user device can store the user token on one or memories of the user device. The user device can utilize the user token to obtain data from the security database. For example, the user token can be included in communications with the security database to authorize the messages of the user device to access one or more processes and/or data of the security database.

For example, the user device can communicate with the security database to retrieve a remote key-cert pair that can be used to communicate with the master device. The remote key-cert pair, for example, can include a remote-identity certificate including a public key corresponding to a remote-identity private key. By way of example, the public key can enable a device to decrypt a value encrypted by the remote-identity private key, and/or vice versa (e.g., such as in asymmetric encryption algorithms).

The user device can store the remote key-cert pair in one or more memories of and/or accessible to the user device. For example, the user device can include a short-term memory such as, for example, a random access memory (e.g., RAM). The user device can store the remote key-cert pair in the random access memory during a user session between the user device and the master device. In this manner, remote key-cert pair can be cached in memory to be used in the event that the certificate granting authority of the master device is discarded before a user session between the master device and the user device is reset.

The user device can establish a user session between the user device and the master device during which the user device can be configured to communicate with the master device. For instance, during the user session, the user device can establish a communication channel with the master device based on the remote key-cert pair. The communication channel can include, for example, a mutually authenticated and encrypted gRPC channel between the user device and the certificate authority of the master device. The communication channel can be established using one or more cryptographic techniques (e.g., symmetric signing algorithms, asymmetric signing algorithms, etc.) and can enable secure communication between the user device and the certificate authority of the master device. In some implementations, the user device can detect the termination of the user session and discard the remote cert-key pair in response to the termination of the user session.

The user device can generate a remote private key and a remote certificate signing request associated with the remote private key. For example, the remote certificate signing request can include the remote-identity certificate, an unsigned remote certificate, and a signature encrypted by the remote-identity private key. The user device can provide, via the communication channel, the remote certificate signing request to the master device.

In response, the master device (e.g., the certificate authority of the master device) can sign the unsigned remote certificate. For example, the master device can generate the signed remote certificate by signing the unsigned remote certificate with the private root key. In this way, the signed remote certificate can include a master signature encrypted by the private root key of the master device. The user device can receive, via the communication channel, the signed remote certificate and the root certificate of the master device from the master device.

The user device can communicate with the plurality of devices of the computing system using the signed remote certificate. For example, the user device can provide a message including the signed remote certificate to at least one of the one or more vehicle computing devices of the computing system. The at least one vehicle computing device can be configured to authenticate the message based, at least in part, on the signed remote certificate. By way of example, the user device can execute one or more remote processes and authorize each remote process using the signed remote certificate (e.g., in the manner described above with respect to vehicle devices). The authorized remote process can send and/or receive messages to/from one or more other authorized process (e.g., vehicle process, other remote processes, etc.) using the signed remote certificate (e.g., a process operational certificate derived from the signed remote certificate).

Example aspects of the present disclosure can provide a number of improvements to computing technology such as, for example, vehicle communications technology. For instance, the systems and methods of the present disclosure provide an improved approach for authenticating messages between a plurality of vehicle and remote devices, and the processes running thereon. For example, a computing system can include a master device and one or more requesting devices. Each requesting device of the one or more requesting devices can include a trusted platform module associated with an identity certificate and an identity private key. The identity certificate can identify the respective requesting device. During the start-up of the vehicle, the master device can be configured to generate a certificate authority including a root certificate and a private root key corresponding to the root certificate. The master device can receive, via a communication channel, a certificate signing request from the respective requesting device. The certificate signing request, for example, can include the identity certificate and a requesting signature encrypted by the identity private key. The master device can compare the identity certificate to the certificate signing request to validate the requesting signature. In response to validating the requesting signature, the master device can generate a signed certificate for the respective requesting device. The signed certificate can include a master signature encrypted by the private root key. The master device can provide, via the communication channel, the signed certificate to the respective requesting device, which can utilize the signed certificate to authorize one or more processes of the requesting device. By generating a new certificate authority and reauthenticating each device during each start-up operation of the vehicle, the computing system can avoid problems inherent in security systems such as reuse. The systems and methods of the present disclosure can be practically applied to any computing system to increase the security of network communications between component devices of the computing system. This, in turn, can increase the speed and efficiency of computing systems in general by increasing confidence in authorized communications between component devices of the computing systems. Ultimately, the communication techniques disclosed herein result in more secure communications between devices and/or processes of a vehicle computing system; thereby, improving the security of the computing system and autonomous vehicles.

Furthermore, although aspects of the present disclosure focus on the application of computer security techniques described herein to devices and/or processes of autonomous vehicles, the systems and methods of the present disclosure can be used to authorize communications between any devices of any computing system.

Various means can be configured to perform the methods and processes described herein. For example, a computing system can include data obtaining unit(s), root unit(s), manifest unit(s), signing unit(s), data providing unit(s), process authentication unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., root unit(s), etc.) can be configured to generate, by the master host security service, a root certificate and a private root key corresponding to the root certificate. The means (e.g., data obtaining unit(s), etc.) can be configured to receive, from an orchestration service, a request for a process manifest for a process of a device. For instance, the (e.g., manifest unit(s), etc.) can be configured to generate a process manifest for the process based on the root certificate. The process manifest can include a process name, a manifest key, and the root certificate. The means (e.g., signing unit(s), etc.) can be configured to sign the process manifest with a manifest signature. The means (e.g., data providing unit(s), etc.) can be configured to write, by the orchestration service, the process manifest to a memory location associated with the process. And, the means (e.g., process authentication unit(s), etc.) can be configured to obtain a signed process certificate from a master host security service and authenticate a message from a process using the signed process certificate.

With reference now to FIGS. 1-18, example embodiments of the present disclosure will be discussed in further detail. FIG. 1 depicts an example system 100 overview according to example implementations of the present disclosure. More particularly, FIG. 1 illustrates a vehicle 102 (e.g., an autonomous vehicle, etc.) including various systems and devices configured to control the operation of the vehicle. For example, the vehicle 102 can include an onboard vehicle computing system 112 (e.g., located on or within the vehicle) that is configured to operate the vehicle 102. Generally, the vehicle computing system 112 can obtain sensor data 116 from a sensor system 114 onboard the vehicle 102, attempt to comprehend the vehicle's surrounding environment by performing various processing techniques on the sensor data 116, and generate an appropriate motion plan 134 through the vehicle's surrounding environment.

As illustrated, FIG. 1 shows a system 100 that includes the vehicle 102; a communications network 108; an operations computing system 104; one or more remote computing devices 106; the vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; a human-machine interface 140; and a security database 150.

The operations computing system 104 can be associated with a service provider that can provide one or more vehicle services to a plurality of users via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 102 and/or its users to coordinate a vehicle service provided by the vehicle 102. To do so, the operations computing system 104 can communicate with the one or more remote computing devices 106 and/or the vehicle 102 via one or more communications networks including the communications network 108. The communications network 108 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including sending and/or receiving data or signals to and from the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices. The remote computing device(s) 106 can be remote from the vehicle computing system 112. The remote computing device(s) 106 can include, for example, one or more operator/developer devices associated with one or more vehicle operators (e.g., a laptop located onboard for the vehicle operator), user devices associated with one or more vehicle passengers (e.g., an onboard rider tablet), etc. As used herein, device can refer to any physical device and/or a virtual device such as, for example, compute nodes, a computing blades, hosts, virtual machines, etc. One or more of the devices can receive input and/or instructions from a user or exchange signals or data with an item or other computing device or computing system (e.g., the operations computing system 104).

In some implementations, the one or more remote computing devices 106 can be used to determine and/or modify one or more states of the vehicle 102 including a location (e.g., a latitude and longitude), a velocity, an acceleration, a trajectory, a heading, and/or a path of the vehicle 102 based in part on signals or data exchanged with the vehicle 102. In some implementations, the operations computing system 104 can include the one or more remote computing devices 106.

In some implementations, the system 100 can include a security database 150. The security database 150 can include, for example, one or more servers communicatively connected to one or more devices (e.g., remote computing devices 106, one or more remote devices of the operations computing system 104, one or more vehicle device of the vehicle computing system 112, etc.) of the computing system 100. For example, the security database 150 can include one or more processors configured to perform one or more operations. In addition, the security database 150 can include one or more memories (e.g., one or more tangible, non-transitory computer readable media, etc.) configured to store security information such as for example, device credentials, user credentials, etc. For instance, the security database 150 can be associated with one or more users (e.g., users, operators/developers of a service provider, etc.) and/or include one or more user directories including information for the plurality of users (e.g., user identity, credentials, LDAP, etc.). As discussed in further detail here, the security database 150 can be configured to generate and/or otherwise proved one or more unique device credentials to one or more devices of the computing system 100.

The vehicle 102 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 102 can be an autonomous vehicle that can perform various actions including driving, navigating, and/or operating, with minimal and/or no interaction from a human driver. The vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. As discussed in further detail with reference to FIG. 2, the one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 102 (e.g., its computing system, one or more processors, and other devices in the vehicle 102) to perform operations and/or functions, including those described herein for authenticating messages between processes associated with the vehicle computing system 112. Furthermore, the vehicle computing system 112 can perform one or more operations associated with the control, exchange of data, and/or operation of various devices and systems including robotic devices and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 102 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 102) various parts of the vehicle 102 including a front side, rear side, left side, right side, top, or bottom of the vehicle 102. The sensor data 116 can be indicative of locations associated with the one or more objects within the surrounding environment of the vehicle 102 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing devices 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 102 around the current and/or predicted locations of one or more objects detected by the one or more sensors 114. The autonomy computing system 120 can control the one or more vehicle control systems 138 to operate the vehicle 102 according to the motion plan.

The autonomy computing system 120 can identify one or more objects that are proximate to the vehicle 102 based at least in part on the sensor data 116 and/or the map data 122. For example, the perception system 124 can obtain state data 130 descriptive of a current and/or past state of an object that is proximate to the vehicle 102. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128. In some implementations, the perception and prediction systems 124, 126 (and/or other systems) can be combined into one system and share computing resources.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction generator model. For example, the prediction system 126 can receive state data 130 (e.g., from the perception system 124) associated with one or more objects within the surrounding environment of the vehicle 102. The prediction system 126 can input the state data 130 (e.g., BEV image, LIDAR data, etc.) into the machine-learned prediction generator model to determine trajectories of the one or more objects based on the state data 130 associated with each object. For example, the machine-learned prediction generator model can be previously trained to output a future trajectory (e.g., a future path, one or more future geographic locations, etc.) of an object within a surrounding environment of the vehicle 102. In this manner, the prediction system 126 can determine the future trajectory of the object within the surrounding environment of the vehicle 102 based, at least in part, on the machine-learned prediction generator model.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back passenger seat). For example, the autonomy computing system 120 can provide one or more outputs including a graphical display of the location of the vehicle 102 on a map of a geographical area within one kilometer of the vehicle 102 including the locations of objects around the vehicle 102. A passenger of the vehicle 102 can interact with the one or more human-machine interfaces 140 by touching a touch-screen display device associated with the one or more human-machine interfaces to indicate, for example, a stopping location for the vehicle 102.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 102. For example, the vehicle computing system 112 can send one or more control signals to activate one or more vehicle systems that can be used to control and/or direct the travel path of the vehicle 102 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 102 (e.g., auditory and/or visual messages about the state or predicted state of objects external to the vehicle 102); braking systems; propulsion systems that can be used to change the acceleration and/or velocity of the vehicle which can include one or more vehicle motor or engine systems (e.g., an engine and/or motor used by the vehicle 102 for locomotion); and/or steering systems that can change the path, course, and/or direction of travel of the vehicle 102.

The following describes the technology of this disclosure within the context of an autonomous vehicle for example purposes only. As described herein, the technology of the present disclosure is not limited to an autonomous vehicle and can be implemented within other robotic and/or other computing systems, such as those managing messages from a plurality of disparate processes.

As an example, the system 100 of the present disclosure can include any combination of the vehicle computing system 112, one or more subsystems and/or components of the vehicle computing system 112, one or more remote computing systems such as the operations computing system 104, one or more components of the operations computing system 104, and/or other remote computing devices 106. For example, each vehicle sub-system can include one or more vehicle device(s) and each remote computing system/device can include one or more remote devices. The plurality of devices of the system 100 can include one or more of the one or more vehicle device(s) (e.g., internal devices) and/or one or more of the remote device(s).

The one or more vehicle device(s) can include a master device and/or the one or more requesting devices. Each device can include and/or have access to one or more processors and one or more tangible, non-transitory, computer readable media that collectively store instructions that when executed by the one or more processors cause the respective device(s) to perform one or more security operations. This can help formulate the network of devices that are available to the autonomous vehicle.

As will be discussed in further detail with reference to FIGS. 2-6 and 11-16, the plurality of devices can be configured to run one or more security services such as a host security service, an orchestration service, etc. The one or more security services (e.g., the orchestration service) can be configured to kick off one or more processes (e.g., by executing one or more function nodes of a respective process) configured to run on a respective device. The master device can be configured to run an onboard certificate granting service (e.g., a certificate authority, a master host security service, etc.). The onboard certificate granting service can include a plurality of functions configured to carry out one or more authentication tasks. The one or more requesting devices can run another security service (e.g., a requesting host security service) configured to request authorization for one or more processes to communicate with one or more other processes of the computing system 100. The master device can grant such authorization (e.g., via the certificate authority) and the one or more requesting devices can run and authenticate the one or more processes based on the authorization (e.g., via an orchestration service).

In this manner, the one or more requesting devices can communicate with the master device (via one or more host security services) to authenticate one or more processes of the requesting device. The authenticated processes can communicate with one or more other authenticated processes (e.g., from the requesting device and/or one or more other devices of the computing system 100) to securely exchange information, commands, etc.

For instance, the one or more devices, processes, and/or services can communicate over one or more communication channels (e.g., via local area networks, wide area networks, the Internet, cellular networks, mesh networks, etc.). The one or more channels can include one or more encrypted and/or unencrypted channels. For example, encrypted channels can include one or more secure channels that are resistant to overhearing and/or tampering by outside sources. Unencrypted channels can include one or more insecure channels that can be susceptible to overhearing and/or tampering by outside sources. By way of example, unencrypted channels can enable an outside source to undertake an impermissible use (e.g., device impersonation, network traffic eavesdropping, modify network traffic behavior modification, etc.). In some implementations, the one or more of the plurality of devices (e.g., processes, services, etc. thereof) of the system 100 of the present disclosure can communicate over an unencrypted channel. The unencrypted channel, for instance, can include gRPC messaging. For instance, the gRPC messaging can be established using gRPC's Insecure Communications Credentials and can be unauthenticated and unencrypted. A master device of the present disclosure can establish secure communications less susceptible to overhearing and/or tampering by granting operational certificates to encrypt and authenticate traffic traversing such channels.

Figure 2A:
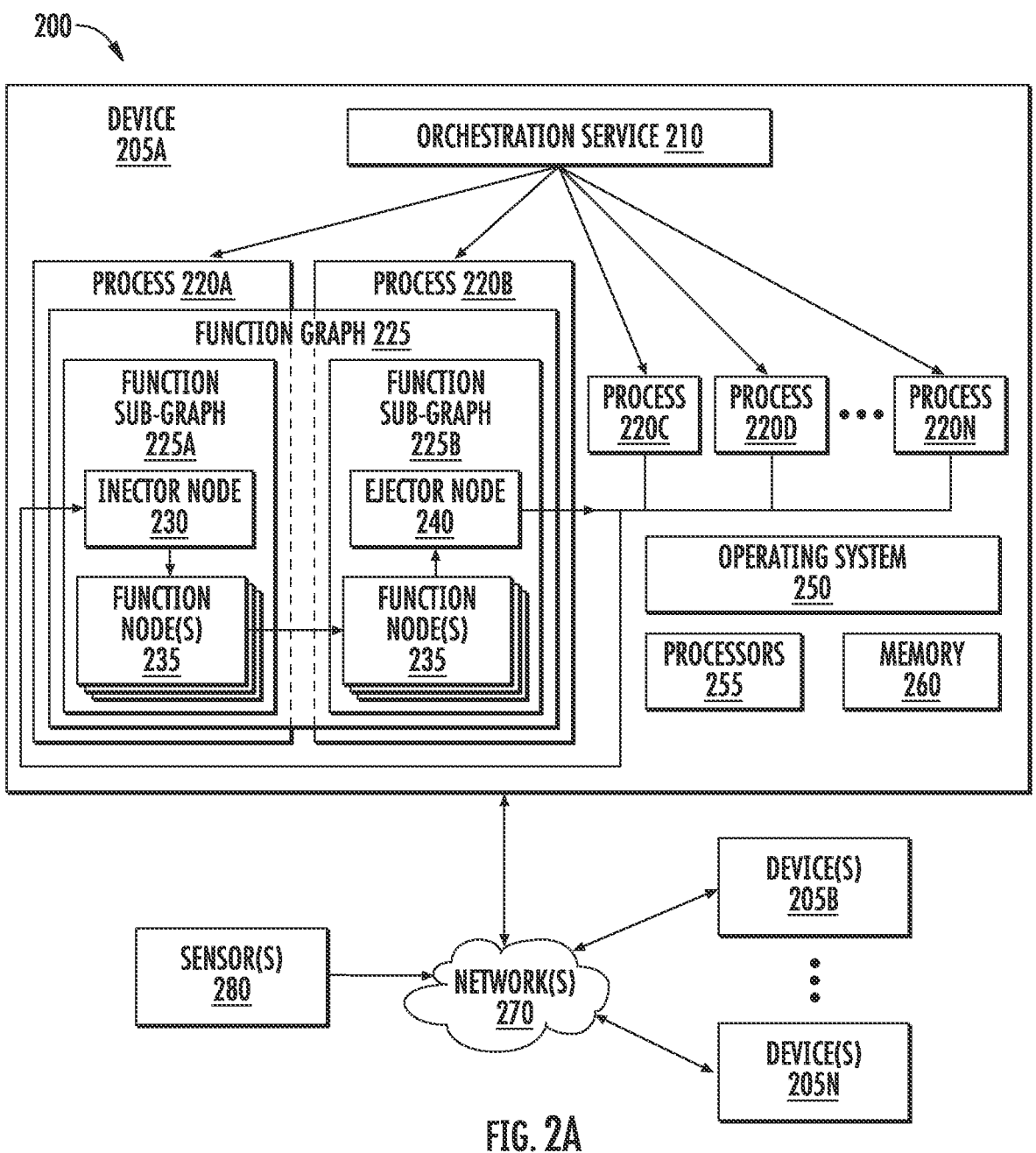
FIG. 2A depicts a diagram of an example system including a plurality of devices according to example implementations of the present disclosure.

FIG. 2A depicts a diagram of an example computing system 200 including one or more of the plurality of devices (e.g., plurality of devices 205A-N) of the system of the present disclosure. The plurality of devices 205A-N can include one or more devices configured to communicate over one or more wired and/or wireless communication channels (e.g., wired and/or wireless networks). Each device (e.g., 205A) can be associated with a type, an operating system 250, and/or one or more designated tasks. A type, for example, can include an indication of the one or more designated tasks of a respective device 205A. The one or more designated tasks, for example, can include performing one or more processes 220A-N and/or services of the computing system 200.

Each device 205A of the plurality of devices 205A-N can include and/or have access to one or more processors 255 and/or one or more memories 260 (e.g., RAM memory, ROM memory, cache memory, flash memory, etc.). The one or more memories 260 can include one or more tangible non-transitory computer readable instructions that, when executed by the one or more processors 255, cause the device 205A to perform one or more operations. The operations can include, for example, executing one or more of a plurality of processes of the computing system 200. For instance, each device 205A can include a compute node configured to run one or more processes 220A-N of the plurality of processes.

For example, the device 205A can include an orchestration service 210. The orchestration service 210 can include a start-up process of the device 205A. The orchestration service 210, for example, can include an operating system service (e.g., a service running as part of the operating system 250). In addition, or alternatively, the orchestration service can include a gRPC service. The device 205A can run the orchestration service 210 to configure and start processes 220A-220N of the device 205A. In some implementations, the orchestration service 210 can include a primary orchestrator and/or at least one of a plurality of secondary orchestrators. For example, each respective device of the plurality of devices can include at least one of the plurality of secondary orchestrators. The primary orchestrator can be configured to receive global configuration data and provide the global configuration data to the plurality of secondary orchestrators. The global configuration data, for example, can include one or more instructions indicative of the one or more designated tasks for each respective device(s) 205A-N, a software version and/or environment on which to run a plurality of processes (e.g., 220A-220N of the device 205A) of the computing system 200, etc. A secondary orchestrator for each respective device can receive the global configuration data and configure and start one or more processes at the respective device based on the global configuration data.

For instance, each process (e.g., process 220A, 220B) can include a plurality of function nodes 235 (e.g., pure functions) connected by one or more directed edges that dictate the flow of data between the plurality of function nodes 235. Each device 205A can execute (e.g., via one or more processors, etc.) a respective plurality of function nodes 235 to run a respective process 220A, 220B. For example, the plurality of function nodes 235 can be arranged in one or more function graphs 225. A function graph 225 can include a series of function nodes 235 arranged (e.g., by one or more directed edges) in a pipeline, graph architecture, etc.

Figure 2B:
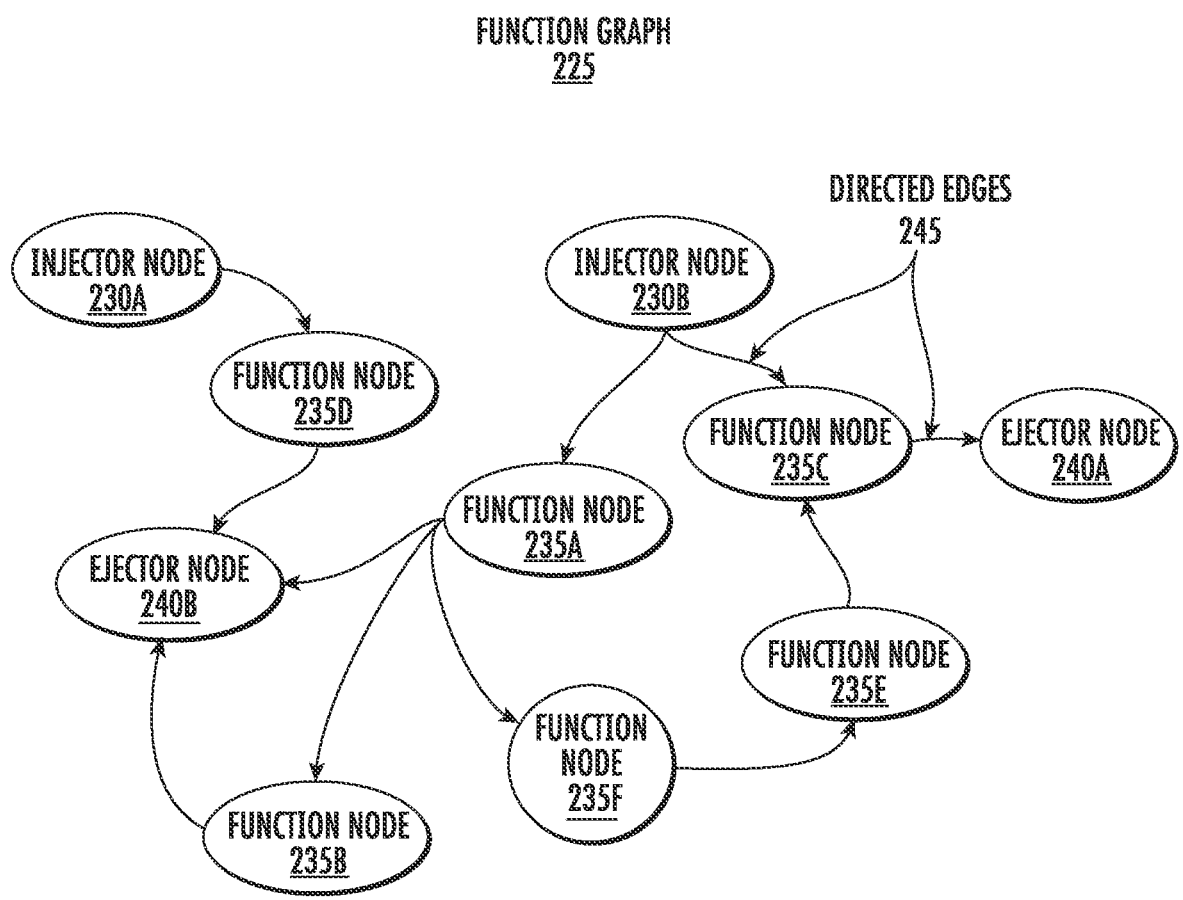
FIG. 2B depicts a diagram of an example functional graph according to example implementations of the present disclosure.

For example, with reference to FIG. 2B, FIG. 2B depicts a diagram of an example functional graph 225 according to example implementations of the present disclosure. The function graph 225 can include a plurality of function nodes 235A-F, one or more injector nodes 230A-B, one or more ejector nodes 240A-B, and/or one or more directed edges 245. The function nodes 235A-F can include one or more computing functions with one or more inputs (e.g., of one or more data types) and one or more outputs (e.g., of one or more data types). For example, the function nodes 235A-F can be implemented such that they define one or more accepted inputs and one or more outputs. In some implementations, each function node 235A-F can be configured to obtain one or more inputs of a single data type, perform one or more functions on the one or more inputs, and output one or more outputs of a single data type.

The function nodes 235A-F can be connected by one or more directed edges 245 of the function graph 225 (and/or a subgraph 225A, 225B of the function graph 225 with reference to FIG. 2A). The one or more directed edges 245 can dictate how data flows through the function graph 225 (and/or the subgraphs 225A, 225B of FIG. 2A). For example, the one or more directed edges 245 can be formed based on the defined inputs and outputs of each of the function nodes 235A-F of the function graph 225. Each function graph 225 can include one or more injector nodes 230A-B and one or more ejector nodes 220A-B configured to communicate with one or more remote devices and/or processes (e.g., processes 220C-220N of FIG. 2A) outside the function graph 225. The injector nodes 230A-B, for example, can be configured to communicate with one or more devices and/or processes (e.g., processes 220C-220N of FIG. 2A) outside the function graph 225 to obtain input data for the function graph 225. By way of example each of the one or more injector nodes 230A-B can include a function configured to obtain and/or process sensor data from a respective sensor 280 shown in FIG. 2A (e.g., sensor(s) 114 of FIG. 1). The ejector nodes 240A-B can be configured to communicate with one or more devices 205B-N and/or processes 220C-220N outside the function graph 225 to provide output data of the function graph 225 to the one or more devices 205B-N and/or processes 220C-220N.

Turning back to FIG. 2A, each device 205A-N can be configured to execute one or more function graphs 225 to run one or more processes 220A, 220B of the plurality of processes 220A-N of the respective device 205A. For example, as described herein, each respective device can be configured to run a respective set of processes based on global configuration data. Each process 220A-N can include an executed instance of a function graph and/or a subgraph of a function graph. For example, in some implementations, a function graph 225 can be separated across multiple processes 220A, 220B. Each process 220A, 220B can include a subgraph 225A, 225B (e.g., process 220A including subgraph 225A, process 220B including subgraph 225B, etc.) of the function graph 225. In such a case, each process 220A, 2200B of the function graph 225 can be communicatively connected by one or more function nodes 235 of the function graph 225. In this manner, each respective device 205A-N can be configured to run a respective process by executing a respective function graph and/or a subgraph of the respective function graph. Thus, each function graph can be implemented as a single process or multiple processes.

In some implementations, one or more of the plurality of processes 220A-N can include containerized services (application containers, etc.). For instance, each process 220A-N can be implemented as a container (e.g., docker containers, etc.). For example, the plurality of processes 220A-N can include one or more containerized processes abstracted away from an operating system 250 associated with each respective device 205A. As an example, the containerized processes can be run in docker containers, such that each process is run and authorized in isolation. For example, each respective container can include one or more designated computing resources (e.g., processing power, memory locations, etc.) devoted to processes configured to run within the respective container. Moreover, in some implementations, each container can include an isolated runtime configuration (e.g., software model, etc.). In this manner, each container can independently run processes within a container specific runtime environment.

The plurality of devices 205A-N, sensors 280, processes 220A-N (e.g., of each respective device 205A), etc. can be communicatively connected over one or more wireless and/or wired networks 270. For instance, the plurality of devices 205A-N (and/or processes 205A-N of device 205A) can communicate over one or more communication channels 270. For example, process(es) at each device can exchange messages over the one or more communicative channels 270 using a message interchange format (e.g., JSON, IDL, etc.). By way of example, each respective process can utilize one or more communication protocols (e.g., HTTP, REST, gRPC, etc.) to provide and/or receive messages from one or more respective device processes (e.g., other processes running on the same device) and/or remote processes (e.g., processes running on one or more other devices of the computing system).

Figure 3:
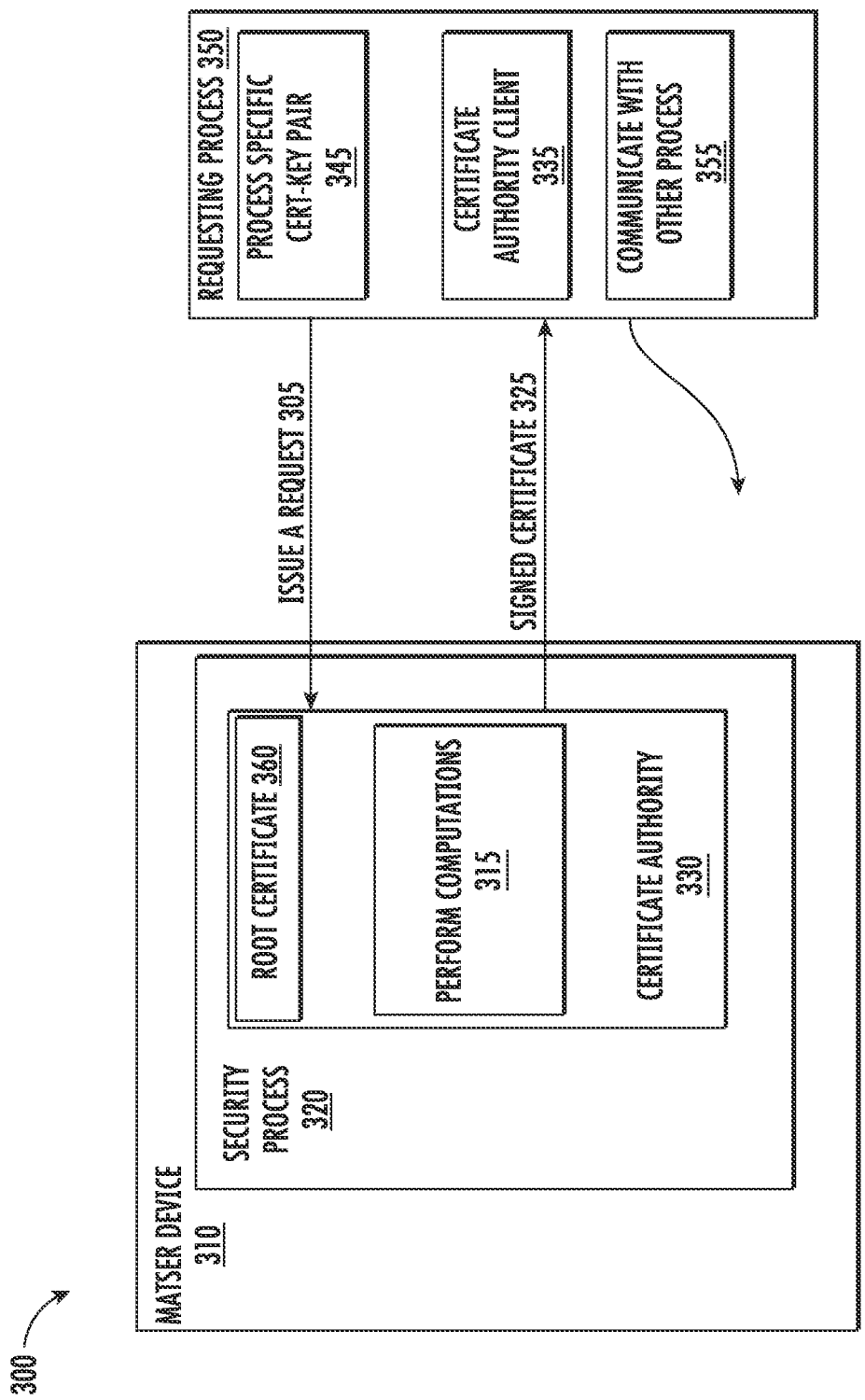
FIG. 3 depicts an example data flow diagram according to example implementations of the present disclosure.

FIG. 3 depicts an example data flow diagram for distributing authority between processes according to example implementations of the present disclosure. To facilitate the transfer of data between each of the plurality of processes, the computing system can include a security infrastructure. The security infrastructure can include, for example, one or more cryptographic signing procedures 300. The one or more cryptographic signing procedures 300 can be facilitated by an online certificate authority 320. The certificate authority 320, for example, can assist in the creation of certificates and establishment of trust between the plurality of processes.

The certificate authority 320 can include a certificate granting service running on a security process 330 of at least one of the one or more vehicle device(s) of the plurality of devices of the computing system. By way of example, and as described in further detail herein, the plurality of devices of the computing system can include a master device 310 and one or more requesting devices. The certificate authority 320 can include a certificate granting service running as part of the security process 330 of the master device 310 of the plurality of devices. For example, the certificate authority 320 can run as an operating system service (e.g., on operating system 250 of FIG. 2A) of the master device 210.

In some implementations, the certificate authority 320 can be implemented as a gRPC service. The gRPC service can provide a uniform interface for clients (e.g., certificate authority client 335 of requesting device 250) written in a variety of programming languages. The gRPC service can be written in any programming language such as, for example, C++ to facilitate testing and interoperation with functional graphs of the computing system for testing. The gRPC service can have interfaces (e.g., one or more UNIX socket interfaces, one or more network interfaces, etc.) that can be available for communications between processes running on the master device 310 and/or one or more requesting devices.

Requesting processes 350 that require a certificate (e.g., to authenticate messages to one or more other processes) can issue a request 305 to the certificate authority 320. As described herein, the request 305 can contain a process certificate signing request. The certificate authority 320 can receive the process certificate signing request and perform computations 315 required to transform the request into a certificate. The certificate authority 320 can return 325 the resulting certificate to the requesting process 350.

The certificate authority 320 can use a simple certificate architecture, with a single root certificate 360 that is trusted by all processes (e.g., requesting process 350). The certificate authority 320 can manage the root certificate 360 and sign certificates 315 for each process (e.g., requesting process 350). In this manner, in some implementations, the security architecture can eliminate the use of intermediate certificates. This resulting certificate architecture can be beneficial for its simplicity. For example, in some implementations, the number of processes running onboard a vehicle (e.g., the one or more vehicle devices of the computing system) can be known. Thus, in some implementations, the security architecture of the present disclosure can eliminate the need for intermediate certificates by granting certificates to known processes of the computing system.

The certificate authority 320 can generate a new root certificate 360 and corresponding keys following a system reboot. At startup, requesting processes (e.g., requesting process 350) can obtain new certificates by making an API call. For example, the requesting process 350 can include a certificate authority client 335 (e.g., a gRPC client service) configured to communicate with the certificate authority 320. The requesting process 360 can generate a process specific cert-key pair 345 (e.g., an unsigned certificate and corresponding private key) and a certificate signing request at startup, communicate (e.g., via the certificate authority client) the certificate signing request to the certificate authority 320, receive 325 a signed certificate from the certificate authority 320, and use the signed certificate and private key to communicate 355 with one or more other processes of the computing system. By generating keys on boot the certificate authority 320 can ensure that compromising the certificate granting procedure 300 can be mitigated by a system reboot. Moreover, the certificate authority can generate unique keys on each vehicle, for example, and thus keys compromised on one vehicle cannot be used on another vehicle.

Figure 4A:
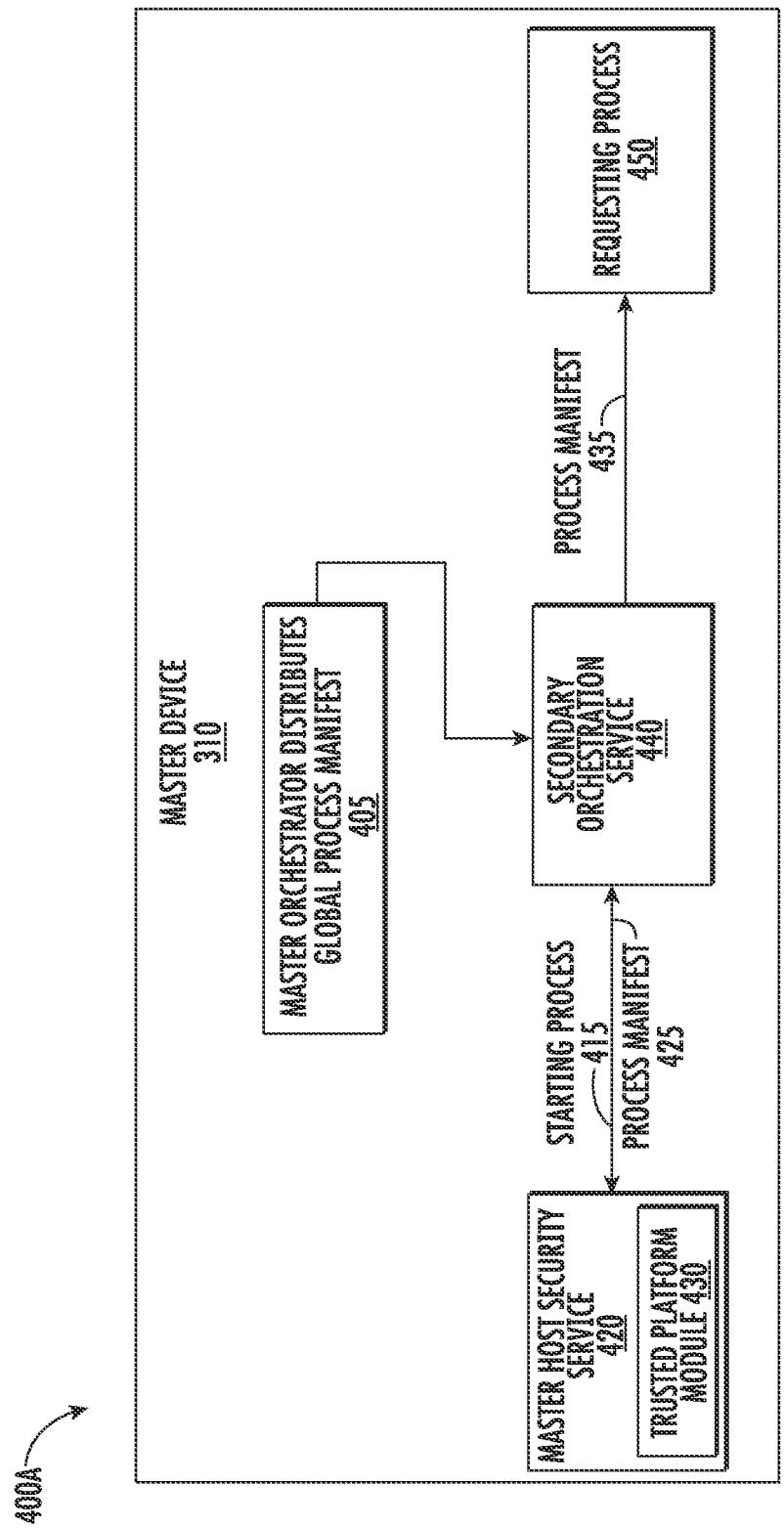
FIG. 4A depicts an intra-device process configuration 400 according to example implementations of the present disclosure.

For example, FIG. 4A depicts an intra-device process configuration process 400A according to example implementations of the present disclosure. As depicted, the master device 310 can be configured to run and authenticate a plurality of processes (e.g., requesting process 440). The master device 310 can include a master host security service 420, a trusted platform module 430, a secondary orchestration service 440, and a requesting process 450.

The computing system can run a process orchestration system configured to start one or more of the plurality of processes of the computing system. For example, as described herein, the computing system can include a primary orchestrator (e.g., a primary orchestration service) and a plurality of secondary orchestrators (e.g., secondary orchestration service 440). The primary orchestrator can push a global configuration data 405 to the secondary orchestration service 440 of the master device 420 (and/or one or more secondary orchestration service(s) of one or more requesting devices). The secondary orchestration service 440 can identify one or more processes to run on the master device 310 based on the device identity of the master device (e.g., obtained from the trusted platform module 430) and the global configuration data 405. By way of example, the device identity of the master device can be obtained and/or assigned during a provisioning operation of the master device (e.g., as discussed in more detail herein with reference to FIGS. 7-8).

The secondary orchestration service 440 can act as an intermediary between master host security service 420 and the requesting process 450 running on the system. For example, the secondary orchestration service 440 can start the requesting process 450 (e.g., by executing a function node of the requesting process 450) and notify 415 the master host security service 420 that the requesting process 450 is being started. The master host security service 420 can determine dynamic security configuration data for the started process (e.g., a process manifest 425 as described in further detail herein with respect to FIG. 4B) and provide the dynamic security configuration data (e.g., a process manifest) to the secondary orchestration service 440. The secondary orchestration service 440 can receive (at 425) the dynamic security configuration data (e.g., a process manifest) and provide (at 435) the dynamic security configuration data (e.g., a process manifest) to the requesting process 450.

By way of example, the requesting process 450 can be configured to run within a container (e.g., a docker container, etc.). In such a case, the secondary orchestration service 440 can pass the dynamic security configuration data (at 435) to the requesting process 450 running in the container. Due to its positioning as an intermediary, the secondary orchestration service 440 can be treated as a high-trust software component. The security architecture of the present disclosure can secure the trust of the secondary orchestration service 440 by issuing operational certificates to each process started by the secondary orchestration service 440.

Figure 4B:
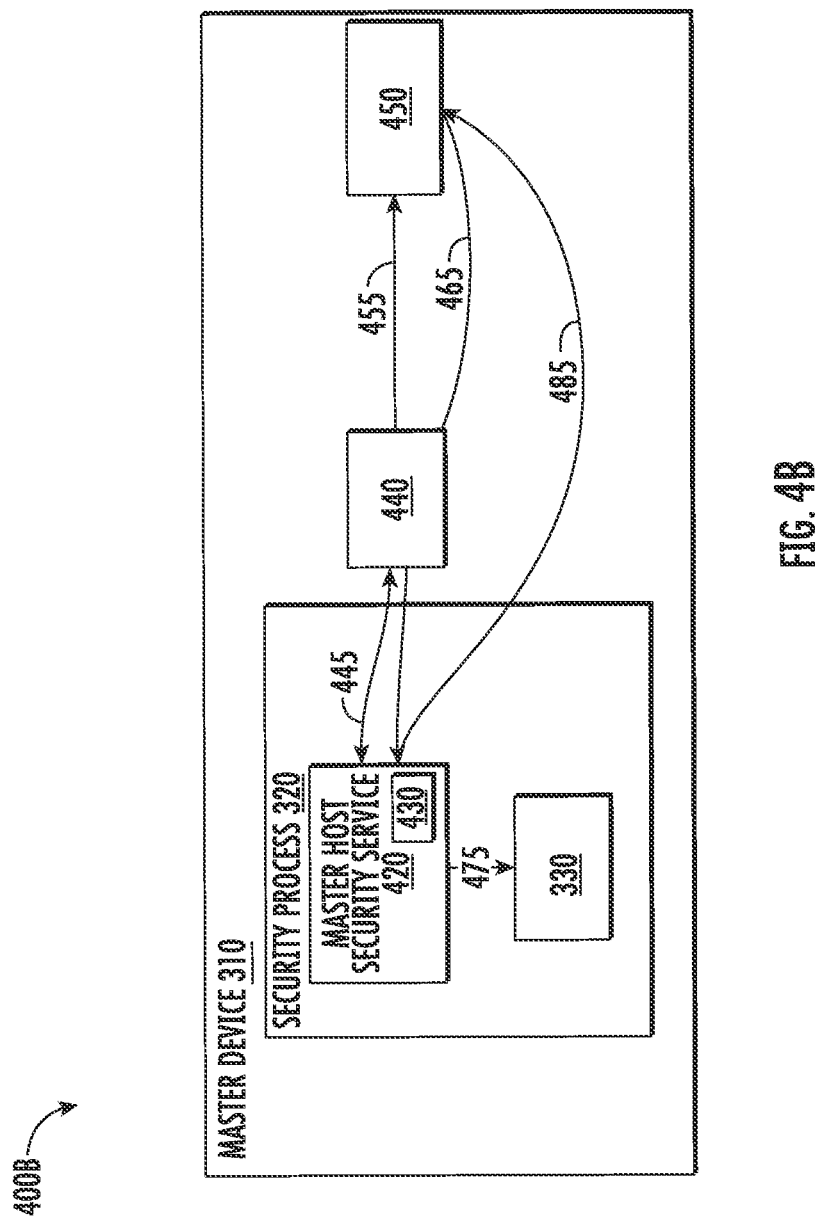
FIG. 4B depicts another example intra-device operational certificate granting process according to example implementations of the present disclosure.

For example, FIG. 4B depicts example intra-device operational certificate granting process 400B according to example implementations of the present disclosure. Various hardware and software components can be coordinated in order to successfully issue an operational certificate to a requesting process 450. Generally, the master device 310 can include hardware components such as one or more processors, one or more memories, a trusted platform module 430 (e.g., a TPM 2.0, etc.), and/or any additional hardware for establishing trust between processes of the master device 310. In addition, the master device 310 can include software components such as an operating system, a certificate authority 330, a secondary orchestration service 440, and/or one or more processes (e.g., requesting process 450). In addition, the master device 310 can include a master host security service 420 configured to facilitate the establishment of trust between the one or more processes.

The trusted platform module 430, for example, can include one or more processors and/or memories configured to facilitate secure communications between the one or more devices. By way of example, the trusted platform module 430 can include a random number generator configured to generate one or more unique numbers, strings of letters, strings of numbers and letters, etc., and/or any other type of encryption software/hardware. For instance, in some implementations, the trusted platform module 430 can include a security computing chip, crypto processor, dedicated microprocessor, etc.

The secondary orchestration service 440 can be communicatively connected to the master host security service 420. For example, during start-up of the computing system, the secondary orchestration service 440 can establish a communicative connection with the master host security service 420 and the secondary orchestration service 440 by opening a protected socket 445. The protected socket, for example, can include a channel (e.g., bidirectional stream, etc.) protected by one or more file-system permissions (e.g., UNIX permissions, ACLs, etc.). In this manner, the secondary orchestration service 440 can open a channel to communicate with a local host security service (e.g., master host security service 420) and the channel can be protected from unauthorized access using file-system permissions such that, upon establishing the connection through the socket, the secondary orchestration service 440 can be able to communicate securely with the local host security service (e.g., master host security service 420).

As discussed herein, the master orchestration service 440 can be configured to start one or more processes (e.g., requesting process 450) at the master device 310. Before, during, and/or after starting a requesting process 450, the secondary orchestration service 440 can request a process manifest (e.g., via the protected socket 445) for the requesting process 450 from the master host security service 420. The master host security service 420, can receive, from the secondary orchestration service 440, the request for the process manifest (e.g., via the protected socket 445).

The process manifest for the requesting process 450 can include a process name, a manifest key, and/or a root certificate generated by the certificate authority 330 of the master host security service 420. The process name, for example, can include a process-specific identifier corresponding the requesting process 450. For instance, in some implementations, the vehicle computing system (e.g., the one or more vehicle devices of the plurality of devices) can be configured to run a finite number of processes. In such a case, the master host security service 420 can include and/or have access to a process name for each vehicle process configured to run on the vehicle computing system. The manifest key can include a shared cryptographic key (e.g., a symmetric key) that can be used to encrypt and decrypt one or more messages (e.g., in accordance with one or more symmetric signing techniques). In addition, or alternatively, the manifest key can include an asymmetric cryptographic key that can be used to encrypt and decrypt one or more messages (e.g., in accordance with one or more asymmetric signing techniques). And, the root certificate, for example, can include a public key certificate that identifies the certificate authority 330.

For example, the certificate authority 330 can generate the root certificate and a private root key corresponding to the root certificate. The root certificate can include a public key corresponding the private root key. The public key can include a publicly accessible string of letters, numbers, and/or letters and numbers. For example, the public key can include a randomly generated (e.g., via a random number generator of trusted platform module 430) string of letters and/or numbers. The private root key corresponding to the root certificate can include a private string of letters and/or numbers known only to the master host security service 420, the certificate authority 330, and/or security process 305. For example, the private root key can include a randomly generated (e.g., via a random number generator of the trusted platform module 430) string of letters and/or numbers securely stored on one or more memories of and/or accessible to the master device 310. By way of example, the private root key can be stored on the file system of the master device 310. The private root key can be protected by one or more file system permissions to restrict accessibility of the private root key to security process 305, master host security service 420, and/or the certificate authority 330.

The public key can correspond to the private root key. For example, the public key can enable a process to decrypt a value encrypted by the private root key, and/or vice versa (e.g., such as in asymmetric encryption algorithms). The certificate authority 330 can sign the root certificate with the corresponding private root key. By way of example, the certificate authority 330 can generate a signature for the root certificate. The signature, for example, can be indicative of the identity of the certificate authority (e.g., an identity of the master device 310, the security process 305, etc.) encrypted by the private root key. In this manner, the certificate authority 330 can generate a self-signed root certificate.

The signature of the self-signed root certificate can be decrypted with the public key of the root certificate to identify the signing entity (e.g., the master device 310, the security process 305, the certificate authority 330, etc.) that signed the root certificate. In this way, the self-signed root certificate (e.g., including the signature and the public root key) can be provided to one or more processes and the one or more processes can identify the certificate authority 330 by decrypting the signature of the self-signed certificate with the public root key. As described herein, the master device 310 can utilize the certificate authority 330 to generate and distribute temporary certificates (e.g., operational certificates) to one or more processes of the master device and/or one or more processes running on other devices of the computing system.

In response to the request for the process manifest (e.g., via the protected socket 445), the master host security service 420, can generate the process manifest for the requesting process 450. To do so, the master host security service 420 can obtain the root certificate from the certificate authority 330 and identify a process name. In addition, or alternatively, the master host security service 420 can obtain and/or generate a process name and a per-process unique symmetric key for the requesting process 450.

For example, in some implementations, the process name and/or per-process symmetric key can be assigned to each requesting process of the one or more vehicle processes at runtime (e.g., as identified by the global configuration data). In addition, or alternatively, the process name and/or per-process symmetric key for each requesting process of the one or more vehicle processes can be assigned during a provisioning operation of the vehicle computing system (e.g., as discussed in greater detail with reference to FIG. 7-8). Moreover, in some implementations, the process name and/or per-process symmetric key can be generated (e.g., randomly generated by the trusted platform module 430) by the master host security service 420.

The master host security service 430 can generate process manifest for the requesting process 450 based on the process name, the per-process symmetric key, and the root certificate. In addition, in some implementations, the master host security service 430 can sign the process manifest. For instance, the master host security service 430 can generate a manifest signature for the process manifest using an asymmetric manifest key generated by the trusted platform module 430. By way of example, the master host security service 430 can receive an asymmetric cert-key pair (e.g., a manifest private key and a manifest public key) from the trusted platform module 430. The master host security service 430 can generate and encrypt the manifest signature with the manifest private key and sign the process manifest with the manifest signature. The master host security service 430 communicate (e.g., send, provide, etc.) the process manifest to the secondary orchestration service 440. The secondary orchestration service 440 can receive the process manifest and forward 455 the process manifest to the requesting process 450.

For example, the secondary orchestration service 440 can write the process manifest to a memory location associated with the requesting process 450. By way of example, as discussed herein, the requesting process 450 can include a containerized process configured to run in a software container on the master device 310. The software container can be assigned one or more computing resources of the computing system (e.g., one or more processors (and/or portions thereof) and/or one or more memories (and/or portions thereof) of the master device 310. In such a case, the memory location associated with the requesting process 450 can include a portion of the one or more tangible, non-transitory, computer readable media that is assigned to the software container. The secondary orchestration service 440 can modify the container of the requesting process 450 (e.g., the container within which the requesting process is configured to run) by placing the process manifest on the file system in a location known to the container. Upon receipt of the process manifest, the container can have the information necessary to authenticate the requesting process 450 to the master host security service 420.

The requesting process 450 can identify the process manifest by checking a known location of the file system (e.g., a location of memory reserved for the process manifest). The requesting process 450 can open the process manifest and verify the manifest signature of the process manifest. For example, the requesting process 450 can obtain the public manifest key from, for example, the process manifest, the trusted platform certificate (e.g., the asymmetric cert-key pair of the trusted platform module 430, etc.), etc. The requesting process 450 can decrypt the manifest signature of the process manifest using the public manifest key and verify that the manifest came from a correctly provisioned trusted platform module based on the signature. For instance, a trusted platform certificate can be rooted in an offboard certificate authority (e.g., authorized by a trusted certificate authority running on an offboard device such as one or more remote devices remote from the vehicle computing system) associated with the trusted platform module 430 of the master device 310.

In the event that the manifest signature is verified, the requesting process 450 can generate a per-process certificate signing request 465 and a per-process private key corresponding to the per-process certificate signing request 465. The requesting process 450 can generate a process signature using the manifest key and sign the per-process certificate signing request 465 with the process signature. The requesting process 450 can communicate the process certificate signing request 465 to the master host security service 420 over one or more communication channels (e.g., an unencrypted insecure channel).

The master host security service 420 can receive the per-process certificate signing request 465 and, in response, verify the per-process certificate signing request 465 using a symmetric key corresponding to the manifest key (e.g., in accordance with one or more symmetric signing techniques, asymmetric signing techniques, etc.). By way of example, the manifest key can include a cryptographic key used to encrypt plaintext and/or decrypt ciphertext (e.g., encrypted text). For example, the manifest key can include a string of letters, numbers, and/or letters and numbers that can be used to transform (e.g., via one or more symmetric-key algorithms (e.g., Blowfish, AES, RC4, DES, RC5, RC6, etc.)) plaintext such as, for example, plain text identifying the security process 305, the master device 310, the master host security service 420, the process manifest, etc. The transformed text (e.g., cipher text) can be decrypted (e.g., via one or more symmetric-key algorithms (e.g., Blowfish, AES, RC4, DES, RC5, RC6, etc.)) using the symmetric key corresponding the manifest key. For example, the symmetric key corresponding the manifest key can be the same as the manifest key. The master host security service 420 can verify the per-process certificate signing request 465 by attempting the decrypt the process signature with the symmetric key corresponding the manifest key. The master host security service 420 can determine that the per-process certificate signing request 465 is valid in the event that the process signature is decrypted by the symmetric key corresponding the manifest key.

In the event that the per-process certificate signing request 465 is verified, the master host security service 420 can obtain a signed per-process certificate 475 from the certificate authority 330. For example, the master host security service 420 can request the certificate authority 330 to issue a per-process certificate for the requesting process 450. The signed per-process certificate 475 can be generated by the certificate authority 330. For example, the certificate authority 330 can generate the per-process certificate for the requesting process 450. In addition, or alternatively, the certificate authority 330 can generate a master signature for the per-process certificate using the private root key corresponding to the root certificate and sign the process certificate with the master signature.

The master host security service 420 can communicate 485 the signed per-process certificate 475 to the requesting process 450. The requesting process 450 can receive the signed per-process certificate 475 from the master host security service 420. The requesting process 450 can verify the signed per-process certificate 475 by comparing the root certificate generated by the certificate authority 330 (e.g., the public root key of the root certificate) and included in the process manifest to the master signature. The requesting process 450 can verify that the signed per-process certificate was signed correctly using the certificate authority's root certificate provided in the process manifest. By way of example, the requesting process 450 can attempt decrypt the master signature of the signed per-process certificate with the public root key of the root certificate. The requesting process 450 can verify that the signed per-process certificate is valid in the event that the decrypted master signature identified the security process 305, the master host security service 420, the certificate authority 330, etc. Once the respective process has obtained the per-process certificate, the certificate can be used to establish the identity and authorize message of the requesting process 450 to other processes.

Figure 5A:
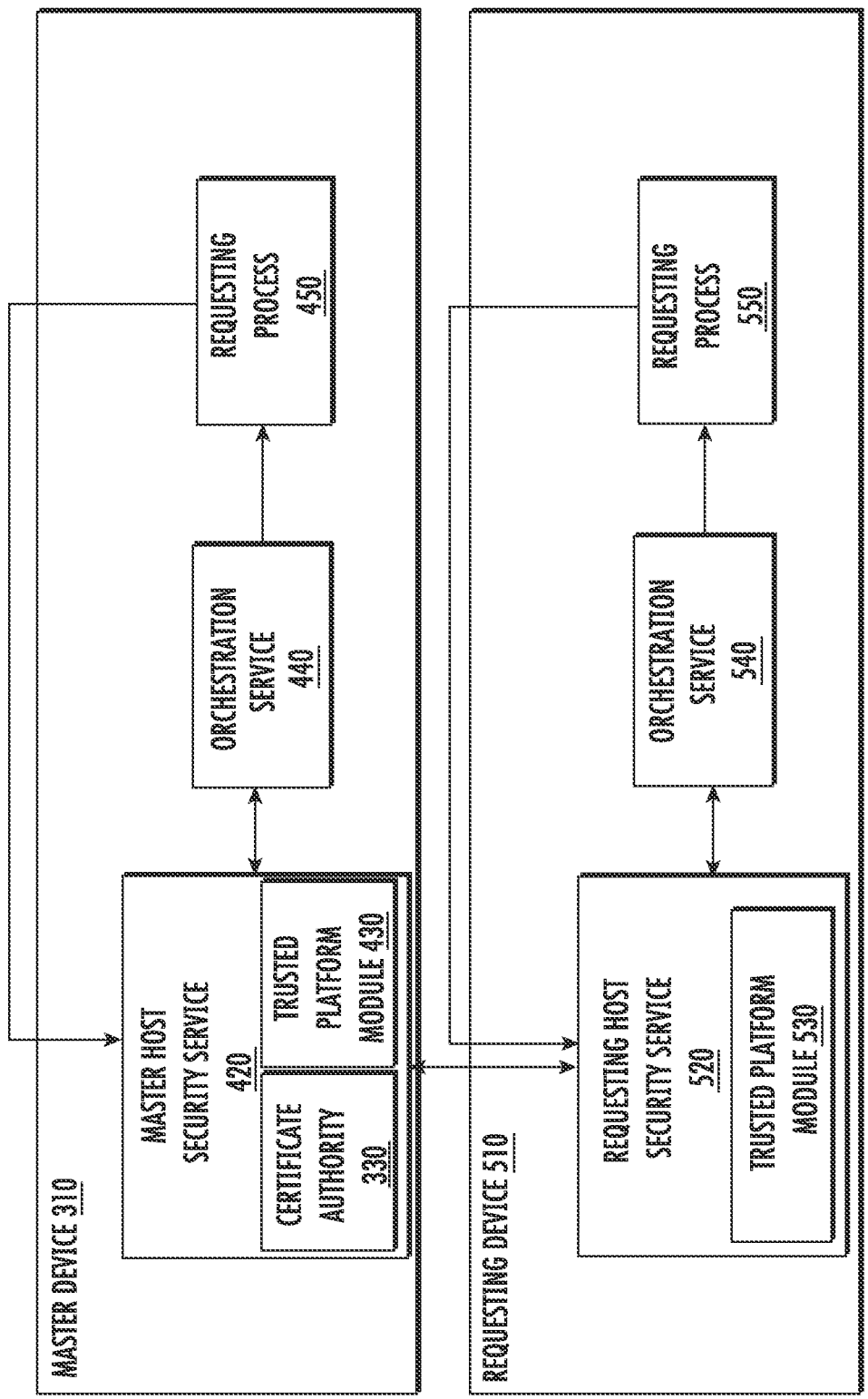
FIG. 5A depicts an example inter-device operational certificate granting process according to example implementations of the present disclosure.

FIG. 5A depicts an example inter-device operational certificate granting architecture between vehicle devices according to example implementations of the present disclosure. As illustrated, a vehicle device of the vehicle computing (e.g., vehicle computing system 1112) can include a master device 310 and/or a requesting device 510. Each device can run a host security service including and/or otherwise associated with a respective trusted platform module. For instance, the requesting device 510 can include a requesting host security service 520 including and/or otherwise associated with a trusted platform module 530. In addition, or alternatively, as discussed with reference to FIG. 4A, the master device 310 can include a master host security service 420 including and/or otherwise associated with a trusted platform module 430. The respective host security services 420, 520 can establish trust cross-device using the trusted modules 430, 530 to establish trust between the devices. The host security services 420, 520 can run a single certificate authority 330 (e.g., at the master host security service 420) that can service requests for certificates used to identify and authorities a requesting process 450, 550.

As discussed herein, the computing system can include a plurality of vehicle devices. The plurality of vehicle devices can include a single master device 330 with the master host security service 420 and multiple requesting devices (e.g., requesting device 510), each with a respective requesting host security service (e.g., requesting host security service 520. The master host security service 420 can be configured to run the certificate authority 330. The requesting host security service 520 can be configured to authenticate to the master host security service 420 to request that the master host security service 420 to service certificate signing requests from processes (e.g., requesting process 550) of the requesting device 510. For instance, the requesting host security service 520 can receive information regarding started processes from the secondary process orchestrator 540 and/or process 550 running on the respective requesting device 510. The requesting host security service 520 can forward the information regarding started processes from the secondary process orchestrator 540 and/or process 550 running on the respective requesting device 510 to the master host security service 420. The master host security service 420 can receive the information and handle requests to authenticate (e.g., issue an operational certificate) a requesting process 550 from secondary host security service 520.

In this manner, the master host security service 420 can run a single certificate authority 330 for the computing system. For instance, no intermediate certificate authorities can be run. The certificate authority 330 can generate a root certificate (e.g., as discussed with reference to FIG. 4B). The root certificate can be used to sign all onboard certificates (e.g., operational certificates for processes running on the one or more vehicle devices). The certificate authority can service requests from other requesting devices of the vehicle computing system.

Figure 5B:
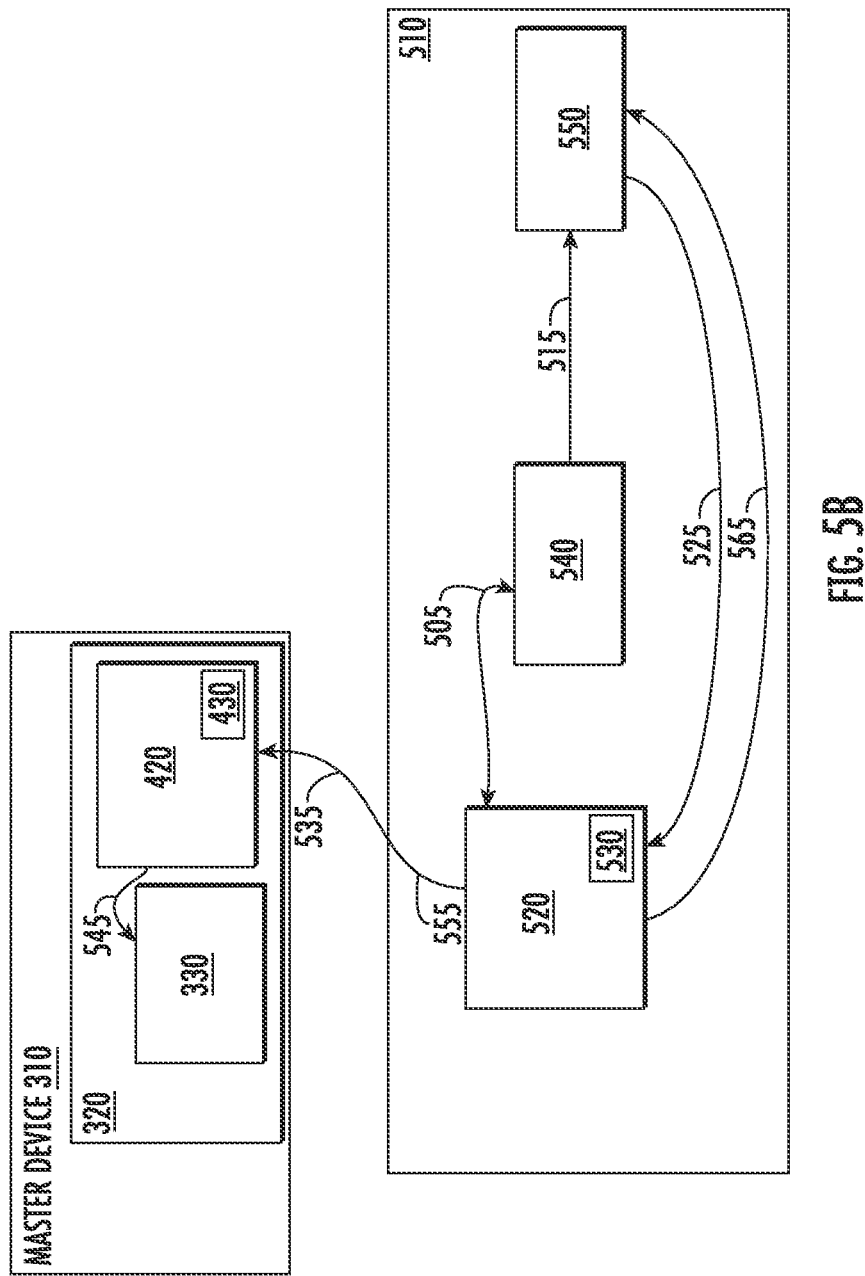
FIG. 5B depicts another example inter-device operational certificate granting process according to example implementations of the present disclosure.

More particularly, FIG. 5B depicts an example inter-device operational certificate granting process between vehicle devices according to example implementations of the present disclosure. Various hardware and software components can be coordinated in order to successfully identify and authorize a requesting process 550. Generally, the computing system can include hardware components such as a master device 310 and one or more requesting devices 510. Each device can include one or more processors, one or more memories, a trusted platform module 430, 530 (e.g., a TPM 2.0, etc.), and/or any additional hardware for establishing trust between processes of the computing system (e.g., one or more vehicle computing devices of the computing system). The trusted platform module 430, 530, for example, can include one or more processors and/or memories configured to facilitate secure communications between the one or more devices. By way of example, the trusted platform module 430, 530 can include a random number generator configured to generate one or more unique numbers, strings of letters, strings of numbers and letters, etc., and/or any other type of encryption software/hardware. For instance, in some implementations, the trusted platform module 430, 530 can include a security computing chip, crypto processor, dedicated microprocessor, etc. of the respective device 310, 510.

In addition, the respective device(s) 310, 510 can include software components such as a respective operating system, a respective secondary orchestration service (e.g., secondary orchestration service 540), and one or more processes (e.g., requesting process 550). In addition, the master device 310 can include a master host security service 420 and a certificate authority 330 configured to facilitate the establishment of trust between the one or more processes of the master device 310 and the requesting device(s) 510. The requesting device 510 can include a requesting host security service 520 configured to facilitate the establishment of trust between the one or more respective processes (e.g., requesting process 550) of the requesting device 510 by communicating with the master host security service 420.

For instance, the master device 310 (e.g., certificate authority 330 of the master device 310) can issue a per-process certificate to each vehicle process (e.g., requesting process 550) running on the one or more vehicle computing devices (e.g., device(s) 310, 510, etc.) of the computing system. For example, the certificate authority 330 can generate and manage a root certificate (e.g., as discussed with reference to FIG. 4B) and sign operational certificates for each vehicle process (e.g., requesting process 550) without using intermediate certificates (e.g., certificates issued to a secondary orchestration service 540 of a requesting device 510). For instance, the certificate authority 330 can generate new keys and certificates following a system reboot (e.g., by turning a vehicle on/off). On startup, the one or more of the vehicle processes (e.g., requesting process 550) can obtain new operational certificates (e.g., per-process certificates) by making an API call to a respective orchestration service 540. In response, and as discussed in greater detail herein, the respective orchestration service 540 can distribute per-process certificates and corresponding per-process private keys for the one or more vehicle processes (e.g., requesting process 550).

For instance, the requesting process 550 can be communicatively connected to a running requesting host security service 520. For instance, a secondary orchestration service 540 running on the requesting device 510 can be communicatively connected to the requesting host security service 520 running on the requesting device 510. By way of example, at start up, the secondary orchestration service 540 can establish a protected socket 505 with the requesting host security service 520 (e.g., in the manner described herein with reference to FIG. 4B). The protected socket 505, for example, can be protected by one or more file-system permissions. In this manner, the secondary orchestration service 540 can open a socket 505 to communicate with the local requesting host security service 520 and the socket 505 can be protected from unauthorized access using file-system permissions such that, upon establishing the connection through the socket, the secondary orchestration service 540 can be able to communicate securely with the local requesting host security service 520.

As discussed herein with reference to FIG. 4B, the secondary orchestration service 540 of the requesting device 510 can receive global configuration data from a master orchestration service. The secondary orchestration service 540 can be configured to start one or more processes, such as the requesting process 550, at the requesting device 510 based on the global configuration data. The secondary orchestration service 540 can request a process manifest from the requesting host security service 520 before, after, and/or during the start-up of the requesting process 550. The requesting host security service 520, can receive, from the secondary orchestration service 520, the request for the process manifest for the requesting process 550.

The process manifest can include a process name, a manifest key, and the root certificate generated by the certificate authority 330 of the master host security service 420 (e.g., at the master device 330). For example, the requesting host security service 520 can include and/or have access to a process name and/or manifest key for each vehicle process configured to run on the requesting device 510. The requesting host security service 520 can generate the process manifest for the requesting process 550 based on the process name, symmetric key, and/or the root certificate. For example, requesting host security service 520 can receive the root certificate from the master host security service 420. The requesting host security service 520 can generate a manifest signature for the process manifest using an asymmetric manifest key generated by the trusted platform module 530 of the requesting device 510. The requesting host security service 520 can sign the process manifest with the manifest signature and send the process manifest to the secondary orchestration service 540. The secondary orchestration service 540 can provide the process manifest 515 to the requesting process 550. For example, the secondary orchestration service 540 can write the process manifest to a memory location associated with the requesting process 550 (e.g., in the manner described herein with reference to FIG. 4B).

The requesting process 550 can open the process manifest and verify the manifest signature using a trusted platform certificate of the requesting device 510. By way of example, the trusted platform certificate can be rooted in an offboard certificate authority associated with the trusted platform module 530 of the requesting device 510. In the event that the manifest signature is verified, the requesting process 550 can generate a per-process certificate signing request 525 and a per-process private key corresponding to the per-process certificate signing request 525. The process can generate a process signature using the manifest key and sign the per-process certificate signing request 525 with the process signature. The requesting process 550 can communicate the per-process certificate signing request 525 to the requesting host security service 520.

The requesting host security service 520 can receive the per-process certificate signing request 525 and, in response, verify the per-process certificate signing request 525 using the symmetric key corresponding to the manifest key (e.g., in accordance with one or more symmetric signing techniques). In the event that the per-process certificate signing request 525 is verified, the requesting host security service 520 can obtain a signed process certificate.

Figure 7:
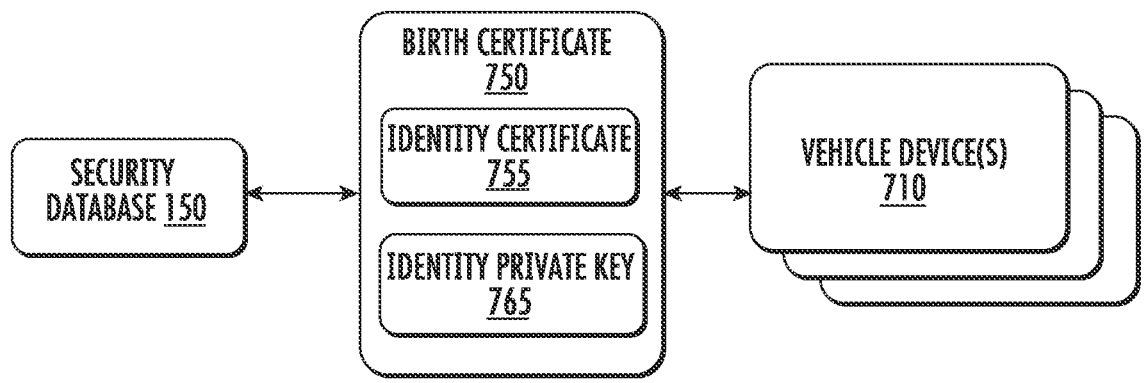
FIG. 7 depicts an example of an onboard provisioning process according to example implementations of the present disclosure.
Figure 8:
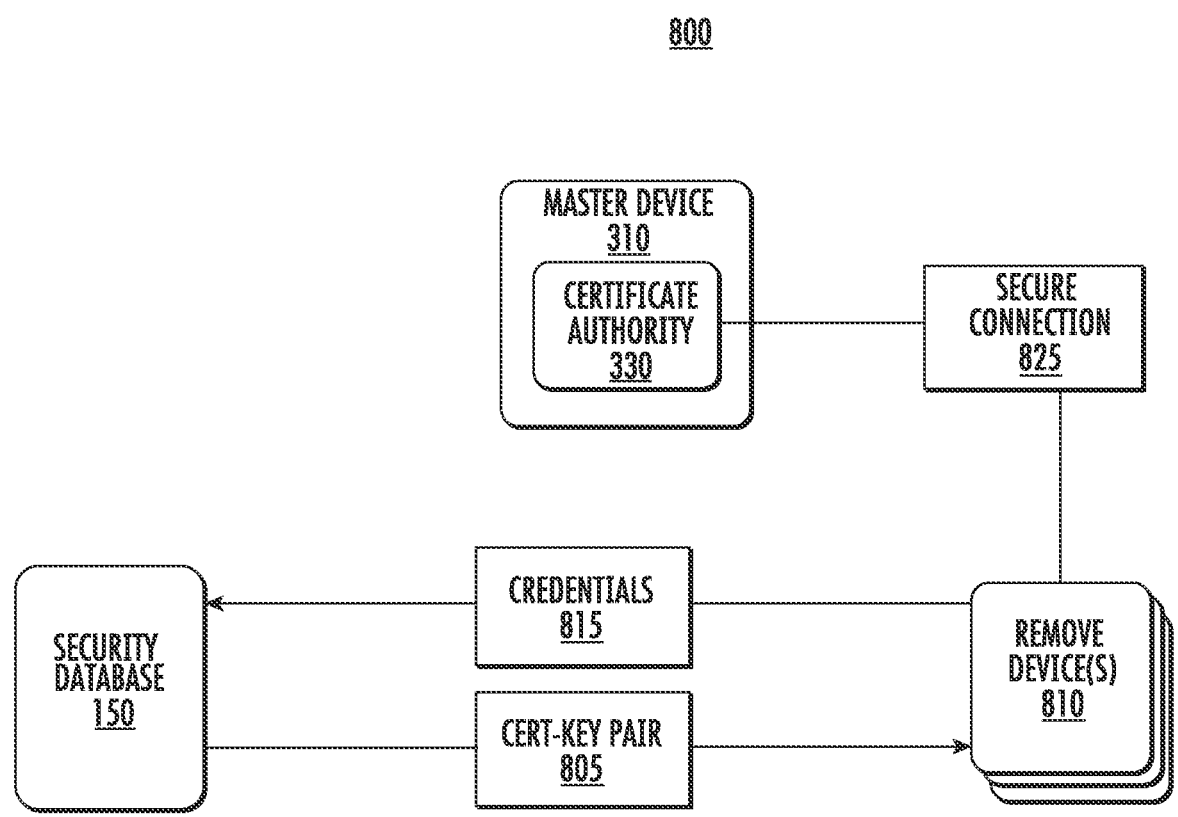
FIG. 8 depicts an example of a remote provisioning process according to example implementations of the present disclosure.

For example, the requesting host security service 520 can sign the per-process certificate signing request using a public key (e.g., of an asymmetric cert-key pair) from the trusted platform module 530 of the requesting device 510 (e.g., an identity certificate of the requesting device 510 as describes with reference to FIG. 7-8). The requesting host security service 520 can communicate the signed per-process certificate signing request 535 and the signature to the master host security service 420. The master host security service 420 can receive the signed per-process certificate signing request 535. The master host security service 420 can verify the signature and forward 545 the signed per-process certificate signing request to the certificate authority 330. In response to verifying the per-process certificate signing request, the certificate authority 330 can generate a signed process certificate for the requesting process 550. For example, the certificate authority 330 can generate a process certificate for the requesting process 550 based on the process manifest (e.g., the process name, etc.). The certificate authority 330 can generate a master signature for the process certificate using the private root key corresponding to the root certificate and sign the process certificate with the master signature.

The master host security service 420 can provide a communication 555 indicating the signed process certificate to the requesting host security service 520 and the requesting host security service 520 can forward a communication 565 indicating the signed process certificate to the requesting process. In some implementations, master host security service 420 can generate a message including the signed process certificate. The master host security service 420 can sign the message with a public key of the trusted platform module 420 of the master device 310 (e.g., an identity certificate of the master device 310 as discussed with reference to FIG. 7-8). The master host security service 420 can communicate the signed message to the requesting host security service 520. The requesting host security service 520 can receive the signed message and verify the signature of the signed message before forwarding the signed process certificate to the requesting process 550.

The requesting process 550 can receive the signed process certificate from the requesting host security service 520. The requesting process 550 can verify the process certificate by comparing the root certificate generated by the certificate authority 330 and included in the process manifest to the master signature. In this manner, the requesting process 550 can verify that the signed process certificate was signed correctly using the certificate authority's root certificate provided in the process manifest. Once the requesting process 550 has obtained the signed process certificate, the signed process certificate can be used to establish the identity and authority of the requesting process 550 with other processes.

Figure 6:
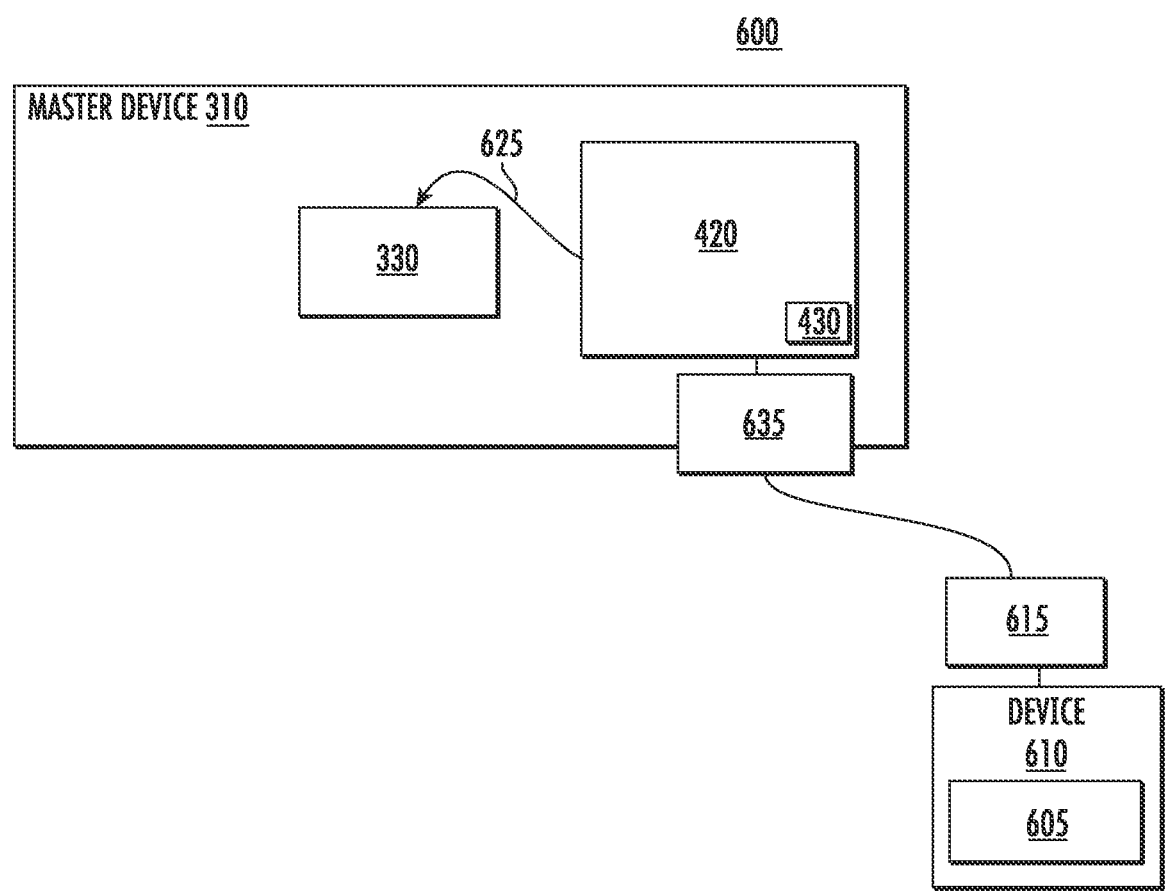
FIG. 6 depicts an example operational certificate granting process for a device without a trusted platform module according to example implementations of the present disclosure.

In some implementations, the requesting device 510 can include a device without the trusted platform module 530. For example, FIG. 6 depicts an example operational certificate granting process 600 for a device 610 without a trusted platform module according to example implementations of the present disclosure. For example, FIG. 6 illustrates an operational certificate granting process 600 in which asymmetric keys (e.g., asymmetric signing procedures) can be used in place of the trusted platform modules.

The requesting device 610 can be provisioned an asymmetric cert-key pair. The provisioning operation 605, for example, is discussed herein with reference to FIGS. 8-9. During the provisioning operation 605 an identity certificate (e.g., a node identity certificate) that identifies the requesting device 610 and an identity private key (e.g., a node identity private key) corresponding to the identity certificate can be generated on the requesting device 610.

The identity certificate and the identity private key, for example, can be stored in one or more accessible memories of the requesting device 610 (e.g., in one or more memories of the requesting device 610, etc.). In the event that the device includes a trusted platform module the identity certificate and identity private key can be associated with the trusted platform module (e.g., stored in memory of and/or with a trusted platform module, etc.). The identity certificate can include a public identity key. The public identity key can be publicly available to (e.g., accessible by) each device of the computing system (e.g., master device 310) and can include a unique number, string of letters, string of numbers and letters, etc. In addition, or alternatively, the identity certificate can include a device unique identifier. The device unique identifier can include the same or different unique number, string of letters, string of numbers and letters, etc. as the public key. The device unique identifier can be utilized by the plurality of devices (and/or processes or services thereof) of the computing system to identify communications from the requesting device 610.

The public identity key can correspond to the identity private key. For example, the public identity key can enable a receiving device (e.g., the master device 310) to decrypt a value encrypted by the identity private key, and/or vice versa (e.g., such as in asymmetric encryption algorithms). The identity private key can include another unique number, string of letters, string of numbers and letters, etc. different from the public key. The identity private key can be kept secret and known only to the requesting device 610 (e.g., inaccessible to other devices of the computing system). In this manner, a requesting device 610 can securely identify itself to a target device (e.g., master device 310) by signing a communication to the target device (e.g., master device 310) with the device unique identifier and encrypting the signature with the identity private key. The target device (e.g., master device 310) can receive the message and identify the device by decrypting the signature with the public key corresponding to the identity private key.

In some implementations, different provisioning operations 605 can be applied to devices based on the location of the device. By way of example, FIG. 7 depicts an example onboard provisioning process 700 for vehicle device(s) 710 according to example implementations of the present disclosure. The identity certificate 755 and corresponding identity private key 765 can be issued to each vehicle device 710 during the provisioning operation 700 (e.g., during the configuration of the respective device 710). For example, during the provisioning operation 700 the vehicle device 710 can receive a device unique birth certificate 750 including the identity certificate 755 and the corresponding identity private key 765 from a security database 150 (e.g., security database 150 of computing system 100) communicatively connected to the vehicle device 710 (e.g., the vehicle computing system 112).

The provisioning operation 700 can include a period during which one or more devices (e.g., vehicle device(s) 710) are programmed and/or added to the vehicle computing system (e.g., vehicle computing system 112 of FIG. 1). By way of example, the provisioning operation 700 for an autonomous vehicle (e.g., vehicle 102 of FIG. 1) can include the development and/or the supplementation of one or more devices (physical devices, virtual devices, etc.) to the autonomous vehicle (e.g., vehicle 102 of FIG. 1), a vehicle computing system (e.g., vehicle computing system 112 of FIG. 1), one or more subsystems of the vehicle computing system, etc.

For instance, during the provisioning operation 700, an authorized user (e.g., vehicle operator, developer, provisioner, etc.) can authenticate (e.g., via an LDAP, user credentials, etc.) a request to the security database 150 communicatively connected to the vehicle device 710. By way of example, a requesting task at the vehicle device 710 can generate a private key (e.g., the identity private key 765) and an identity certificate 755 including a corresponding public key. The task can issue an authenticated (e.g., by the user credentials) certificate signing request including the identity certificate 755 to the security database 150. In response, the security database 150 (e.g., a provisioning service of the security database 150) can authenticate the request, sign the identity certificate 755, and return the signed identity certificate 755 to the vehicle device 710. The signed identity certificate 755 and the identity private key 765 (e.g., of the birth certificate 750) can be securely stored (e.g., with a trusted platform module, in a memory location of and/or accessible to the vehicle device 710, etc.) on one or more memories accessible to the vehicle device 710 until the vehicle device 710 is reprovisioned (e.g., replaced, updated, etc.). In this manner, a vehicle device 710 can include an identity certificate 755 and corresponding identity private key 765 that can have a long validity duration (e.g., for the life of the vehicle device 710, until the vehicle device 710 requires maintenance, etc.).

Due to the long validity duration, the identity certificate 755 and corresponding identity private key 765 can be limited to establishing the identity of the vehicle device 710. As discussed herein, to secure communications between the one or more device(s) (e.g., processes and/or services thereof) the computing system can issue operational certificates that are limited in duration. For example, the computing system can be configured to generate new operational certificates for each of the one or more devices at start-up and/or during runtime of the computing system. The operational certificates can authenticate the devices (e.g., processes and/or services thereof) during the operation of the computing system and lose authority after the computing system is deactivated, reset, shut off, etc.

FIG. 8 depicts an example remote provisioning process 800 for remote device(s) 810 according to example implementations of the present disclosure. For instance, the plurality of devices of the computing system can include one or more remote devices 810. The one or more remote devices 810 can be new to the computing system and, consequently, never undergo the provisioning operation 700 of FIG. 7. Thus, the remote device 810 can fail to include the birth certificate 750 (e.g., an identity certificate 755, identity private key 765, etc.), such as one issued to one or more vehicle devices 710 during the provisioning operation 700. In such a case, the computing system can utilize a modified process 800 to issue credentials to the remote device 810. The modified process 800 can facilitate the grant of operational certificates to the remote device 810 by issuing the remote device 810 a remote key-cert pair 805. The remote key-cert pair can be utilized to communicate (e.g., via secure connection 825) with the certificate authority 330 of the master device 310 to obtain an operational certificate to authorize one or more processes of the remote device 810 (e.g., configured to run on the remote device) to communicate with the one or more vehicle devices and/or other authorized remote devices.

For example, the remote device 810 can receive the remote key-cert pair 805 from the security database 150 (e.g., security database 150 of FIG. 1). By way of example, in some implementations, the remote device 810 can include and/or be a component of a user device associated with one or more users (e.g., users, operators/developers of a service provider, etc.). The one or more users can include an authorized user associated with user credentials 815 included in the user directory of the security database 150. The remote device 810 can receive the user credentials 815 from the authorized user (e.g., via one or more user interfaces) and provide the user credentials 815 to the security database 150. By way of example, the remote device 810 can establish a network connection (e.g., a wireless connection, an HTTP connection, etc.) with one or more offboard services running on the security database 150. The remote device 810 can provide the user credentials 815 over the network connection.

The security database 150 can receive the user credentials 815 and compare the user credentials 815 to the user directory to verify that the remote device 810 is associated with an authorized user. The security database 150 can determine that the remote device 810 is authenticated based on the user credentials 815. In addition, or alternatively, the security database 150 can initiate one or more additional verification procedures (e.g., a DUO 2FA request, etc.) to further ensure the security of the remote device 810.

The security database 150 can generate a user token indicative of the authorized user for the remote device 810 in response to determining that the remote device 810 is associated with the authorized user. The user token can be provided to the remote device 810 over the network connection and the remote device 810 can store the user token in one or memories of the remote device 810. The remote device 810 can utilize the user token to obtain data from the security database 150. For example, the user token can be included in communications with the security database 150 to authorize messages of the remote device 810 to access one or more processes and/or data of the security database 150. For example, the remote device 810 can communicate with the security database 150 to retrieve the remote key-cert pair 805 that can be used to communicate with the master device 310. The remote key-cert pair 805, for example, can include an asymmetric key pair. The asymmetric key pair can include a remote-identity certificate including a public key corresponding to a remote-identity private key. By way of example, the public key can enable a device to decrypt a value encrypted by the remote-identity private key, and/or vice versa (e.g., such as in asymmetric encryption algorithms).

The remote device 810 can store the remote key-cert pair 805 in one or more memories of and/or accessible to the remote device 810. For example, the remote device 810 can include a short-term memory such as, for example, a random access memory (e.g., RAM). The remote device 810 can store the remote key-cert pair 805 in the random access memory during a user session between the remote device 810 and the master device 310. In this manner, remote key-cert pair 805 can be cached in memory to be used in the event that the certificate authority 330 of the master device 310 is discarded before a user session between the master device 330 and the remote device 810 is reset.

Turning back to FIG. 6, the requesting device 610 can obtain a per-process certificate for each process running on the device 610 to enable the process to communicate with one or more other processes of the computing system. To do so, the requesting device 610 can generate a certificate signing request and sign the certificate signing request with a requesting signature. For example, the requesting device 610 can generate a requesting signature by encrypting the identity certificate with the identity private key associated with the requesting device 610 (e.g., assigned during a provisioning operation 700 or 800 of FIGS. 7 and 8). The requesting device 610 can provide 615 the signed certificate signing request to the master host security service 420 of the master device 310. The master host security service 420 can verify the requesting signature (e.g., by decrypting the requesting signature with the public key of the identity certificate) and send a request 625 for a per-process certificate from the certificate authority 330. The certificate authority 330 can generate and sign (e.g., with a master signature encrypted by the private root key) the per-process certificate. The master host security service 420 can receive the signed per-process certificate, sign the per-process certificate (e.g., with a public key of the trusted platform module 430), and return a communication 635 indicating the signed per-process certificate to the requesting device 610.

FIGS. 3-6 illustrate one or more security frameworks that enable the authentication of a plurality of processes of a computing system without using one or more intermediate certificates. In this manner, the computing system can ensure secure communications using container (e.g., containerized processes) and operating system level features. For instance, access to the trusted platform modules and the inter-process communications between the respective host security services and secondary orchestrators can be protected by file-system permissions. The respective host security services and secondary orchestrators can run as their own clients in order to sufficiently restrict access to file descriptors. Furthermore, the processes can run as a secondary client (e.g., not the root client) and thus can be prevented from injecting themselves into the certificate granting procedure and impersonating arbitrary processes. Moreover, the procedure can identify processes running in a specific container. Thus, all processes running in a container can be assumed to be of the same trust level. The security framework of FIGS. 3-6 can utilize a single root certificate, managed by a single certificate authority 330 running on a master device 310 of a vehicle. The root certificate can be used to sign all operational certificates for each process interacting with the vehicle. This can be beneficial as it provides a less robust architecture with a reduced number of software components running on each device.

Figure 9:
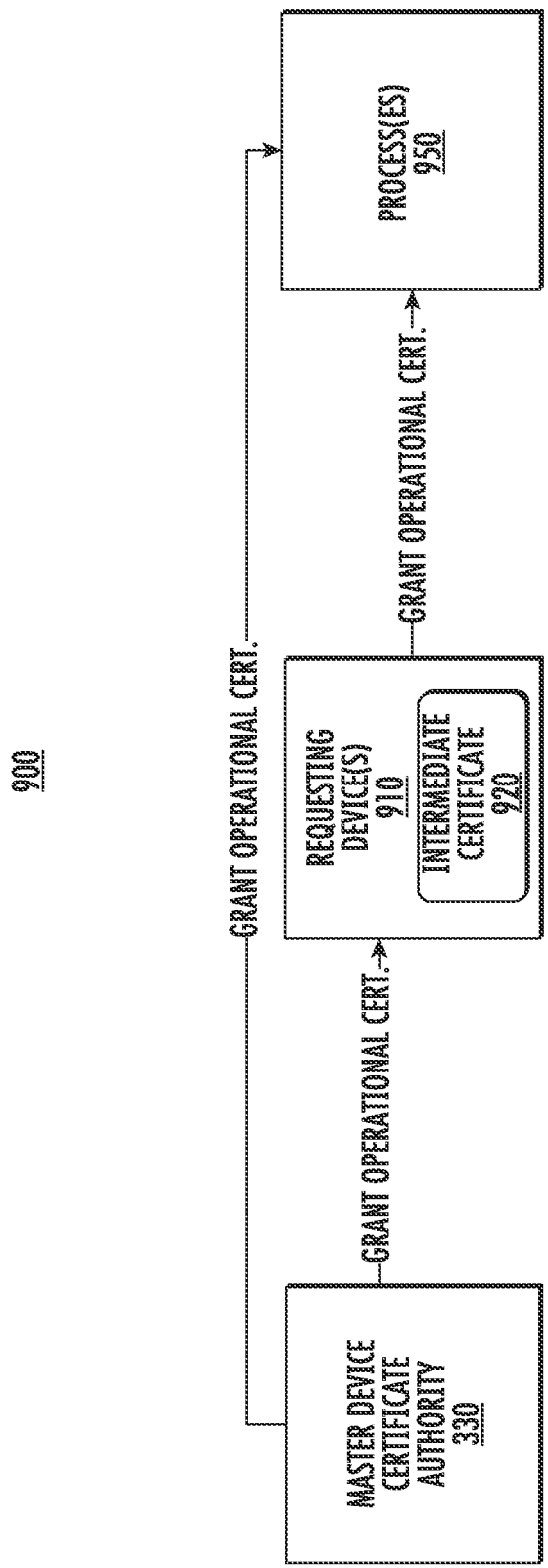
FIG. 9 depicts an example chain of authority for authorizing processes according to example implementations of the present disclosure.

In another example implementation, intermediate certificates can be used to grant a chain of authority between the root certificate and a plurality of processes of the computing system. For example, FIG. 9 depicts an example chain of authority 900 for authorizing processes according to example implementations of the present disclosure. The chain of authority 900, for example, can include root certificate utilized by the certificate authority 330 at the master device to sign an intermediate certificate 920 of a requesting device 910 and/or one or more processes 950. In this manner, the root certificate of the certificate authority 330 can grant an operational certificate 905 to one or more processes 950 and an intermediate certificate 920 to the requesting device 910. The requesting device 910 can utilize the intermediate certificate 920 to grant an operational certificate 915 to one or more processes 950. In this manner, the operational certificate 915 can authorize the one or more processes 950 based on the authority granted to the operational certificate 905 by the certificate authority 330. In this manner, the operational certificate 905 issued by the certificate authority 330 can form an operational certificate chain 900 of authority between the root certificate and the operational certificate 915. Use of intermediate certificates can be beneficial as it improves the traceability of operational certificates. For example, when an operational certificate is used, it can be possible to determine what device that operational certificate was issued to. Moreover, use of intermediate certificates can reduce communication between different devices. For instance, intermediate certificates can reduce authentication communications to one message between each device of the computing system.

Figure 10:
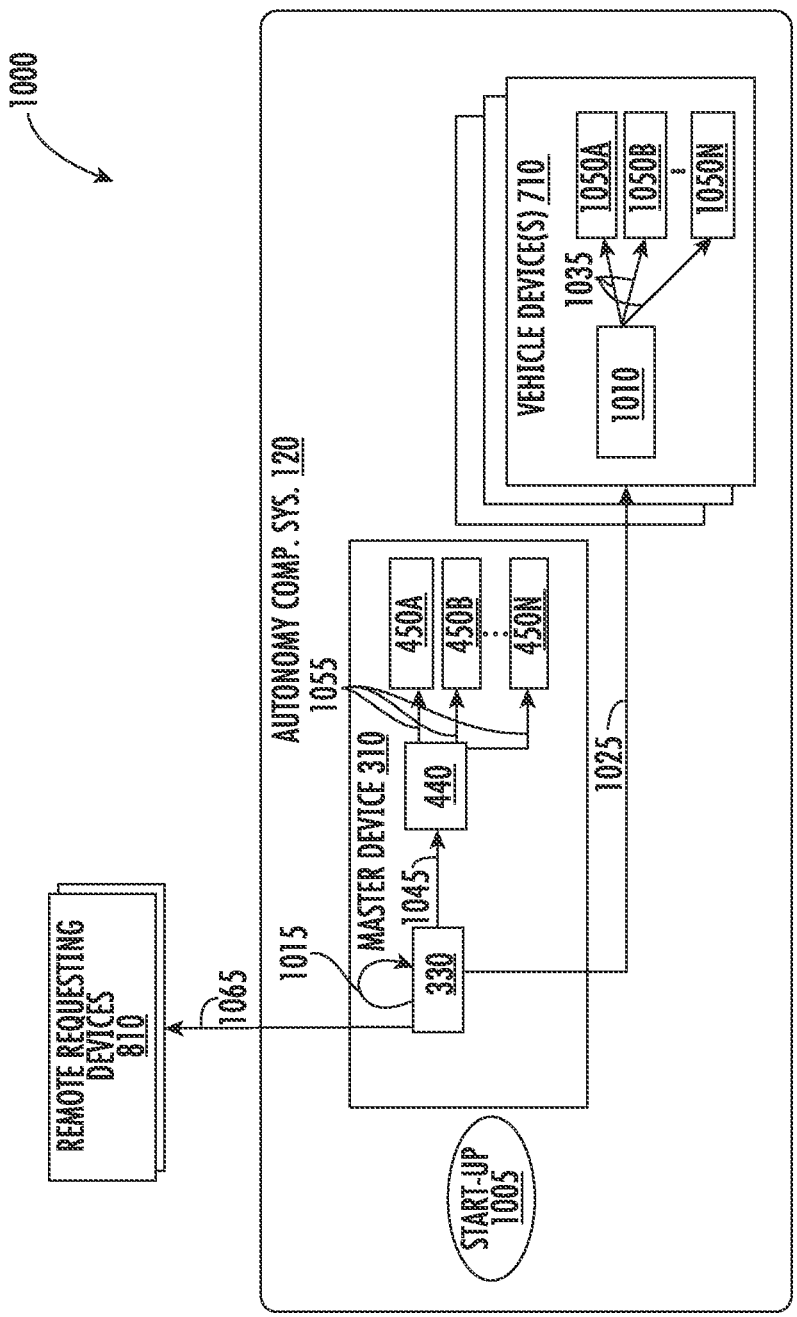
FIG. 10 depicts an example operational certificate granting process utilizing intermediate certificates according to example implementations of the present disclosure.

As an example, FIG. 10 depicts an example operational certificate granting process for a computing system 1000 utilizing intermediate certificates according to example implementations of the present disclosure. The operational certificate granting process can grant authority to processes running on each of the plurality of devices of the computing system 1000. For instance, the plurality of devices can include master device 310, requesting vehicle devices 710 (e.g., one or more vehicle devices of the autonomy computing system 120), and remote requesting devices 810. The master device 310 can run a certificate authority 330 and a secondary orchestration service 440. The secondary orchestration service 440 can be configured to run one or more processes 450A-N of the master device 310. The vehicle requesting device(s) 710 can run a secondary orchestration service 1010 configured to run one or more processes 1050A-N of the vehicle requesting device(s) 710.

Operational certificates can be issued using an onboard certificate granting authority 330. For example, the master device 310 of the computing system 1000 can include a master host security service configured to run the certificate authority 330. The master host security service, for instance, can be configured to authenticate one or more processes 450A-N, 1050A-N, etc. of the computing system 1000. In some implementations, the certificate authority 330 can run as an operating system service. The certificate authority 330 can be run at one or more times depending on one or more factors. For example, the master device can be configured to run the certificate authority 330 during a start-up operation 1005 of the computing system 1000 (e.g., an autonomy computing system 120, a perception computing system, etc.).

The certificate authority 330 can generate (at 1015) a self-signed root certificate and a private root key corresponding to the root certificate during the start-up operation 1005 of the computing system 1000 and/or one or more portions thereof (e.g., the autonomy computing system 120). The certificate authority 330 can grant 1045 an intermediate certificate to the secondary orchestration service 440 of the master device 310. The secondary orchestration service 440 can grant (at 1055) an operational certificate based on the intermediate certificate to one or more processes 450A-N of the master device 310.

A vehicle requesting device 710 can include a requesting secondary orchestration service 1010 for establishing trust cross-devices. The requesting secondary orchestration service 1010 can be configured to receive (at 1025) an intermediate certificate from the certificate authority 330 and authenticate (at 1035) one or more requesting processes 1050A-N of the vehicle requesting device 710 using the intermediate certificate. In some implementations, the master device 310 and/or the one or more requesting devices 710 can include a trusted platform module to facilitate the transfer of certificate cross-device. In addition, the master device 310 can grant (at 1065) an operational certificate to one or more remote requesting devices 810. The one or more remote requesting devices 810 can authenticate one or more processes of the remote requesting device 810 based on the granted (at 1065) operational certificate.

Figure 11:
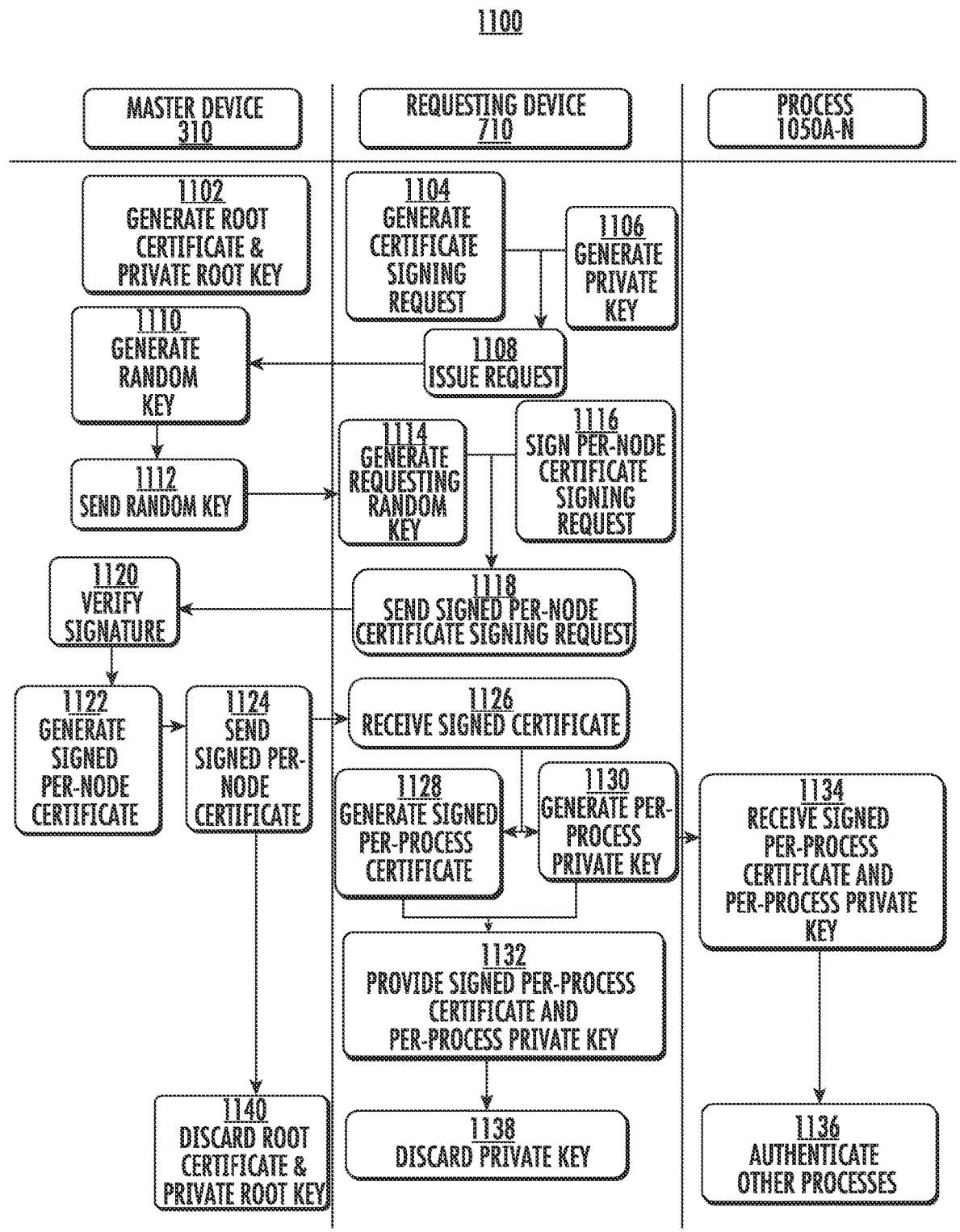
FIG. 11 depicts an example process diagram according to example implementations of the present disclosure.

More particularly, turning to FIG. 11, FIG. 11 depicts an example process diagram 1100 for distributing trust among processes of a vehicle computing system according to example implementations of the present disclosure. The certificate authority of the master device 310 can generate a root certificate and a private root key corresponding to the root certificate (at 1102). As discussed herein with reference to FIGS. 3-6, the root certificate can include a public key corresponding the private root key. The master device 310 can sign the root certificate with the corresponding private root key. By way of example, the master device 310 can generate a signature for the root certificate. The signature, for example, can be indicative of the identity of the master device 310 (e.g., an identity certificate for the master device 310, etc.). In this manner, the master device 310 can run a certificate authority 330 that generates a self-signed root certificate and a private root key corresponding to the root certificate.

The master device 310 can utilize the certificate authority 330 to generate and distribute temporary certificates (e.g., operational certificates) to one or more requesting devices 710 of the vehicle computing system. For example, the master device 310 can receive a request (e.g., issued (at 1108) by the requesting vehicle device 710) to initiate an authorization process from at least one requesting device (and/or process) of the computing system. For example, each of the one or more requesting devices (and/or process thereof) can be configured to generate an authorization request and issue the authorization request (at 1108) to the master device 310 during the start-up operation of the computing system.

In some implementations, the master device 310 can be configured to generate a random master key (at 1110) in response to the authorization request. For example, in the event that the master device 310 communicates with the requesting devices 710 via an unencrypted channel, an additional layer of security for the communication can be established using one or more random keys. The random keys, for example, can include randomly generated nonces. Nonces, for instance, can include an arbitrary number included in a communication to identify old communications and prevent replay attacks.

The master device 310 can reply to the authorization request by providing the random master key (at 1112) to the requesting vehicle device 710. The requesting vehicle device 710 can receive the random master key and, in response, generate (at 1114) a random requesting key. The random requesting key, for example, can include another arbitrary number (e.g., a randomly generated nonce) randomly generated by the requesting device 710.

The requesting device 710 can generate a certificate signing request (at 1104) and a private key (at 1106). The certificate signing request can include an unsigned certificate (e.g., an unauthorized operational certificate) with a public key corresponding to the private key. In addition, the certificate signing request can include a request for a signature from the master device 310 (e.g., the certificate authority 330 of the master device 310, etc.).

In addition, or alternatively, the certificate signing request can include the identity certificate (e.g., of the birth certificate assigned to the requesting device during a provisioning operation 700 and/or 800 as discussed with reference to FIGS. 7-8). For example, the certificate signing request can include the public key of the identity certificate corresponding to the identity private key assigned to the device 710 during provisioning. The requesting device 710 can sign (at 1116) the certificate signing request by generating a requesting signature indicative of the requesting device 710 (e.g., a respective device unique identifier) and encrypting the signature with the identity private key (e.g., via one or more encryption algorithms).

The requesting device 710 can provide the certificate signing request (at 1118), the random master key, and/or the random requesting key to the master device 310. For example, in some implementations, the requesting device 710 can concatenate the random master key and/or the random requesting key to the certificate signing request. In such a case, the concatenation of the random master key, the random requesting key, and the certificate signing request can be provided to the master device 310.

The master device 310 can receive, via a communication channel (e.g., an unencrypted communication channel, etc.), the certificate signing request from the requesting device 710. The certificate signing request, for example, can include the identity certificate and the requesting signature encrypted by the identity private key of the requesting device 710. In addition, or alternatively, the master device 310 can receive the concatenation of the random master key, the certificate signing request, and/or the random requesting key from the requesting device 710. In such a case, the master device 310 can determine the validity of the certificate signing request by comparing the random master key and the random requesting key with previous random master and/or requesting keys of past messages. For instance, the master device 310 can determine that the integrity of the message is compromised (e.g., because the message is a duplicate of a past message) in the event that the random master key and the random requesting key of the request matches a previous random master and/or requesting key of a past message. In addition, or alternatively, the master device 310 can verify the integrity of the message in the event that the random master key and the random requesting key do not match any previous random master and/or requesting key of a past message.

The master device 310 can compare the identity certificate to the certificate signing request to validate the requesting signature of the certificate signing request (at 1120). For example, the master device 310 can decrypt the requesting signature with the public key of the identity certificate. The master device 310 can validate the requesting signature in the event that the master device 310 is able to decrypt the requesting signature with the public key of the identity certificate. For example, a valid decrypted signature can identify the requesting device 710 as one of the plurality of computing devices of the computing system. In this manner, the master device 310 can validate the requesting signature in the event that the signature, after decryption, identifies a computing device of the computing system.

In addition, or alternatively, the master device 310 can compare the identity certificate to the certificate signing request to invalidate the requesting signature of the certificate signing request. For example, the master device 310 can be unable to decrypt the requesting signature with the public key of the identity certificate. For instance, the decrypted signature can identify the requesting device 710 as distinct from the plurality of devices of the computing system. The master device 310 can invalidate the requesting signature in the event that the signature, after decryption, does not identify a device/process of the computing system. The master device 310 can perform one or more security operations in response to invalidating the requesting signature. For example, the master device 310 can ignore the certificate signing request, log an error with one or more memory devices of the computing system, reply to the certificate signing request with the error, etc.

In response to validating the requesting signature, the master device 310 can generate a signed certificate (at 1122) (e.g., an authorized operational certificate) for the requesting device 710. For example, the signed certificate can include the unsigned certificate (e.g., unauthorized operational certificate) of the certificate signing request signed (e.g., authorized) by the master device 310. The signed certificate can be generated based on one or more factors such as, for example, the verification, the identity of the requesting device 710 (e.g., the requesting device 710 is an authorized device, etc.), the timing of the request (e.g., before an authorization threshold, etc.), one or more needs of the computing system, etc.

The signed certificate can include identifiable information for the master device 310. For example, the master device 310 can sign the certificate with a master signature (e.g., respective device unique identifier, etc.) indicative of the identity of the master device 310. Moreover, in some implementations, the master device 310 can encrypt the master signature with the private root key. In this manner, the signed certificate can include a master signature encrypted by the private root key. In some implementations, the master device 310 can concatenate the certificate with the root certificate and/or the random requesting key. The master device 310 can sign and encrypt the signature of the concatenation in the manner described with reference to FIGS. 3-6.

The master device 310 can provide (at 1124), via the communication channel, the signed certificate to the requesting device 710. In addition, or alternatively, the master device 310 can provide (at 1124), via the communication channel, the concatenation of signed certificate, the root certificate, and the random requesting key to the requesting device 710. The requesting device 710 can receive (at 1126), via the communication channel, the signed certificate and/or the concatenation of the signed certificate, the root certificate, and the random requesting key from the master device 310. In the event of the latter, the requesting device 710 can verify the integrity of the communication by comparing the random requesting key to past communications as described above.

The respective requesting device 710 can authenticate one or more processes 1050A-N using the signed certificate and the corresponding private key. For example, each of the plurality of device(s) (e.g., master device 310, requesting device 710, etc.) can include a secondary orchestration service configured to interact with master device 310 and create operational certificates for one or more processes (e.g., configured to run on a respective device) of the computing system. By way of example, the master device 310 can generate a signed per-process certificate (at 1128) and per-process private key (at 1130) and provide the signed per-process certificate and per-process private key (at 1132) to the one or more processes 1050A-N. The one or more processes 1050A-N can receive the signed per-process certificate and the per-process private key (at 1134). The per-process certificate can authorize (at 1136) the one or more processes 1150A-N to communicate with one or more other authorized processes of the computing system (e.g., running on the devices or one or more other devices of the computing system). The per-process certificate can derive authority from the root certificate. In this manner, the per-process certificate issued by the certificate authority can form an operational certificate chain of authority between the root certificate and the per-process certificate.

For example, with reference to FIG. 10, the requesting secondary orchestration service 1010 of the requesting vehicle device 710 can obtain the signed certificate 1025 (e.g., an intermediate certificate) from the certificate authority 330 of the master device 310. The requesting vehicle device 710 (e.g., the requesting secondary orchestration service 1010 of the requesting vehicle device 710) can be configured to authenticate at least one process 1050A-N of the requesting vehicle device 710 by generating the signed per-process certificate and the per-process private key corresponding to the signed per-process certificate. For example, the requesting secondary orchestration service 1010 can start a process 1050A-N (e.g., by executing a function node of a function graph, function subgraph, etc.) and generate a per-process certificate and per-process private key for the process 1050A-N. The per-process certificate can include a unique process identifier and/or a public key corresponding to the per-process private key. For instance, the public key of the per-process certificate can be configured to decrypt a value encrypted by the per-process private key, and/or vice versa. The requesting secondary orchestration service 1010 can sign the per-process certificate and encrypt the signature using the private key. In this manner, a signed per-process certificate can be generated that includes a process signature encrypted by the private key of the requesting vehicle device 710.

The requesting secondary orchestration service 710 can make the per-process certificate and per-process private key available to the processes 1050A-N. For instance, the certificate-key pair can be provided to the process 1050A-N after the process 1050A-N is started. To do so, for example, the requesting secondary orchestration service 1010 can write to a portion of memory associated with the process 1050A-N. For example, the portion of memory associated with the process can include a portion of memory of the device that is devoted to an application container associated with the process 1050A-N. By way of example, the portion of the memory can be a readable only memory (e.g., ROM memory) readable by the process 1050A-N (e.g., through one or more file-system permissions, etc.). The per-process certificate can authorize the process 1050A-N to communicate and/or authorize one or more other processes of the computing system 1000. The per-process certificate of the requesting vehicle device 710 can derive authority from the intermediate certificate granted to the requesting secondary orchestration service 1010; which, in turn, can derive its authority from the root certificate of the certificate authority 330.

Turning back to FIG. 11, the master device 310 can be configured to discard the root certificate and/or the private root key (at 1140) based on one or more temporal and/or event based factors. By way of example, the master device 310 can discard the root certificate and/or the private root key (at 1140) after a time period. For example, the master device 310 can be associated with a first authorization time threshold. The first authorization time threshold can include a period of time after the start-up (e.g., 1005) of the computing system (e.g., 120) within which the master device 310 can grant operational certificates (e.g., intermediate certificates, per-process certificates, etc.). The first authorization time threshold can include a predetermined time (e.g., previously set for each start-up operation based on one or more factors) and/or a dynamic time (e.g., determined at start-up based on one or more factors).

At start-up (e.g., 1005), the master device 310 can begin measuring (e.g., via one or more timing devices onboard the master device 310) an elapsed time after the generation of the root certificate and/or the private root key 1102. The master device 310 can compare the elapsed time to the first authorization time threshold to determine whether the elapsed time has reached and/or exceeds the first authorization time threshold. The master device 310 can discard the root certificate and/or the private root key 1140 based on the comparison of the elapsed time to the first authorization time threshold. For example, the master device 310 can determine that the elapsed time has reached and/or exceeds the first authorization time threshold and, as a result, discard the root certificate and/or the private root key 1140.

In addition, or alternatively, the master device 310 can discard the root certificate and/or the private root key 1140 based on the occurrence of one or more events. For example, the master device 310 can be configured to detect an occurrence of a first event associated with the computing system (e.g., 1000). The first event, for example, can include a vehicle state change (e.g., parking mode, driving mode, autonomous mode, etc.), one or more computing device state changes (e.g., secured, unsecured, etc.), receiving a notification (e.g., from an operations computing system, an operator, etc.), etc. The first event can include one specific event and/or a plurality of events. The master device 310 can detect the first event and discard the root certificate and/or the private root key 1140 based, at least in part, on the occurrence of the first event. In the event that the first event includes a plurality of events, the master device 310 can be configured to discard the root certificate and/or the private root key 1140 based the occurrence of one or more of the plurality of events.

In addition, or alternatively, the requesting vehicle device 710 can be configured to discard the private key 1138 based on one or more temporal or event based factors. By way of example, the requesting vehicle device 710 can discard the private key 1138 after a time period indicated by a second authorization time threshold. The second authorization time threshold can be the same or different from the first authorization time threshold. For instance, the second authorization time threshold can include a period of time after the start-up of the computing system within which the requesting vehicle device 710 can grant operational certificates (e.g., per-process, etc.). The second authorization time threshold can include a predetermined time (e.g., previously set for each start-up operation based on one or more factors) and/or a dynamic time (e.g., determined at start-up based on or more factors).

At start-up and/or after receiving the signed certificate, the requesting vehicle device 710 can begin measuring (e.g., via one or more timing devices onboard the requesting device) an elapsed time. The requesting vehicle device 710 can compare the elapsed time to the second authorization time threshold to determine whether the elapsed time has reached and/or exceeds the second authorization time threshold. The requesting vehicle device 710 can discard the private key 1138 based on the comparison of the elapsed time to the second authorization time threshold. For example, the requesting vehicle device 710 can determine that the elapsed time has reached and/or exceeds the second authorization time threshold and, as a result, discard the private key 1138.

In addition, or alternatively, the requesting vehicle device 710 can discard the private key 1138 based on the occurrence of one or more events. For example, the requesting vehicle device 710 can be configured to detect an occurrence of a second event associated with the computing system. The second event, for example, can include one or more of the same and/or different events from the first event. The second event can include a vehicle state change (e.g., parking mode, driving mode, autonomous mode, etc.), one or more computing device state changes (e.g., secured, unsecured, etc.), receiving a notification (e.g., from the master device 310, an operations computing system, an operator, etc.), etc. The second event can include one specific event and/or a plurality of events. The requesting vehicle device 710 can detect the second event and discard the private key 1138 based, at least in part, on the occurrence of the second event. In the event that the second event includes a plurality of events, the requesting vehicle device 710 can be configured to discard the private key 1138 based the occurrence of one or more of the plurality of events.

In this manner, the computing system of the present disclosure can reduce the grant of authority issued by the master device 310 and/or the requesting vehicle device 710 to a limited duration. For example, the master device 310 can be prevented from signing a certificate and/or per-process certificate without the root certificate and/or private root key because the master device 310 will no longer have access to the private root key needed to encrypt the signature of the certificate. In addition, or alternatively, the requesting vehicle device 710 can be prevented from signing a per-process certificate without the private key as the requesting vehicle device 710 will no longer have access to the private key needed to encrypt the signature of the per-process certificate. This can prevent the unlimited issuing of certificates.

Turning back to FIG. 10, the master device 310 can grant (at 1065) an operational certificate to one or more remote requesting devices 810. The one or more remote requesting devices 810 can authenticate one or more processes of the remote requesting device 810 based on the granted (at 1065) operational certificate. For example, the remote requesting device 810 can obtain a remote key-cert pair during a remote provisioning operation 800 as described with reference to FIG. 8. The remote requesting device 810 can establish a user session between the remote requesting device 810 and the master device 310 during which the remote requesting device 810 can be configured to communicate with the master device 310. For instance, during the user session, the remote requesting device 810 can establish a communication channel with the master device 310 based on the remote key-cert pair. The communication channel can include, for example, a mutually authenticated and encrypted channel (e.g., gRPC channel) between the remote requesting device 810 and the certificate authority 330 of the master device 310. The communication channel can be established using one or more cryptographic techniques (e.g., symmetric signing algorithms, asymmetric signing algorithms, etc.) and can enable secure communication between the remote requesting device 810 and the certificate authority 330 of the master device 310. In some implementations, the remote requesting device 810 can detect the termination of the user session and discard the remote cert-key pair in response to the termination of the user session.

The remote requesting device 810 can generate a remote private key and a remote certificate signing request associated with the remote private key. For example, the remote certificate signing request can include the remote-identity certificate, an unsigned remote certificate, and a signature encrypted by the remote-identity private key. The remote requesting device 810 can provide, via the communication channel, the remote certificate signing request to the master device 310.

In response, the master device 310 (e.g., the certificate authority 330 of the master device 310) can sign the unsigned remote certificate. For example, the master device 310 can generate the signed remote certificate by signing the unsigned remote certificate with the private root key. In this way, the signed remote certificate can include a master signature encrypted by the private root key of the master device 310. The remote requesting device 810 can receive (at 1065), via the communication channel, the signed remote certificate and the root certificate of the master device 310 from the master device 310.

The remote requesting device 810 can communicate with the plurality of devices (e.g., requesting vehicle devices 710) of the computing system 1000 using the signed remote certificate. For example, the remote requesting device 810 can provide a message including the signed remote certificate to at least one of the one or more requesting vehicle devices 710 of the computing system 1000. The one or more requesting vehicle devices 710 can be configured to authenticate the message based, at least in part, on the signed remote certificate. By way of example, the remote requesting device 810 can execute one or more remote processes and authorize each remote process using the signed remote certificate (e.g., in the manner described with respect to requesting vehicle devices 710 of FIG. 11). The authorized remote process can send and/or receive messages to/from one or more other authorized process (e.g., vehicle processes 450A-N, 1050A-N, other remote processes, etc.) using the signed remote certificate (e.g., a process operational certificate derived from the signed remote certificate).

Figure 12:
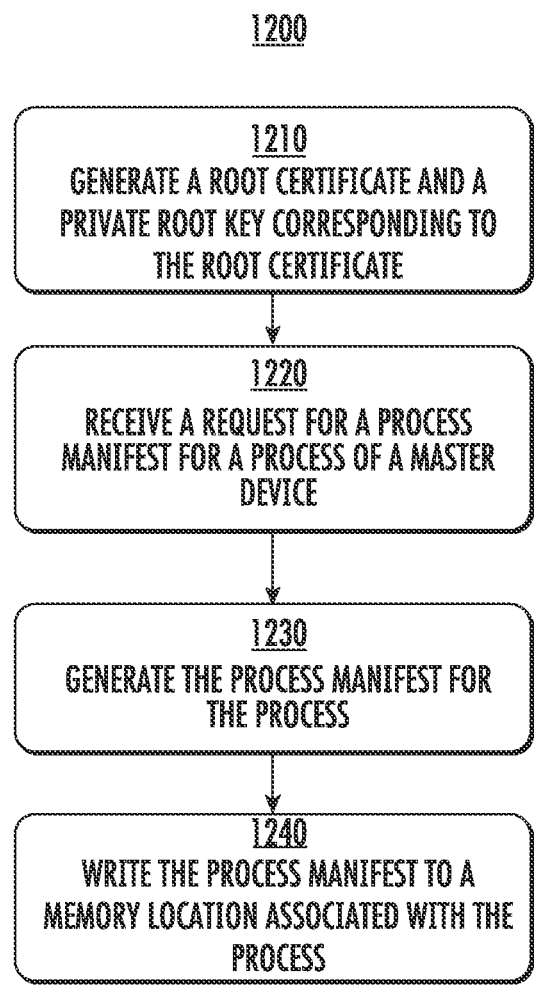
FIG. 12 depicts a flowchart diagram of an example operational certificate granting method for processes running on a master device of a computing system according to example implementations of the present disclosure.

Turning to FIG. 12, FIG. 12 depicts a flowchart diagram of an example operational certificate granting method 1200 for processes running on a master device of a computing system according to example implementations of the present disclosure. One or more portion(s) of the method 1200 can be implemented by a computing system that includes one or more computing devices such as, for example, the computing systems described with reference to the other figures (e.g., the vehicle computing system 112, etc.). Each respective portion of the method 1200 can be performed by any (or any combination) of one or more computing devices. Moreover, one or more portion(s) of the method 1200 can be implemented as an algorithm on the hardware components of the device(s) described herein (e.g., as in FIGS. 1-6, 18-19, etc.), for example, to distribute operational certificates to one or more processes of a vehicle device. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 12 is described with reference to elements/terms described with respect to other systems and figures for exemplary illustrated purposes and is not meant to be limiting. One or more portions of method 1200 can be performed additionally, or alternatively, by other systems.

At 1210, the method 1200 can include generating a root certificate and a private root key corresponding to the root certificate. For example, a computing system (e.g., master device 310, etc.) can generate, by the master host security service, a root certificate and a private root key corresponding to the root certificate.

At 1220, the method 1200 can include receiving a request for a process manifest for a process of the master device 310. For example, a computing system (e.g., master device 310, etc.) can receive, from an orchestration service of the master device, a request for a process manifest for a process of the master device. The process manifest can include at least a process name, a manifest key, and the root certificate.

At 1230, the method 1200 can include generating a process manifest for the process. For example, a computing system (e.g., master device 310, etc.) can generate, by the master host security service, the process manifest for the process.

At 1240, the method 1200 can include writing the process manifest to a memory location associated with the process. For example, a computing system (e.g., master device 310, etc.) can write, by the orchestration service, the process manifest to a memory location associated with the process.

Figure 13:
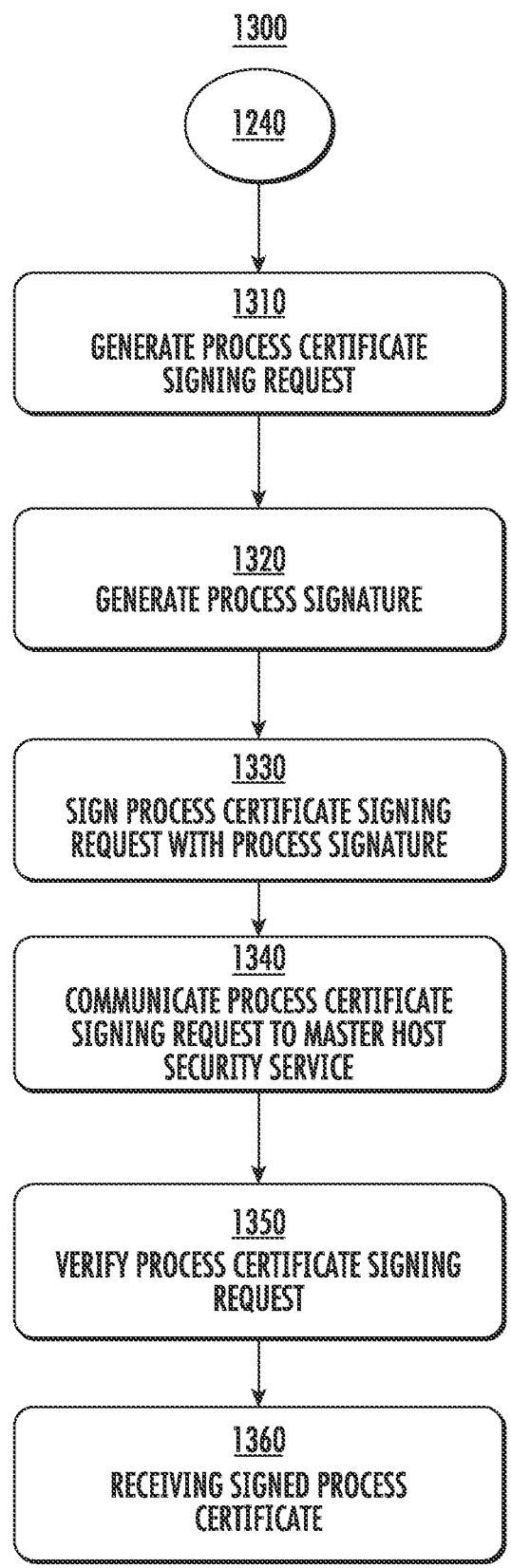
FIG. 13 depicts a flowchart diagram of an example operational certificate granting method for processes running on a master device of a computing system according to example implementations of the present disclosure.

Turning to FIG. 13, FIG. 13 depicts a flowchart diagram of an example operational certificate granting method 1300 for processes running on a master device of a computing system according to example implementations of the present disclosure. One or more portion(s) of the method 1300 can be implemented by a computing system that includes one or more computing devices such as, for example, the computing systems described with reference to the other figures (e.g., the vehicle computing system 112, etc.). Each respective portion of the method 1300 can be performed by any (or any combination) of one or more computing devices. Moreover, one or more portion(s) of the method 1300 can be implemented as an algorithm on the hardware components of the device(s) described herein (e.g., as in FIGS. 1-6, 18-19, etc.), for example, to distribute operational certificates to one or more processes of a vehicle device. FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 13 is described with reference to elements/terms described with respect to other systems and figures for exemplary illustrated purposes and is not meant to be limiting. One or more portions of method 1300 can be performed additionally, or alternatively, by other systems.

Method 1300 begins at step 1240 where the method 1200 includes writing the process manifest to a memory location associated with the process.

At 1310, the method 1300 can include generating a process certificate signing request. For example, a computing system (e.g., a requesting process, etc.) can generate, by the process, a process certificate signing request and a per-process private key corresponding to the process certificate signing request.

At 1320, the method 1300 can include generating a process signature. For example, a computing system (e.g., requesting process, etc.) can generate, by the process, a process signature using the manifest key.

At 1330, the method 1300 can include signing the process certificate signing request with the process signature. For example, a computing system (e.g., requesting process, etc.) can sign, by the process, the process certificate signing request with the process signature.

At 1340, the method 1300 can include communicating the process certificate signing request to the master host security service of the master device. For example, a computing system (e.g., requesting process, etc.) can communicate, by the process, the process certificate signing request to the master host security service.

At 1350, the method 1300 can include verifying the process certificate signing request. For example, a computing system (e.g., master host security service, etc.) can verify, by the master host security service, the process certificate signing request using a symmetric key corresponding to the manifest key.

At 1360, the method 1300 can include receiving a signed process certificate. For example, in response to verifying the process certificate signing request, the computing system can receive, at the process, a signed process certificate from the master host security service.

Figure 14:
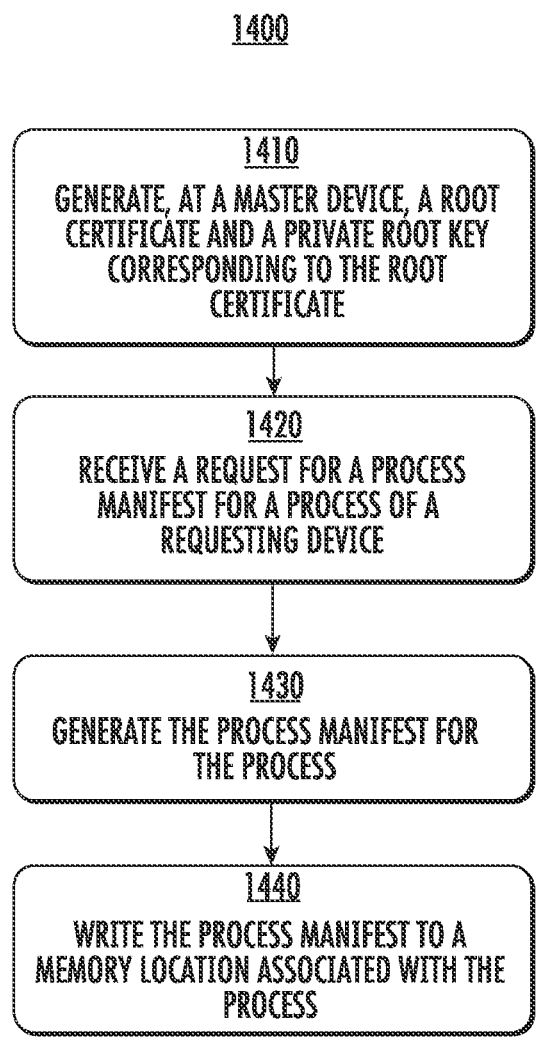
FIG. 14 depicts a flowchart diagram of an example operational certificate granting method for processes running on a requesting device of a computing system according to example implementations of the present disclosure.

Turning to FIG. 14, FIG. 14 depicts a flowchart diagram of an example operational certificate granting method 1400 for processes running on a requesting device of a computing system according to example implementations of the present disclosure. One or more portion(s) of the method 1400 can be implemented by a computing system that includes one or more computing devices such as, for example, the computing systems described with reference to the other figures (e.g., the vehicle computing system 112, etc.). Each respective portion of the method 1400 can be performed by any (or any combination) of one or more computing devices. Moreover, one or more portion(s) of the method 1400 can be implemented as an algorithm on the hardware components of the device(s) described herein (e.g., as in FIGS. 1-6, 18-19, etc.), for example, to distribute operational certificates to one or more processes of a vehicle computing system. FIG. 14 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 14 is described with reference to elements/terms described with respect to other systems and figures for exemplary illustrated purposes and is not meant to be limiting. One or more portions of method 1400 can be performed additionally, or alternatively, by other systems.

At 1410, the method 1400 can include generating, at a master device, a root certificate and a private root key corresponding to the root certificate. For example, a computing system (e.g., master device 310, etc.) can generating, by the master host security service of the master device, a root certificate and a private root key corresponding to the root certificate.

At 1420, the method 1400 can include receiving, at a requesting device, a request for a process manifest for a process of the requesting device 310. For example, a computing system (e.g., requesting device 510, etc.) can receive, at the requesting host security service of the requesting device, a request for a process manifest for a requesting process of the requesting device from the requesting orchestration service. The process manifest can include a process name, a manifest key, and/or the root certificate. For example, the requesting device can receive, at the requesting host security service, the root certificate from the master host security service.

At 1430, the method 1400 can include generating a process manifest for the process. For example, a computing system (e.g., requesting device 510, etc.) can generate, by the requesting host security service, the process manifest for the requesting process.

At 1440, the method 1200 can include writing the process manifest to a memory location associated with the process. For example, a computing system (e.g., requesting device 510, etc.) can write, by the requesting orchestration service, the process manifest to a memory location associated with the requesting process.

Figure 15:
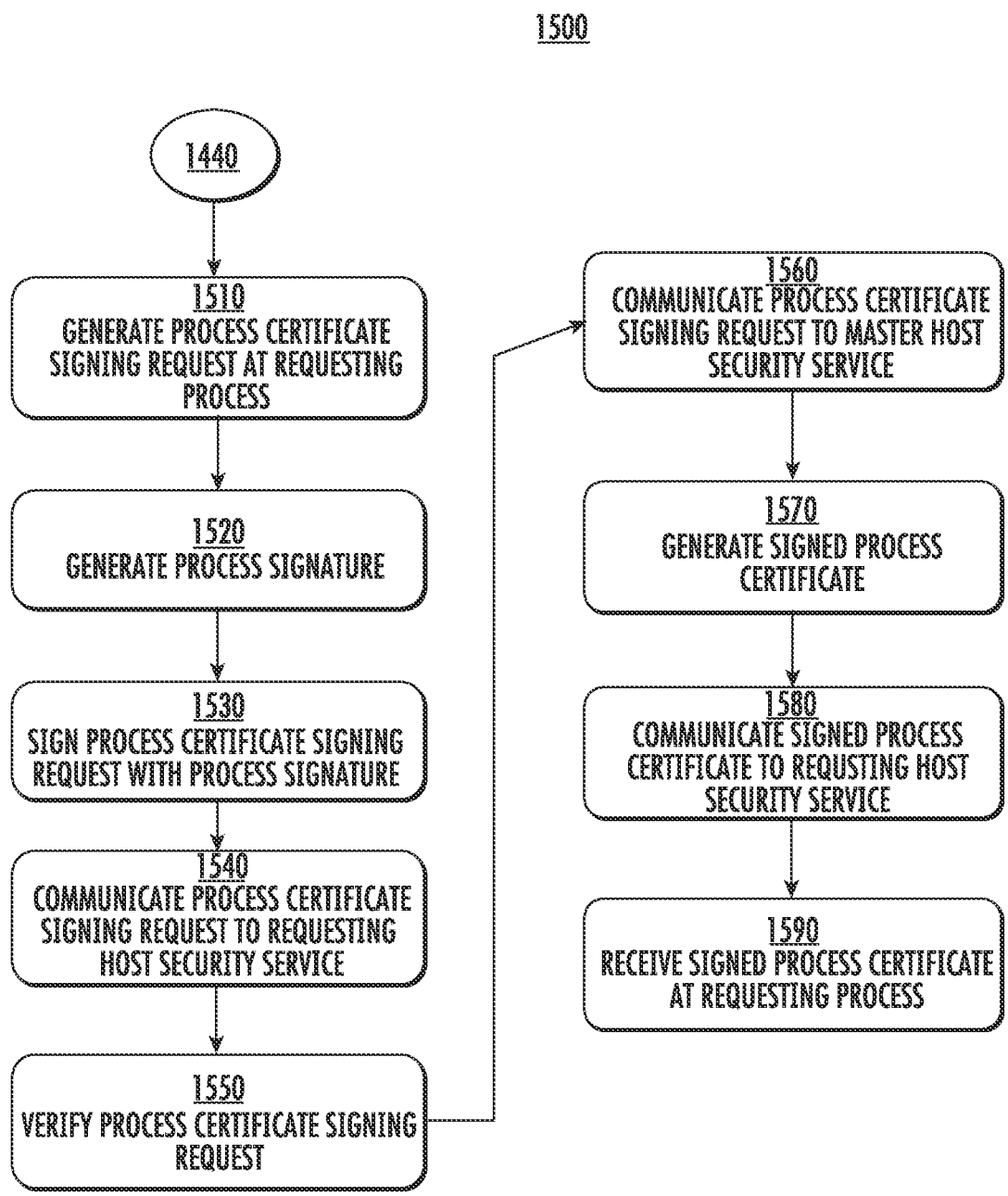
FIG. 15 depicts a flowchart diagram of an example operational certificate granting method for processes running on a requesting device of a computing system according to example implementations of the present disclosure.

Turning to FIG. 15, FIG. 15 depicts a flowchart diagram of an example operational certificate granting method 1500 for processes running on a device of a computing system according to example implementations of the present disclosure. One or more portion(s) of the method 1500 can be implemented by a computing system that includes one or more computing devices such as, for example, the computing systems described with reference to the other figures (e.g., the vehicle computing system 112, etc.). Each respective portion of the method 1500 can be performed by any (or any combination) of one or more computing devices. Moreover, one or more portion(s) of the method 1500 can be implemented as an algorithm on the hardware components of the device(s) described herein (e.g., as in FIGS. 1-6, 18-19, etc.), for example, to distribute operational certificates to one or more processes of a vehicle computing system. FIG. 15 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 15 is described with reference to elements/terms described with respect to other systems and figures for exemplary illustrated purposes and is not meant to be limiting. One or more portions of method 1500 can be performed additionally, or alternatively, by other systems.

Method 1500 begins at step 1440 where the method 1400 includes writing the process manifest to a memory location associated with the process.

At 1510, the method 1500 can include generating a process certificate signing request at a requesting process. For example, a computing system (e.g., a requesting process, etc.) can generate, by the requesting process, a process certificate signing request and a per-process private key corresponding to the process certificate signing request.

At 1520, the method 1500 can include generating a process signature at the requesting process. For example, a computing system (e.g., a requesting process, etc.) can generate, by the requesting process, a process signature using the manifest key.

At 1530, the method 1500 can include signing the process certificate signing request with the process signature. For example, a computing system (e.g., requesting process, etc.) can sign, by the requesting process, the process certificate signing request with the process signature.

At 1540, the method 1500 can include communicating the process certificate signing request to the requesting host security service of the requesting device. For example, a computing system (e.g., requesting process, etc.) can communicate, by the requesting process, the process certificate signing request to the requesting host security service running on the requesting device.

At 1550, the method 1500 can include verifying the process certificate signing request. For example, a computing system (e.g., requesting host security service, etc.) can verify, by the requesting host security service, the process certificate signing request using a symmetric key corresponding to the manifest key.

At 1560, the method 1300 can include communicating the process certificate signing request to the master host security service. For example, a computing system (e.g., requesting host security service, etc.) can communicate, by the requesting host security service, the process certificate signing request to the master host security service.

At 1570, the method 1500 can include generating a signed process certificate. For example, a computing system (e.g., requesting host security service, etc.) can generate, by the master host security service, a signed process certificate for the requesting process.

At 1580, the method 1500 can include communicating the signed process certificate to the requesting host security service. For example, a computing system (e.g., requesting host security service, etc.) can communicate by the master host security service, the signed process certificate to the requesting host security service.

At 1590, the method 1500 can include receiving the signed process certificate at the requesting process. For example, a computing system (e.g., requesting host security service, etc.) can receive, at the requesting process, the signed process certificate from the requesting host security service.

Figure 16:
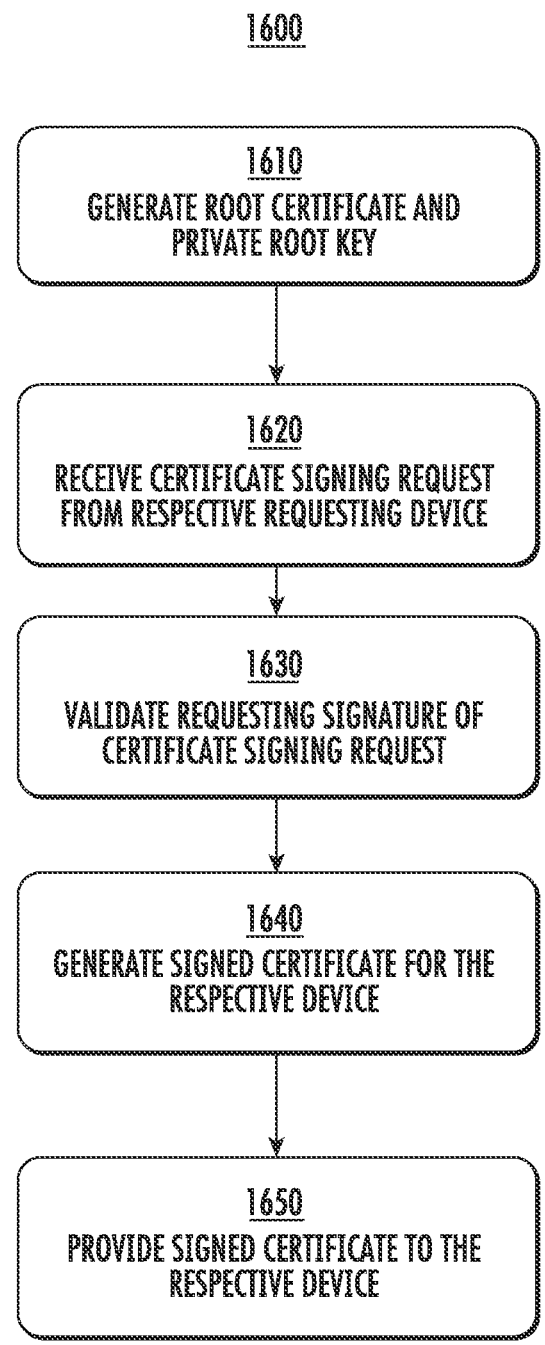
FIG. 16 depicts a flowchart diagram of another example operational certificate granting method for processes running on a requesting device of a computing system according to example implementations of the present disclosure

Turning to FIG. 16, FIG. 16 depicts a flowchart diagram of another example operational certificate granting method 1600 for processes running on a requesting device of a computing system according to example implementations of the present disclosure. One or more portion(s) of the method 1600 can be implemented by a computing system that includes one or more computing devices such as, for example, the computing systems described with reference to the other figures (e.g., the vehicle computing system 112, etc.). Each respective portion of the method 1600 can be performed by any (or any combination) of one or more computing devices. Moreover, one or more portion(s) of the method 1600 can be implemented as an algorithm on the hardware components of the device(s) described herein (e.g., as in FIGS. 1-6, 18-19, etc.), for example, to distribute operational certificates to one or more processes of a computing system. FIG. 16 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 16 is described with reference to elements/terms described with respect to other systems and figures for exemplary illustrated purposes and is not meant to be limiting. One or more portions of method 1600 can be performed additionally, or alternatively, by other systems.

At 1610, the method 1600 can include generating a root certificate and private root key. For example, a computing system (e.g., master device, etc.) can generate a root certificate and a private root key corresponding to the root certificate.

At 1620, the method 1600 can include receiving a certificate signing request from a respective requesting device. For example, a computing system (e.g., master device, etc.) can receive, via a communication channel, a certificate signing request from the respective requesting device. The certificate signing request can include an identity certificate and a requesting signature encrypted by the identity private key.

At 1630, the method 1600 can include validating the requesting signature of the certificate signing request. For example, a computing system (e.g., master device, etc.) can validate the requesting signature by comparing the identity certificate to the certificate signing request.

At 1640, the method 1600 can include generating a signed certificate (e.g., an intermediate certificate) for the respective device. For example, in response to validating the requesting signature, a computing system (e.g., master device, etc.) can generate the signed certificate for the respective requesting device. The signed certificate can include a master signature encrypted by the private root key.

At 1650, the method 1600 can include providing the signed certificate to the respective device. For example, a computing system (e.g., master device) can provide, via the communication channel, the signed certificate to the respective requesting device. The respective requesting device can be configured to decrypt the master signature of the signed certificate with the root certificate and authenticate one or more processes at the respective requesting device using the signed certificate (e.g., the intermediate certificate) by generating an operational certificate for each of the one or more processes.

Figure 17:
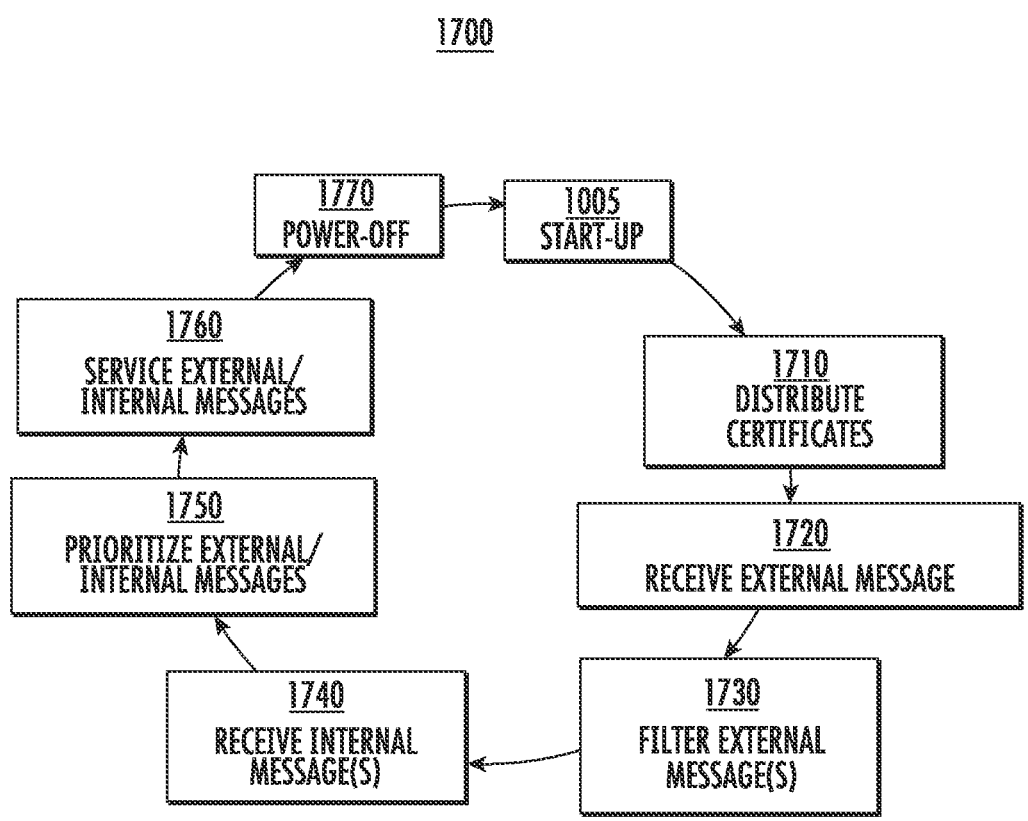
FIG. 17 depicts an example overview of message signing and processing according to example implementations of the present disclosure.

FIG. 17 depicts an example overview of message signing and processing according to example implementations of the present disclosure. For example, at start-up 1005, the computing system 1700 begin distributing certificates 1710 (intermediate certificates, operational certificates, etc.) to one or more devices (remote devices, vehicle devices, etc.) and/or processes interacting with the computing system. Each certificate can identify a respective device and/or process. In this manner, the computing system 1700 can identify messages transmitted between processes and/or devices with application level certainty. By way of example, each message can include an operational certificate that identifies the process (e.g., software container, application, etc.) that generated the message.

The computing system 1700 and/or a portion thereof (e.g., vehicle computing system 112 of FIG. 1) can receive external messages 1720 from one or more remote devices (e.g., device remote from the vehicle computing system 112). The computing system (e.g., vehicle computing system 112) can filter the external message(s) 1730 (e.g., at a communication interface of the vehicle computing system 112) based on the external process that generated the message and/or an internal process (e.g., running on the vehicle computing system 112) for which the message is intended.

In addition, the computing system 1700 and/or a portion thereof (e.g., vehicle computing system 112 of FIG. 1) can receive internal messages 1740 from one or more internal processes (e.g., running on the vehicle computing system 112). The computing system 1700 can prioritize the external and/or internal messages 1750 based on the respective processes that generated the messages. The computing system 1700 can service the external and/or internal messages 1760 based on the assigned message priority by forwarding the messages, assigning computing resources to the message, initiating a vehicle action in response the message, etc. In this manner, the computing system 1700 can facilitate the transfer of messages between processes interacting with the computing system 1700 based on application level knowledge of the messaging processes until the computing system and/or portion thereof is powered-off 1770.

Figure 18:
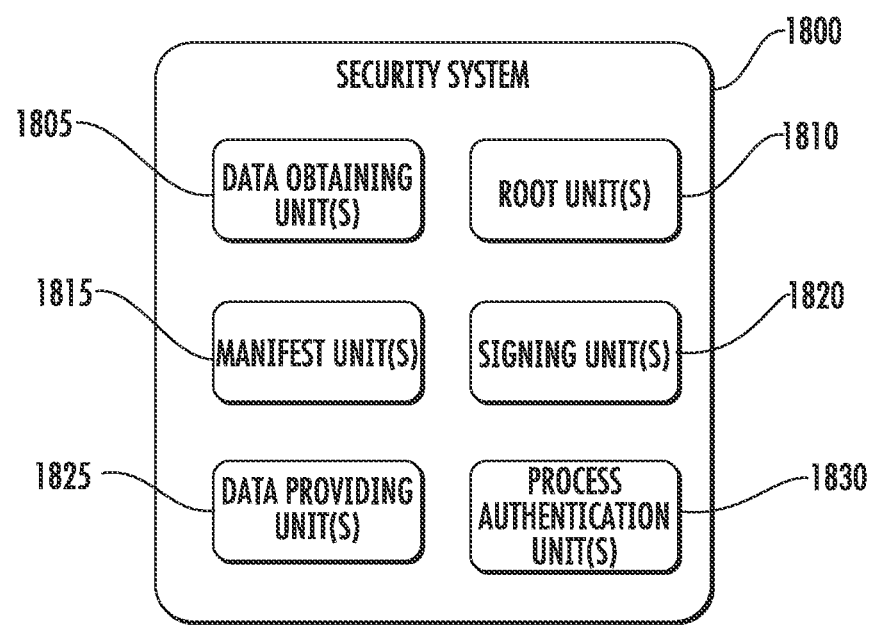
FIG. 18 depicts an example system with various means for performing operations and functions according example implementations of the present disclosure.

FIG. 18 depicts an example of a security computing system 1800 according to example implementations of the present disclosure. One or more operations and/or functions in FIG. 18 can be implemented and/or performed by one or more devices (e.g., one or more computing devices of the vehicle computing system 112) or systems including, for example, the operations computing system 104, the vehicle 108, or the vehicle computing system 112, which are shown in FIG. 1. Further, the one or more devices and/or systems in FIG. 18 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a computing system can include data obtaining unit(s) 1805, root unit(s) 1810, manifest unit(s) 1815, signing unit(s) 1820, data providing unit(s) 1825, process authentication unit(s) 1830, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., root unit(s) 1810, etc.) can be configured to generate, by the master host security service, a root certificate and a private root key corresponding to the root certificate. The means (e.g., data obtaining unit(s) 1805, etc.) can be configured to receive, from an orchestration service, a request for a process manifest for a process of a device. For instance, the (e.g., manifest unit(s) 1815, etc.) can be configured to generate a process manifest for the process based on the root certificate. The process manifest can include a process name, a manifest key, and the root certificate. The means (e.g., signing unit(s) 1820, etc.) can be configured to sign the process manifest with a manifest signature. The means (e.g., data providing unit(s) 1825, etc.) can be configured to write, by the orchestration service, the process manifest to a memory location associated with the process. And, the means (e.g., process authentication unit(s) 1830, etc.) can be configured to obtain a signed process certificate from a master host security service and authenticate a message from a process using the signed process certificate.

FIG. 19 depicts example system components of an example system 1900 according to example embodiments of the present disclosure. The example system 1900 can include the computing system 1905 (e.g., a vehicle computing system 112) and the computing system(s) 1950 (e.g., operations computing system 104, remote computing device(s) 106, etc.), etc. that are communicatively coupled over one or more network(s) 1945.

The computing system 1905 can include one or more computing device(s) 1910 (e.g., master device 310, requesting vehicle devices 710). The computing device(s) 1910 of the computing system 1905 can include processor(s) 1915 and a memory 1920. The one or more processors 1915 can be any suitable processing device (e.g., a processor core, a microprocessor, an ASIC, a FPGA, a controller, a microcontroller, etc.) and can be one processor or a plurality of processors that are operatively connected. The memory 1920 can include one or more non-transitory computer-readable storage media, such as RAM, ROM, EEPROM, EPROM, one or more memory devices, flash memory devices, etc., and combinations thereof.

The memory 1920 can store information that can be accessed by the one or more processors 1915. For instance, the memory 1920 (e.g., one or more non-transitory computer-readable storage mediums, memory devices) can include computer-readable instructions 1925 that can be executed by the one or more processors 1915. The instructions 1925 can be software written in any suitable programming language or can be implemented in hardware. Additionally, or alternatively, the instructions 1925 can be executed in logically and/or virtually separate threads on processor(s) 1915.

For example, the memory 1920 can store instructions 1925 that when executed by the one or more processors 1915 cause the one or more processors 1915 to perform operations such as any of the operations and functions of the vehicle computing system 112, or for which the vehicle computing system 112 is configured, as described herein.

The memory 1920 can store data 1930 that can be obtained, received, accessed, written, manipulated, created, and/or stored. The data 1930 can include, for instance, root data, process data, manifest data, certificate data, cryptographic signing data, and/or other data/information described herein. In some implementations, the computing device(s) 1910 can obtain from and/or store data in one or more memory device(s) that are remote from the computing system 1905 such as one or more memory devices of the computing system 1950.

The computing device(s) 1910 can also include a communication interface 1935 used to communicate with one or more other system(s) (e.g., computing system 1950). The communication interface 1935 can include any circuits, components, software, etc. for communicating via one or more networks (e.g., 1945). In some implementations, the communication interface 1935 can include for example, one or more of a communications controller, receiver, transceiver, transmitter, port, conductors, software and/or hardware for communicating data/information.

The computing system 1950 can include one or more computing devices 1955 (e.g., remote requesting device(s) 810). The one or more computing devices 1955 can include one or more processors 1960 and a memory 1965. The one or more processors 1960 can be any suitable processing device (e.g., a processor core, a microprocessor, an ASIC, a FPGA, a controller, a microcontroller, etc.) and can be one processor or a plurality of processors that are operatively connected. The memory 1965 can include one or more non-transitory computer-readable storage media, such as RAM, ROM, EEPROM, EPROM, one or more memory devices, flash memory devices, etc., and combinations thereof.

The memory 1965 can store information that can be accessed by the one or more processors 1960. For instance, the memory 1965 (e.g., one or more non-transitory computer-readable storage mediums, memory devices) can store data 1975 that can be obtained, received, accessed, written, manipulated, created, and/or stored. The data 1975 can include, for instance, process data, manifest data, certificate data, cryptographic signing data, and/or other data or information described herein. In some implementations, the computing system 1950 can obtain data from one or more memory device(s) that are remote from the computing system 1950.

The memory 1965 can also store computer-readable instructions 1970 that can be executed by the one or more processors 1960. The instructions 1970 can be software written in any suitable programming language or can be implemented in hardware. Additionally, or alternatively, the instructions 1970 can be executed in logically and/or virtually separate threads on processor(s) 1960. For example, the memory 1965 can store instructions 1970 that when executed by the one or more processors 1960 cause the one or more processors 1960 to perform any of the operations and/or functions described herein, including, for example, any of the operations and functions of the operations computing system 102, remote computing devices 106, and/or other operations and functions.

The computing device(s) 1955 can also include a communication interface 1980 used to communicate with one or more other system(s). The communication interface 1980 can include any circuits, components, software, etc. for communicating via one or more networks (e.g., 1945). In some implementations, the communication interface 1980 can include for example, one or more of a communications controller, receiver, transceiver, transmitter, port, conductors, software and/or hardware for communicating data/information.

The network(s) 1945 can be any type of network or combination of networks that allows for communication between devices. In some embodiments, the network(s) 1945 can include one or more of a local area network, wide area network, the Internet, secure network, cellular network, mesh network, peer-to-peer communication link and/or some combination thereof and can include any number of wired or wireless links. Communication over the network(s) 1945 can be accomplished, for instance, via a network interface using any type of protocol, protection scheme, encoding, format, packaging, etc.

FIG. 19 illustrates one example system 1900 that can be used to implement the present disclosure. Other computing systems can be used as well. Computing tasks discussed herein as being performed at vehicle computing device(s) can instead be performed remote from the vehicle (e.g., via the operations computing system, etc.), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. One or more tangible, non-transitory, computer readable media that store instructions executable by one or more processors to cause the one or more processors to perform operations, the operations comprising:
   granting, by a computing system comprising a plurality of devices including a master device and a remote requesting device, an operational certificate, wherein;
      the computing system is on-board an autonomous vehicle, the autonomous vehicle comprising a vehicle computing system; and
      the master device comprises a master host security service configured to grant the operational certificate to the remote requesting device, and the remote requesting device is configured to authenticate one or more processes of a vehicle computing system based on the operational certificate;
   generating, by the computing system, a remote key and a remote certificate signing request;
   generating, by the computing system, a signed remote certificate, wherein the master device generates a cryptographic signature for the remote certificate signing request; and
   generating, by the computing system, a communication channel, wherein the communication channel is indicative of communication between the vehicle computing system and the remote requesting device.

2. The one or more tangible, non-transitory, computer readable media of claim 1, the operations further comprising:
   receiving, by the computing system comprising a security database, user credentials from a user, wherein the user credentials are compared to a user directory to verify the user being associated with an authorized user;
   authenticating, by the computing system, a user device based on the user credentials, wherein the user device is associated with the user, and
   in response to authenticating the user device, generating, by the computing system, a user token, wherein the user token is associated with the authorized user.

3. The one or more tangible, non-transitory, computer readable media of claim 2, wherein the user token is configured to authorize the user device to communicate with the security database.

4. The one or more tangible, non-transitory, computer readable media of claim 2, wherein the user device is indicative of the remote requesting device.

5. The one or more tangible, non-transitory, computer readable media of claim 1,
   wherein the remote requesting device is associated with at least one of (i) a vehicle operator; (ii) a developer; or (iii) a provisioner.

6. The one or more tangible, non-transitory, computer-readable media of claim 1, the operations further comprising:
   generating, by the computing system, a user session between the remote requesting device and the master device based on a remote cert-key pair, wherein the remote cert-key pair is indicative of the remote signed certificate;
   detecting, by the computing system, a termination of the user session; and
   in response to detecting the termination of the user session, discarding, by the computing system, the remote cert-key pair.

7. The one or more tangible, non-transitory, computer readable media of claim 1, wherein the remote requesting device authorizes one or more remote processes and executes the one or more remote processes using the signed remote certificate.

8. The one or more tangible, non-transitory, computer readable media of claim 1, the operations further comprising:
   generating, by the computing system, a second communication channel, wherein the second communication channel is generated in response to at least (i) a reset of the vehicle computing system; (ii) a start-up of the vehicle computing system; or (iii) a time threshold.

9. The one or more tangible, non-transitory, computer readable media of claim 1, wherein the communication channel is generated using one or more cryptographic techniques.

10. The one or more tangible, non-transitory, computer readable media of claim 1, wherein the master host security service is configured to grant a per-process operational certificate to the remote requesting device, wherein the per-process operational certificate authorizes a specific process of the vehicle computing system.

11. A computer-implemented method for authenticating processes, the method comprising:

granting, by a computing system comprising a plurality of devices including a master device and a remote requesting device, an operational certificate, wherein;
    the computing system is on-board an autonomous vehicle, the autonomous vehicle comprising a vehicle computing system; and
    the master device comprises a master host security service configured to grant the operational certificate to the remote requesting device, and the remote requesting device is configured to authenticate one or more processes of the vehicle computing system based on the operational certificate;
generating, by the computing system, a remote key and a remote certificate signing request;
generating, by the computing system, a signed remote certificate, wherein the master device generates a cryptographic signature for the remote certificate signing request; and
generating, by the computing system, a communication channel, wherein the communication channel is indicative of communication between the vehicle computing system and the remote requesting device.

12. The computer-implemented method of claim 11, further comprising:
    receiving, by the computing system comprising a security database, user credentials from a user, wherein the user credentials are compared to a user directory to verify the user being associated with an authorized user;
    authenticating, by the computing system, a user device based on the user credentials, wherein the user device is associated with the user, and
    in response to authenticating the user device, generating, by the computing system, a user token, wherein the user token is associated with the authorized user.

13. The computer-implemented method of claim 12, wherein the user token is configured to authorize the user device to communicate with the security database.

14. The computer-implemented method of claim 12, wherein the user device is indicative of the remote requesting device.

15. The computer-implemented method of claim 11, wherein the remote requesting device is associated with at least one of (i) a vehicle operator; (ii) a developer; or (iii) a provisioner.

16. The computer-implemented method of claim 11, further comprising:
    generating, by the computing system, a user session between the remote requesting device and the master device based on a remote cert-key pair, wherein the remote cert-key pair is indicative of the remote signed certificate;
    detecting, by the computing system, a termination of the user session; and
    in response to detecting the termination of the user session, discarding, by the computing system, the remote cert-key pair.

17. The computer-implemented method of claim 11, wherein the remote requesting device authorizes one or more remote processes and executes the one or more remote processes using the signed remote certificate.

18. The computer-implemented method of claim 11, further comprising:
    generating, by the computing system, a second communication channel, wherein the second communication channel is generated in response to at least (i) a reset of the vehicle computing system; (ii) a start-up of the vehicle computing system; or (iii) a time threshold.

19. The computer-implemented method of claim 11, wherein the communication channel is generated using one or more cryptographic techniques.

20. The computer-implemented method of claim 11, wherein the master host security service is configured to grant a per-process operational certificate to the remote requesting device, wherein the per-process operational certificate authorizes a specific process of the vehicle computing system.

* * * * *